US012409962B2

(12) United States Patent
Cittadino et al.

(10) Patent No.: US 12,409,962 B2
(45) Date of Patent: *Sep. 9, 2025

(54) FILM SECURING APPARATUS AND METHOD

(71) Applicant: YUM CONNECT, LLC, Louisville, KY (US)

(72) Inventors: Antonio Michael Cittadino, Appleton, WI (US); Mark Edwin Peters, New London, WI (US); Lenox Gregory Wilson, Alpharetta, GA (US); Roy J. Rozek, Neenah, WI (US); Erik Lips, Greenville, WI (US)

(73) Assignee: Yum Connect, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,999

(22) Filed: Feb. 27, 2024

(65) Prior Publication Data

US 2024/0199251 A1 Jun. 20, 2024

Related U.S. Application Data

(63) Continuation of application No. 17/976,884, filed on Oct. 31, 2022, now Pat. No. 11,958,652, which is a
(Continued)

(51) Int. Cl.
*B65B 7/16* (2006.01)
*B29C 65/00* (2006.01)
(Continued)

(52) U.S. Cl.
CPC .......... *B65B 7/164* (2013.01); *B29C 65/7817* (2013.01); *B29C 66/53461* (2013.01);
(Continued)

(58) Field of Classification Search
CPC ......... B65B 7/164; B65B 41/18; B65B 61/26; B29C 65/7817; B29C 66/53461; B29C 66/849; B29C 66/98
See application file for complete search history.

(56) References Cited

U.S. PATENT DOCUMENTS 3,279,652 A 10/1966 Willvonseder
3,286,437 A * 11/1966 Cole ...................... B29C 65/18
53/329.3
(Continued)

FOREIGN PATENT DOCUMENTS

AU 4813793 A 5/1995
AU 2012254875 A1 6/2013
(Continued)

OTHER PUBLICATIONS

"Arby's medias on Instagram;" Picgra.; retrieved on Mar. 8, 2019, from https://picgra.com/location/arby-s/5760301.
(Continued)

*Primary Examiner* — Lucas E. A. Palmer
(74) *Attorney, Agent, or Firm* — Foley & Lardner LLP

(57) ABSTRACT

An apparatus may include a film support roller supporting a film roll and a housing that may include a sealing portion having an aperture sized to receive a top portion of a container. The housing may define a film path leading from the film roll to the sealing portion. A guide support assembly may have a ramp and at least one guide truss positioned along the film path. The ramp and the guide truss may guide the film across the aperture within the sealing portion, covering the aperture. The motor may advance the film along the film path. The heating element may emanate energy. The controller may cause the motor to advance the
(Continued)

film onto the ramp and cause the heating element to emanate energy to cause the film to seal the top portion of the container.

11 Claims, 29 Drawing Sheets

Related U.S. Application Data continuation of application No. 16/701,453, filed on Dec. 3, 2019, now Pat. No. 11,548,667, which is a continuation of application No. 16/700,164, filed on Dec. 2, 2019, now Pat. No. 11,472,579.

(60) Provisional application No. 62/848,735, filed on May 16, 2019, provisional application No. 62/775,227, filed on Dec. 4, 2018.

(51) Int. Cl.
*B29C 65/78* (2006.01)
*B65B 41/18* (2006.01)
*B65B 51/10* (2006.01)
*B65B 57/02* (2006.01)
*B65B 61/26* (2006.01)
*B29L 31/00* (2006.01)

(52) U.S. Cl.
CPC ............ *B29C 66/849* (2013.01); *B29C 66/98* (2013.01); *B65B 41/18* (2013.01); *B65B 51/10* (2013.01); *B65B 57/02* (2013.01); *B65B 61/26* (2013.01); *B29L 2031/7132* (2013.01)

(56) References Cited

U.S. PATENT DOCUMENTS

| | | | |
|---|---|---|---|
| 3,652,363 A * | 3/1972 | Kinslow, Jr. ...... B29C 66/53461 | |
| | | | 156/367 |
| 3,672,113 A | 6/1972 | Andra | |
| 3,706,175 A | 12/1972 | Anderson | |
| 3,716,963 A * | 2/1973 | Amberg .............. B29C 65/7451 | |
| | | | 53/329.2 |
| 3,726,453 A | 4/1973 | Shaffer et al. | |
| 3,838,805 A * | 10/1974 | Amberg ............ B29C 66/24221 | |
| | | | 53/329.2 |
| 3,844,444 A | 10/1974 | Carroll | |
| 3,861,983 A | 1/1975 | Harrell | |
| 3,979,877 A | 9/1976 | Vetter | |
| 4,007,577 A * | 2/1977 | Matthews ............. B65B 43/265 | |
| | | | 53/374.3 |
| 4,035,987 A | 7/1977 | Nakazato | |
| 4,050,971 A | 9/1977 | Verkins | |
| 4,092,817 A * | 6/1978 | Rist, III .............. B29C 65/7451 | |
| | | | 220/709 |
| 4,134,248 A * | 1/1979 | Freeman ............. B29C 65/7841 | |
| | | | 53/298 |
| 4,184,310 A | 1/1980 | Shelby | |
| 4,345,412 A | 8/1982 | Balzer et al. | |
| 4,354,408 A | 10/1982 | Carte | |
| 4,492,345 A | 1/1985 | Bakker | |
| 4,566,250 A | 1/1986 | Matsumura | |
| 4,590,975 A | 5/1986 | Credle, Jr. | |
| 4,618,073 A | 10/1986 | Bartfield | |
| 4,625,498 A | 12/1986 | Parsons | |
| 4,936,100 A | 6/1990 | Leppa | |
| 4,944,337 A | 7/1990 | Credle, Jr. et al. | |
| 5,041,070 A | 8/1991 | Blaser | |
| 5,042,351 A | 8/1991 | Rosenthal | |
| 5,205,476 A | 4/1993 | Sorenson | |
| 5,221,040 A | 6/1993 | Sorenson | |
| 5,249,410 A * | 10/1993 | Bakker ................. B29C 66/849 | |
| | | | 53/329.3 |
| D343,432 S | 1/1994 | Fekete et al. | |
| 5,277,646 A | 1/1994 | Fekete et al. | |
| D345,399 S | 3/1994 | Fekete et al. | |
| D345,400 S | 3/1994 | Fekete et al. | |
| D349,136 S | 7/1994 | Fekete et al. | |
| 5,332,147 A | 7/1994 | Sorenson | |
| 5,390,711 A | 2/1995 | Murphey | |
| 5,507,579 A | 4/1996 | Sorenson | |
| 5,511,360 A | 4/1996 | Bakker | |
| 5,577,370 A * | 11/1996 | Pajak ...................... B65B 7/164 | |
| | | | 53/329.3 |
| 5,727,609 A | 3/1998 | Knight et al. | |
| 5,993,942 A | 11/1999 | Bakker | |
| 6,021,629 A | 2/2000 | Sterner, Sr. | |
| RE36,876 E | 9/2000 | Daniels | |
| 6,112,539 A | 9/2000 | Colberg | |
| 6,201,629 B1 | 3/2001 | Mcclelland et al. | |
| 6,219,996 B1 | 4/2001 | Searle | |
| 6,282,869 B1 | 9/2001 | Bullock | |
| 6,291,037 B1 | 9/2001 | Bakker | |
| 6,334,109 B1 | 12/2001 | Kanevsky | |
| 6,351,928 B2 | 3/2002 | Torre | |
| 6,355,290 B1 | 3/2002 | Soehnlen | |
| 6,564,846 B1 | 5/2003 | Ribi | |
| 6,577,407 B1 | 6/2003 | Kopecki | |
| 6,578,475 B1 | 6/2003 | Siedlaczek | |
| 6,597,969 B2 | 7/2003 | Greenwald | |
| 6,601,760 B1 | 8/2003 | Nardozzi | |
| 6,646,659 B1 | 11/2003 | Brown | |
| 6,739,109 B1 * | 5/2004 | Fan ........................ B65B 7/2878 | |
| | | | 53/329.3 |
| 6,739,773 B2 | 5/2004 | Spano | |
| 6,775,472 B2 | 8/2004 | Bakker | |
| 6,793,755 B2 | 9/2004 | Schaupp | |
| 6,802,919 B2 | 10/2004 | Massey | |
| 6,811,080 B1 | 11/2004 | Gold | |
| 6,859,215 B1 | 2/2005 | Brown | |
| 6,881,380 B1 | 4/2005 | Mootz | |
| 6,910,313 B2 | 6/2005 | De Cardenas | |
| 6,941,980 B2 | 9/2005 | Rocchio | |
| 6,961,710 B1 | 11/2005 | Yanagisawa | |
| 7,040,566 B1 * | 5/2006 | Rodrian ............. A47K 10/3845 | |
| | | | 242/564.2 |
| 7,050,938 B1 | 5/2006 | Prater | |
| 7,061,379 B2 * | 6/2006 | Chen .................. G08B 13/2462 | |
| | | | 235/383 |
| 7,070,250 B2 | 7/2006 | Lester | |
| 7,089,718 B2 | 8/2006 | Biba | |
| 7,110,964 B2 | 9/2006 | Tengler | |
| 7,123,375 B2 | 10/2006 | Nobutani | |
| 7,124,098 B2 | 10/2006 | Hopson | |
| 7,126,716 B1 | 10/2006 | Kaufman | |
| 7,133,939 B1 | 11/2006 | Desai | |
| 7,182,007 B2 | 2/2007 | Berge | |
| 7,204,069 B2 | 4/2007 | Liao | |
| 7,222,470 B2 | 5/2007 | Ribi | |
| 7,297,969 B1 | 11/2007 | Wolinsky | |
| 7,308,916 B2 | 12/2007 | Akuzawa | |
| 7,344,070 B2 | 3/2008 | Nobutani | |
| 7,370,455 B2 | 5/2008 | Dewey | |
| 7,395,645 B2 | 7/2008 | Biba | |
| 7,401,445 B2 | 7/2008 | Bausch | |
| 7,404,349 B1 | 7/2008 | Fiske | |
| 7,424,443 B2 | 9/2008 | Yanagisawa | |
| 7,460,252 B2 | 12/2008 | Campbell | |
| 7,484,345 B2 | 2/2009 | Woods | |
| 7,510,756 B2 | 3/2009 | Ribi | |
| 7,533,604 B2 | 5/2009 | Halliday | |
| 7,563,339 B2 | 7/2009 | Gill | |
| 7,580,146 B2 | 8/2009 | Halsema | |
| 7,603,827 B2 | 10/2009 | Boyer, Jr. | |
| 7,610,736 B2 | 11/2009 | Von Seggern | |
| 7,644,744 B2 | 1/2010 | Fan | |
| 7,647,249 B2 | 1/2010 | Shroff | |
| 7,648,067 B2 | 1/2010 | Nobutani | |
| 7,689,461 B2 | 3/2010 | Minowa | |
| 7,726,599 B2 * | 6/2010 | Lewis ................. A47K 10/3845 | |
| | | | 242/563.2 |
| 7,752,146 B2 | 7/2010 | Lert, Jr. | |
| 7,757,896 B2 | 7/2010 | Carpenter | |

(56) References Cited

U.S. PATENT DOCUMENTS

| | | | |
|---|---|---|---|
| 7,762,181 B2 | 7/2010 | Boland | |
| 7,774,096 B2 * | 8/2010 | Goerg | A47K 10/3662 |
| | | | 700/244 |
| 7,819,489 B2 | 10/2010 | Gambino | |
| 7,908,778 B1 | 3/2011 | Dushane | |
| 7,913,879 B2 | 3/2011 | Carpenter | |
| 7,934,532 B2 | 5/2011 | Ribi | |
| 8,033,452 B2 | 10/2011 | Koakutsu | |
| 8,075,726 B2 | 12/2011 | Nakaya | |
| 8,098,408 B2 | 1/2012 | Sawada | |
| 8,162,181 B2 | 4/2012 | Carpenter | |
| 8,164,785 B2 | 4/2012 | Ferlitsch | |
| 8,175,739 B2 | 5/2012 | Floeder | |
| 8,201,904 B2 | 6/2012 | Vesanto | |
| 8,215,544 B2 | 7/2012 | Koakutsu | |
| 8,224,700 B2 | 7/2012 | Silver | |
| 8,249,946 B2 | 8/2012 | Froseth | |
| 8,264,725 B1 | 9/2012 | Pillutla | |
| 8,266,869 B1 | 9/2012 | Liu | |
| 8,297,471 B2 | 10/2012 | Dooley et al. | |
| 8,327,608 B2 | 12/2012 | Ebitz | |
| 8,381,497 B2 | 2/2013 | Scheibel | |
| 8,445,104 B2 | 5/2013 | Vigunas | |
| 8,453,879 B2 | 6/2013 | Carpenter | |
| 8,459,542 B2 | 6/2013 | Koakutsu | |
| D686,914 S | 7/2013 | Harvey et al. | |
| D686,915 S | 7/2013 | Harvey et al. | |
| 8,498,899 B2 | 7/2013 | Martucci | |
| 8,505,593 B1 | 8/2013 | Denise | |
| 8,537,399 B2 | 9/2013 | Chackalackal | |
| 8,544,245 B2 | 10/2013 | Ehrmann | |
| 8,565,916 B2 | 10/2013 | Zhang | |
| 8,607,534 B2 | 12/2013 | Muehlemann | |
| 8,616,258 B2 | 12/2013 | Ribi | |
| 8,739,840 B2 | 6/2014 | Mattos, Jr. | |
| 8,757,222 B2 | 6/2014 | Rudick | |
| 8,757,479 B2 | 6/2014 | Clark | |
| 8,770,428 B2 | 7/2014 | Brauer | |
| 8,800,252 B2 | 8/2014 | Vodonos | |
| 8,807,393 B2 | 8/2014 | Carpenter | |
| 8,814,042 B2 | 8/2014 | Irudayam | |
| 8,839,910 B2 | 9/2014 | Tanaka | |
| 8,844,250 B2 | 9/2014 | Nemkov | |
| 8,861,016 B2 | 10/2014 | Kodama | |
| 8,867,087 B2 | 10/2014 | Takagi | |
| 8,869,496 B2 | 10/2014 | Laumer | |
| 8,873,096 B2 | 10/2014 | Nishimura | |
| 8,887,992 B2 | 11/2014 | Koakutsu | |
| 8,888,492 B2 | 11/2014 | Riscalla | |
| 8,897,820 B2 | 11/2014 | Marovets | |
| 8,913,284 B2 | 12/2014 | Nishimura | |
| 8,919,233 B2 * | 12/2014 | Lewis | A47K 10/3625 |
| | | | 83/649 |
| 8,928,925 B2 | 1/2015 | Komiyama | |
| 8,943,784 B2 | 2/2015 | Iseki | |
| 8,944,583 B2 | 2/2015 | Waschnig | |
| 9,030,685 B2 | 5/2015 | Shima | |
| 9,056,704 B2 | 6/2015 | Carvin | |
| 9,067,775 B2 | 6/2015 | Mattos, Jr. | |
| 9,073,681 B2 | 7/2015 | Huels | |
| 9,096,337 B2 | 8/2015 | Maccagnani | |
| 9,117,326 B2 | 8/2015 | Cerveny | |
| 9,129,206 B2 | 9/2015 | Furuhata | |
| 9,132,929 B2 | 9/2015 | Nash | |
| 9,141,562 B2 | 9/2015 | Pickett | |
| 9,156,279 B2 | 10/2015 | Shima | |
| 9,159,094 B2 | 10/2015 | Hurst | |
| 9,180,987 B2 | 11/2015 | Grimm | |
| 9,221,275 B2 | 12/2015 | Till | |
| 9,221,565 B2 | 12/2015 | Wilcox | |
| 9,224,275 B2 | 12/2015 | Nishimura | |
| 9,226,513 B2 | 1/2016 | Ream | |
| 9,227,830 B2 | 1/2016 | Angus | |
| 9,242,754 B2 | 1/2016 | Masuda | |
| 9,248,947 B2 | 2/2016 | Georgelos | |
| 9,272,534 B2 | 3/2016 | Domeier | |
| 9,280,305 B2 | 3/2016 | Takasu | |
| 9,280,690 B2 | 3/2016 | Furukawa | |
| 9,302,463 B2 | 4/2016 | Heidrich | |
| 9,320,373 B2 | 4/2016 | Burke et al. | |
| 9,361,550 B2 | 6/2016 | Barros | |
| 9,372,644 B2 | 6/2016 | Srinivasmurthy | |
| 9,375,927 B1 | 6/2016 | Perego | |
| 9,406,084 B2 | 8/2016 | Havas | |
| 9,428,329 B2 | 8/2016 | Trombetta | |
| 9,434,596 B2 | 9/2016 | Carpenter | |
| 9,457,378 B2 | 10/2016 | Morselli | |
| 9,463,616 B2 | 10/2016 | Domeier | |
| 9,538,877 B2 | 1/2017 | Roberts | |
| 9,550,596 B2 | 1/2017 | Sawada | |
| 9,585,719 B2 | 3/2017 | Goldstein | |
| 9,591,078 B2 | 3/2017 | Nishimura | |
| 9,676,207 B2 | 6/2017 | Balar et al. | |
| 9,676,504 B2 | 6/2017 | Minnette | |
| 9,680,779 B2 | 6/2017 | Marovets | |
| 9,689,601 B2 | 6/2017 | Hsu | |
| 9,701,530 B2 | 7/2017 | Kline | |
| 9,724,948 B2 | 8/2017 | Silbert | |
| 9,731,514 B2 | 8/2017 | Eliav | |
| 9,764,863 B2 | 9/2017 | Huels | |
| 9,766,848 B2 | 9/2017 | Shima | |
| 9,815,579 B2 | 11/2017 | Larsson | |
| 9,821,922 B2 | 11/2017 | Haimi | |
| 9,824,382 B2 | 11/2017 | Holman | |
| 9,830,764 B1 | 11/2017 | Murphy | |
| 9,845,574 B2 | 12/2017 | Bomstad | |
| 9,850,015 B2 | 12/2017 | Hayashi | |
| 9,865,023 B2 | 1/2018 | Insolia | |
| 9,919,819 B2 | 3/2018 | Scolaro | |
| 9,957,081 B2 | 5/2018 | Gayer | |
| 9,963,291 B2 | 5/2018 | Karles | |
| 9,988,201 B2 | 6/2018 | Darin et al. | |
| 9,994,340 B2 | 6/2018 | Angus | |
| 10,010,926 B2 | 7/2018 | Billings | |
| 10,019,864 B2 | 7/2018 | Tomkins et al. | |
| 10,021,874 B2 | 7/2018 | Clark | |
| 10,029,836 B2 | 7/2018 | Danenberg | |
| 10,029,904 B2 | 7/2018 | Carpenter | |
| 10,032,201 B2 | 7/2018 | Hurst | |
| 10,035,643 B2 | 7/2018 | Holman | |
| 10,045,668 B2 * | 8/2018 | Green | A47K 10/424 |
| 10,051,874 B2 | 8/2018 | Carmichael | |
| 10,053,280 B2 | 8/2018 | Holman | |
| 10,059,473 B2 | 8/2018 | Volby | |
| 10,059,498 B2 | 8/2018 | Barton | |
| 10,086,602 B2 | 10/2018 | Vilas Boas | |
| 10,086,964 B2 | 10/2018 | Thring | |
| 10,089,669 B2 | 10/2018 | Hurst | |
| 10,106,282 B2 | 10/2018 | Daniel | |
| 10,115,142 B2 | 10/2018 | Holman | |
| 10,124,614 B1 | 11/2018 | Leo et al. | |
| 10,144,225 B2 | 12/2018 | Koers | |
| 10,144,541 B2 | 12/2018 | Rea | |
| 10,152,841 B2 | 12/2018 | Rendell | |
| 10,176,505 B2 | 1/2019 | Holman | |
| 10,196,184 B2 | 2/2019 | Keller | |
| 10,226,058 B2 | 3/2019 | Ingold | |
| 10,252,545 B2 | 4/2019 | Koers | |
| 10,262,352 B2 | 4/2019 | Holman | |
| 10,269,052 B2 | 4/2019 | Shinkle, II | |
| 10,279,600 B2 | 5/2019 | Gertlowski | |
| 10,286,684 B2 | 5/2019 | Schach | |
| 10,287,039 B2 | 5/2019 | Heyn | |
| 10,308,398 B2 | 6/2019 | Miller | |
| 10,315,809 B2 | 6/2019 | Shinozaki | |
| 10,346,899 B2 | 7/2019 | Holman | |
| 10,354,258 B2 | 7/2019 | Marovets | |
| 10,384,922 B2 | 8/2019 | Carpenter | |
| 10,414,529 B1 | 9/2019 | Bayer | |
| 10,464,360 B2 | 11/2019 | Silbert | |
| 10,492,626 B2 | 12/2019 | Auda | |
| 10,496,961 B2 | 12/2019 | Ophardt | |
| 2001/0052219 A1 | 12/2001 | Fan | |
| 2002/0004749 A1 | 1/2002 | Froseth | |

(56) References Cited

U.S. PATENT DOCUMENTS

| | | | |
|---|---|---|---|
| 2002/0029855 A1* | 3/2002 | Vasilakes | B65B 51/067 156/530 |
| 2002/0032582 A1 | 3/2002 | Feeney | |
| 2002/0174025 A1 | 11/2002 | Hind | |
| 2003/0012920 A1 | 1/2003 | Bakker | |
| 2003/0014305 A1 | 1/2003 | Harden | |
| 2003/0015274 A1 | 1/2003 | Mallman | |
| 2003/0019188 A1 | 1/2003 | Biba | |
| 2003/0021969 A1 | 1/2003 | Aloisi | |
| 2003/0026602 A1 | 2/2003 | Bakker et al. | |
| 2003/0033915 A1 | 2/2003 | Glemser | |
| 2003/0061922 A1* | 4/2003 | Biba | B65B 7/167 83/13 |
| 2003/0065565 A1 | 4/2003 | Wagner | |
| 2003/0074254 A1 | 4/2003 | Iijima | |
| 2003/0080005 A1 | 5/2003 | Toussant et al. | |
| 2003/0110083 A1 | 6/2003 | Taylor | |
| 2003/0182154 A1 | 9/2003 | Myers | |
| 2003/0200725 A1 | 10/2003 | Aloisi | |
| 2003/0228964 A1* | 12/2003 | Biba | B65H 23/048 493/81 |
| 2004/0020171 A1* | 2/2004 | Biba | B29C 66/652 53/476 |
| 2004/0020172 A1* | 2/2004 | Biba | B65H 23/16 53/329.3 |
| 2004/0031242 A1 | 2/2004 | Cerf | |
| 2004/0031243 A1 | 2/2004 | Aloisi | |
| 2004/0035088 A1* | 2/2004 | Loeffler | B29C 65/1483 53/329.2 |
| 2004/0045257 A1* | 3/2004 | Bakker | B29C 65/66 53/329.2 |
| 2004/0068968 A1* | 4/2004 | Biba | B26F 1/3846 53/557 |
| 2004/0093250 A1 | 5/2004 | Hasegawa | |
| 2004/0105126 A1 | 6/2004 | Minowa | |
| 2004/0158499 A1 | 8/2004 | Dev | |
| 2004/0182503 A1 | 9/2004 | Stadele | |
| 2004/0210488 A1 | 10/2004 | Doherty | |
| 2004/0238555 A1 | 12/2004 | Parks | |
| 2004/0267544 A1 | 12/2004 | Michelson | |
| 2005/0006449 A1 | 1/2005 | D'Amato | |
| 2005/0015256 A1 | 1/2005 | Kargman | |
| 2005/0021407 A1 | 1/2005 | Kargman | |
| 2005/0075934 A1 | 4/2005 | Knight | |
| 2005/0102179 A1 | 5/2005 | Caplinger | |
| 2005/0237556 A1 | 10/2005 | Watkins | |
| 2005/0242178 A1 | 11/2005 | Minowa | |
| 2005/0247173 A1 | 11/2005 | Alsten | |
| 2005/0274092 A1 | 12/2005 | Rohret | |
| 2005/0275894 A1 | 12/2005 | Minowa | |
| 2006/0010137 A1 | 1/2006 | Johnson | |
| 2006/0081653 A1 | 4/2006 | Boland | |
| 2006/0089881 A1 | 4/2006 | Landry | |
| 2006/0155600 A1 | 7/2006 | Mays | |
| 2006/0162284 A1 | 7/2006 | Nakagawa et al. | |
| 2006/0178986 A1 | 8/2006 | Giordano | |
| 2006/0222429 A1 | 10/2006 | Kurashina | |
| 2006/0244989 A1 | 11/2006 | Evans | |
| 2007/0056871 A1 | 3/2007 | Griffiths | |
| 2007/0094087 A1 | 4/2007 | Mitchell | |
| 2007/0150371 A1 | 6/2007 | Gangji | |
| 2007/0150996 A1 | 7/2007 | Mccarville | |
| 2007/0157559 A1 | 7/2007 | Till | |
| 2007/0221728 A1 | 9/2007 | Ferro | |
| 2008/0048012 A1 | 2/2008 | Liou | |
| 2008/0052158 A1 | 2/2008 | Ferro | |
| 2008/0052173 A1 | 2/2008 | Liou | |
| 2008/0140500 A1 | 6/2008 | Kurkure | |
| 2008/0164274 A1 | 7/2008 | Stettes | |
| 2008/0278750 A1 | 11/2008 | Lehotsky | |
| 2008/0295659 A1* | 12/2008 | Tobin | B65H 23/032 83/13 |
| 2009/0049804 A1 | 2/2009 | Choi | |
| 2009/0066996 A1 | 3/2009 | Minowa | |
| 2009/0204883 A1 | 8/2009 | Talanis | |
| 2009/0287568 A1 | 11/2009 | Cesmedziev | |
| 2010/0161521 A1 | 6/2010 | Friend | |
| 2010/0223888 A1* | 9/2010 | Aarts | B65B 7/02 53/139.1 |
| 2010/0237091 A1 | 9/2010 | Garson | |
| 2010/0250234 A1 | 9/2010 | Azimi | |
| 2010/0325000 A1 | 12/2010 | Teraoka | |
| 2011/0006074 A1 | 1/2011 | Machers | |
| 2011/0041464 A1 | 2/2011 | Park | |
| 2011/0049180 A1 | 3/2011 | Carpenter | |
| 2011/0072764 A1 | 3/2011 | Daniek | |
| 2011/0264284 A1 | 10/2011 | Rudick | |
| 2011/0315706 A1 | 12/2011 | Lockwood | |
| 2012/0012604 A1 | 1/2012 | Pfister | |
| 2012/0084154 A1 | 4/2012 | Dresner | |
| 2012/0207887 A1 | 8/2012 | Battersby et al. | |
| 2012/0239683 A1 | 9/2012 | Starkman | |
| 2012/0285986 A1 | 11/2012 | Irvin | |
| 2012/0290412 A1 | 11/2012 | Marovets | |
| 2012/0306987 A1 | 12/2012 | Kim | |
| 2013/0054016 A1 | 2/2013 | Canter | |
| 2013/0054695 A1 | 2/2013 | Holman | |
| 2013/0146652 A1 | 6/2013 | Koakutsu | |
| 2013/0215055 A1 | 8/2013 | Okuma | |
| 2014/0000217 A1 | 1/2014 | Granili | |
| 2014/0012706 A1 | 1/2014 | Foerster | |
| 2014/0022576 A1 | 1/2014 | Shima | |
| 2014/0041748 A1 | 2/2014 | Angus | |
| 2014/0080102 A1 | 3/2014 | Krishna | |
| 2014/0092422 A1 | 4/2014 | Shima | |
| 2014/0149937 A1 | 5/2014 | Holliday | |
| 2014/0156361 A1 | 6/2014 | Hughes | |
| 2014/0165502 A1 | 6/2014 | Wah | |
| 2014/0183084 A1 | 7/2014 | Brebion | |
| 2014/0201094 A1 | 7/2014 | Herrington | |
| 2014/0214561 A1 | 7/2014 | Butler | |
| 2014/0244526 A1 | 8/2014 | Georges | |
| 2014/0261858 A1 | 9/2014 | Mattos, Jr. | |
| 2014/0272020 A1 | 9/2014 | Wilson | |
| 2014/0290181 A1 | 10/2014 | Edwards | |
| 2014/0293297 A1 | 10/2014 | Nagahara | |
| 2014/0312104 A1 | 10/2014 | Kim et al. | |
| 2015/0034661 A1 | 2/2015 | Cooper | |
| 2015/0083727 A1 | 3/2015 | Smolko | |
| 2015/0114923 A1 | 4/2015 | Horz | |
| 2015/0181923 A1 | 7/2015 | Holman | |
| 2015/0183534 A1 | 7/2015 | Holman | |
| 2015/0185974 A1 | 7/2015 | Holman | |
| 2015/0186966 A1 | 7/2015 | Holman | |
| 2015/0186968 A1 | 7/2015 | Holman | |
| 2015/0186969 A1 | 7/2015 | Holman | |
| 2015/0186970 A1 | 7/2015 | Holman | |
| 2015/0186971 A1 | 7/2015 | Holman | |
| 2015/0186981 A1 | 7/2015 | Holman | |
| 2015/0187026 A1 | 7/2015 | Holman | |
| 2016/0023471 A1 | 1/2016 | Jeter | |
| 2016/0201347 A1 | 7/2016 | Lala | |
| 2016/0264348 A1 | 9/2016 | Camera | |
| 2016/0267567 A1 | 9/2016 | Shinkle, II | |
| 2016/0267816 A1 | 9/2016 | Anderson | |
| 2016/0304226 A1 | 10/2016 | Rossini | |
| 2016/0355282 A1* | 12/2016 | Valli | B65B 31/028 |
| 2016/0355291 A1 | 12/2016 | Mahar et al. | |
| 2016/0361886 A1 | 12/2016 | Suzuki et al. | |
| 2017/0011319 A1 | 1/2017 | Elliot | |
| 2017/0029145 A1 | 2/2017 | Volby | |
| 2017/0032448 A1 | 2/2017 | Kitajima | |
| 2017/0035183 A1 | 2/2017 | Faverio | |
| 2017/0043305 A1 | 2/2017 | Igarashi | |
| 2017/0043943 A1 | 2/2017 | Lamb | |
| 2017/0087793 A1 | 3/2017 | Mark | |
| 2017/0121044 A1 | 5/2017 | Castellari | |
| 2017/0190474 A1 | 7/2017 | Miller | |
| 2017/0197741 A1 | 7/2017 | Carvin | |
| 2017/0210498 A1 | 7/2017 | Jenkins | |
| 2017/0210553 A1 | 7/2017 | Burress | |
| 2017/0224142 A1 | 8/2017 | Darin et al. | |
| 2017/0283101 A1* | 10/2017 | Gorbatenko | B65B 51/10 |

(56) References Cited

U.S. PATENT DOCUMENTS

| | | |
|---|---|---|
| 2017/0283102 A1 | 10/2017 | Strauch |
| 2017/0291746 A1 | 10/2017 | Darin et al. |
| 2017/0305585 A1 | 10/2017 | Rizzi |
| 2017/0305586 A1 | 10/2017 | Rizzi |
| 2017/0310848 A1 | 10/2017 | Iwahara |
| 2017/0325482 A1 | 11/2017 | Deng |
| 2017/0365017 A1 | 12/2017 | Ells |
| 2018/0000266 A1 | 1/2018 | Hulseman et al. |
| 2018/0016038 A1 | 1/2018 | Herlin |
| 2018/0016047 A1* | 1/2018 | Miyamoto ............. B65B 51/26 |
| 2018/0068515 A1 | 3/2018 | Edwards |
| 2018/0099806 A1 | 4/2018 | Li |
| 2018/0108096 A1 | 4/2018 | Insolia |
| 2018/0197163 A1 | 7/2018 | Kelly |
| 2018/0200906 A1 | 7/2018 | Senoo |
| 2018/0215488 A1 | 8/2018 | Sebastian et al. |
| 2018/0218562 A1 | 8/2018 | Conway |
| 2018/0250970 A1 | 9/2018 | Silbert |
| 2018/0253263 A1 | 9/2018 | Hower |
| 2018/0300785 A1 | 10/2018 | Hurst |
| 2018/0312288 A1 | 11/2018 | Höpner |
| 2018/0334275 A1 | 11/2018 | Haupt |
| 2018/0338509 A1 | 11/2018 | Carmichael |
| 2018/0345619 A1 | 12/2018 | Lang |
| 2019/0084266 A1 | 3/2019 | Grünwald |
| 2019/0100339 A1 | 4/2019 | Tanoue |
| 2019/0108708 A1 | 4/2019 | Rendell |
| 2019/0174933 A1 | 6/2019 | Auda |
| 2019/0180392 A1 | 6/2019 | Auda |
| 2019/0182390 A1 | 6/2019 | Auda |
| 2019/0193891 A1 | 6/2019 | Livesley-james |
| 2019/0200799 A1 | 7/2019 | Meshulam |
| 2019/0291407 A1 | 9/2019 | Schwartzburg |
| 2020/0171760 A1 | 6/2020 | Cittadino et al. |
| 2020/0172272 A1* | 6/2020 | Cittadino ............ B29C 65/1483 |
| 2020/0268173 A1 | 8/2020 | Auda |
| 2021/0292016 A1* | 9/2021 | Peters .................. B29C 66/841 |

FOREIGN PATENT DOCUMENTS

| | | |
|---|---|---|
| AU | 2015329971 A1 | 4/2017 |
| AU | 2015329972 A1 | 4/2017 |
| AU | 2017224048 A1 | 8/2018 |
| CA | 2681759 A1 | 10/2008 |
| CA | 2865589 A1 | 9/2013 |
| CA | 2865590 A1 | 9/2013 |
| CA | 3047440 A1 | 4/2016 |
| CA | 3047441 A1 | 4/2016 |
| CA | 2964046 A1 | 5/2016 |
| CA | 2871876 C | 12/2017 |
| CA | 2983472 C | 6/2018 |
| CA | 2964930 C | 7/2018 |
| CA | 3006133 C | 10/2019 |
| CN | 1924787 A | 3/2007 |
| CN | 201296476 Y | 8/2009 |
| CN | 201301001 Y | 9/2009 |
| CN | 201424140 Y | 3/2010 |
| CN | 102915601 A | 2/2013 |
| CN | 103679362 A | 3/2014 |
| CN | 204197427 U | 3/2015 |
| CN | 105046339 A | 11/2015 |
| CN | 105163927 A | 12/2015 |
| CN | 104443487 B | 4/2016 |
| CN | 10432612 B | 8/2016 |
| CN | 205418267 U | 8/2016 |
| CN | 104326122 B | 2/2017 |
| CN | 205998190 U | 3/2017 |
| CN | 107804499 A | 3/2018 |
| CN | 108021995 A | 5/2018 |
| EP | 0719227 B1 | 1/1999 |
| EP | 2605909 B1 | 1/2014 |
| EP | 3204210 A1 | 8/2017 |
| EP | 3204211 A1 | 8/2017 |
| EP | 3377325 A1 | 9/2018 |
| EP | 2762317 B1 | 3/2019 |
| JP | S5854474 A | 3/1983 |
| JP | S60-077814 A | 5/1985 |
| JP | H06103285 A | 4/1994 |
| JP | 2001306666 A | 11/2001 |
| JP | 2002190068 A | 7/2002 |
| JP | 2003016529 A | 1/2003 |
| JP | 2005231716 A | 9/2005 |
| JP | 2006346869 A | 12/2006 |
| JP | 2007161336 A | 6/2007 |
| JP | 2009037341 A | 2/2009 |
| JP | 2014219855 A | 11/2014 |
| JP | 2015111390 A | 6/2015 |
| JP | 5867563 B2 | 1/2016 |
| JP | 5867564 B2 | 1/2016 |
| JP | 5867565 B2 | 1/2016 |
| JP | 5860841 B2 | 2/2016 |
| JP | 6077814 B2 | 2/2017 |
| JP | 6273815 B2 | 1/2018 |
| JP | 6390250 B2 | 8/2018 |
| KR | 930007681 A | 5/1993 |
| KR | 950005668 B1 | 5/1995 |
| KR | 19990011615 U | 3/1999 |
| KR | 20020074952 A | 10/2002 |
| KR | 200296194 Y1 | 11/2002 |
| KR | 20190036782 A | 4/2019 |
| MX | 2008011202 A | 9/2008 |
| MX | 2010008550 A | 9/2010 |
| MX | 2012012504 A | 1/2013 |
| MX | 2012012505 A | 1/2013 |
| MX | 2014010241 A | 12/2014 |
| MX | 2014010242 A | 12/2014 |
| MX | 347029 B | 4/2017 |
| MX | 348413 B | 6/2017 |
| MX | 2017005041 A | 7/2017 |
| WO | 9509766 A1 | 4/1995 |
| WO | 9929508 A1 | 6/1999 |
| WO | 03103930 A2 | 12/2003 |
| WO | 2011153610 A2 | 12/2011 |
| WO | 2012116823 A1 | 9/2012 |
| WO | 2016055598 A1 | 4/2016 |
| WO | 2016055599 A1 | 4/2016 |
| WO | 2016140197 A1 | 9/2016 |
| WO | 2017134431 A1 | 8/2017 |
| WO | 2017136771 A1 | 8/2017 |
| WO | 2017144314 A1 | 8/2017 |
| WO | 2017178228 A1 | 10/2017 |
| WO | 2017207131 A1 | 12/2017 |
| WO | 2018005294 A1 | 1/2018 |
| WO | 2017221077 A3 | 2/2018 |
| WO | 2018068869 A1 | 4/2018 |
| WO | 2018108361 A1 | 6/2018 |
| WO | 2018154378 A1 | 8/2018 |
| WO | 2018182114 A1 | 10/2018 |
| WO | 2019042600 A1 | 3/2019 |
| WO | 2019042686 A1 | 3/2019 |
| WO | 2019077524 A1 | 4/2019 |
| WO | 2019118479 A1 | 6/2019 |
| WO | 2019180320 A1 | 9/2019 |
| WO | 2020014183 A1 | 1/2020 |
| WO | 2020030932 A1 | 2/2020 |

OTHER PUBLICATIONS

"Fast Food Review: Roast Ham and Swiss Market Fresh Sandwich from Arby's;" posted Jun. 22, 2009; retrieved Mar. 8, 2019 from https://www.grubgrade.com/reviews/fast-food-review-roast-ham-and-swiss-market-fresh-sandwich-from-arbys/.

19Crimes; Living Wine Labels; retrieved on Mar. 4, 2019, from https://www.9crimes.com.

Arby's Wrapper obtained at least as early as Dec. 4, 2017; 3 pages.

Clean Step XTC Product website accessed at "http://www.cleanstep.pl/technologia" Mar. 10, 2021, 4 pages.

Cornelius A.B.S. Unit Operator's Manual, Retrieved from the Internet URL: https://www.manualslib.com/manual/1485020/Cornelius-A-B-S-Unit.html, 2 pages.

Extended European Search Report received for EP Application No. 22175058.1, mailed on Oct. 27, 2022, 6 pages.

(56) References Cited

OTHER PUBLICATIONS

Final office action for U.S. Appl. No. 17/110,955 mailed on Feb. 3, 2023, 14 pages.
Final office action received for U.S. Appl. No. 17/110,987, mailed on Feb. 3, 2023, 16 pages.
https://dailynews-india.com/environment-first-kfc-turns-printed-food-receipts-into-eco-friendly-napkins/, retrieved on Mar. 5, 2020.
International Preliminary Report on Patentability received for PCT Application No. PCT/US2018/064977, mailed on Jun. 25, 2020, 30 pages.
International Preliminary Report on Patentability received for PCT Application No. PCT/US2019/064122, mailed on Jun. 17, 2021, 19 pages.
International Search Report and Written opinion for PCT application No. PCT/US2019/064122, mailed on Aug. 28, 2020, 24 pages.
International Search Report and Written Opinion received for PCT Application No. PCT/IB2020/061544, mailed on Feb. 8, 2021, 13 pages.
International Search Report and Written Opinion received for PCT Application No. PCT/US2018/064977, mailed on May 7, 2019, 33 pages.
Introducing Nforme; retrieved on Mar. 4, 2019, from https://vimeo.com/305768354/a0a3a40a32?utm_campaign=nForme&utm_source=hs_email&utm_medium=email&utm_content=2&_hsenc=p2ANqtz-_WjXQoyWJwbD7Uo1G3aTzDRWPMz_u5qthtjbyF7QIvSirS2RppnS2JDzW4IsLcvcMO7Dyz9FexkR_jZVYproCT5aoP4w&_hsmi=2.

Invitation to Pay Additional Fee received for PCT Patent application No. PCT/US2019/064122, mailed on Mar. 12, 2020, 15 pages.
James, A.J., "Useful for places where you can't take your shoes off", accessed at "https://www.linkedin.com/posts/sayed-saif-pmp%C2%AE-837a063b_useful-for-places-where-you-cant-take-your-ugcPost-6770449686890332161-HHwD", retrieved on Mar. 10, 2021, 2 pages.
McDonalds New Equipment Evaluation—All Day Breakfast; retrieved on Mar. 4, 2019, from https://www.youtube.com/watch?v=CYKgiH9jeCY&feature=youtube.
Non-Final office action for U.S. Appl. No. 17/110,955 mailed on Jul. 25, 2022, 11 pages.
Non-Final office action received for U.S. Appl. No. 16/701,453 mailed on Nov. 23, 2021, 16 pages.
Non-Final office action received for U.S. Appl. No. 17/110,987, mailed on Aug. 5, 2022, 13 pages.
Non-Final office action received for U.S. Appl. No. 17/329,490, mailed on Jan. 24, 2024, 11 pages.
Non-Final office action received for U.S. Appl. No. 17/976,884, mailed on Jun. 30, 2023, 9 pages.
Quick Serve Restaurants (QSR); STAR Micronics; retrieved on Apr. 18, 2019, from https://www.starmicronics.com/pages/QuickServiceRestaurantsQSR.
U.S. Appl. No. 62/463,101, filed Feb. 24, 2017, entitled "Apparatus and Methods for Sealing Open-Topped Containers with Heat-Shrinking Film Material", 41 pages.
Foreign Action other than Search Report on EP 19828398.8 dtd Jan. 30, 2025.

\* cited by examiner

FILM SECURING APPARATUS AND METHOD

CROSS REFERENCE TO RELATED APPLICATIONS

This application is a continuation of U.S. application Ser. No. 17/976,884 filed Oct. 31, 2022, which claims priority to U.S. application Ser. No. 16/701,453, filed Dec. 3, 2019, now U.S. Pat. No. 11,548,667, which is a continuation of U.S. application Ser. No. 16/700,164, filed Dec. 2, 2019, now U.S. Pat. No. 11,472,579, which claims priority to U.S. Provisional Application No. 62/848,735, entitled "Film Securing Apparatus and Method", filed May 16, 2019, and to U.S. Provisional Application No. 62/775,227, entitled "Film Securing Apparatus and Method", filed Dec. 4, 2018, the contents of each being incorporated by reference herein in their entireties.

FIELD OF THE INVENTION

Example embodiments of the present invention generally relate to an apparatus and method of securing a film to a container to form a seal for the container.

BACKGROUND

A variety of systems to automatically secure lids and the like to containers are known. For example, a number of automatic sealers (e.g., lid sealing devices) are known in the beverage industry. However, many automatic sealers are poorly suited for user interaction without extensive training and review of laborious manuals. Further, such sealers are designed for industrial use and not well adaptable for commercial retail space, such as for individual use.

Another shortcoming associated with existing lid sealing devices relates to the limited ability of such systems to accommodate containers of alternate shapes, sizes, and materials. As such, known sealing devices are commonly tailored to operate with containers having only a single size and shape or a very limited deviation associated with the size and shape of the container. Furthermore, many sealers require containers of a particular material or the use of an adhesive to ensure proper securement of a lid to the container.

There is a need for a film securing (e.g., lid sealing) device that can be quickly and conveniently configured for use with containers having various sizes and shapes. Additionally, a need exists to improve the efficiency with which such securing devices can be manufactured, operated, and serviced as well as satisfy ever varying user demands associated with the production and presentation of the resultant sealed containers. There, thus, remains a continued need for an efficient and economic film securing apparatus and method. The presently disclosed subject matter satisfies these and other needs.

BRIEF SUMMARY

To achieve these and other advantages and in accordance with the purpose of the disclosed subject matter, as embodied herein and described, the disclosed subject matter includes systems, apparatuses, and methods related to example automatic sealing devices described herein.

Some example embodiments of the present invention provide a sealing apparatus and system that seals film from a supply of film (e.g., a roll of film) over the top of a container. Notably, the container may vary in size and shape, but may still be utilized with example sealing apparatuses. Further, the sealing apparatus may be automated and may simply require a user to position a top portion of a container (e.g., cup) into a sealing portion through an aperture. In response, the sealing apparatus may sense the presence of the cup and automatically seal a portion of film over the container—thereby providing an automatic seal. Some such example sealer devices provide a beneficial individual container sealer that can be quickly and easily employed by a user.

In some example embodiments, a portion of film may be cut and positioned within a loading zone in the sealing portion. A user may push the top of the container upwardly into the portion of the film. In response, heating element(s) may activate and cause the film to seal, such as through heat shrinkage to or around the top of the container to thereby form a sealed lid. In some cases, a shield plate may be positioned on the other side of the portion of the film, opposite the top of the container. A user may push the top of the container against the shield plate. A wall (e.g., a cylindrically shaped wall) may guide the film around the top of the container such that the application of heat from the heating element may form the sealed lid. In some cases, the shield plate may be movable within the sealing portion, with such movement triggering operation of the heating element (s). In this regard, a user may push the top of the container upwardly within the sealing portion to cause the shield plate to also move up—thereby initiating operation of the heating element(s) and sealing of the container.

Some example sealing apparatuses include various additional features that can be used in conjunction with sealing a lid to the container. For example, a motor may be configured to operate a drive roller to advance film from the roll of film to the loading zone.

In some embodiments, a printer may apply one or more messages or images to the film while being processed such that the messages/images appear on the lid of the container after the printed film is secured to the container. Such messages or images may be customized. In some embodiments, the sealing apparatus may be connected to a point-of-sale system and configured to provide a sealing lid for an ordered drink. In some such embodiments, information regarding the ordered drink may be printed on film that is used to form the sealing lid, such as an indication of what the drink is (e.g., a Cola) or who the drink belongs to (e.g., John's Cola).

In some embodiments, a piercer may apply one or more slits (or perforations) to the film such that the resulting lid includes a ventilation capability and/or enables insertion of a straw. Notably, in some embodiments, the piercer may be a single piece with one or more protrusions (e.g., tips, blades, etc.). For example, the piercer may have two more spaced apart protrusions that provide two or more spaced apart slits in the lid for improved ventilation and weakness (e.g., for easy straw insertion) with still providing desired leakage protection. In some embodiments, the piercer may be actuated more than once in different locations on the film to form two or more spaced apart slits.

In some embodiments, one or more sensors may be utilized to determine a desired distance to advance the film into the loading zone. Further, one or more cutters may be used to cut the film to provide the portion of the film inside the loading zone for use with sealing the lid on the container.

In some embodiments, one or more sensors may be used to read one or more markings and verify that an approved film is being utilized with the sealing apparatus. In this regard, there may be a desire to avoid usage of unauthorized rolls of film with the sealing apparatus, such as to avoid providing an unsatisfactory film or avoid potential maintenance issues. In some embodiments, the sealing apparatus may sense one or more markings on the film and confirm whether the film is approved for use with the scaling apparatus. If approved, various functions of the sealing apparatus may be enabled for use. If unapproved, various functions of the sealing apparatus may be disabled. Additionally, reports of the approved or unapproved film usage may be provided to a remote server for data generation and use (e.g., re-ordering, maintenance, etc.).

In some embodiments, the one or more markings may be read and used to provide information (e.g., characteristics) relevant to the installed film. For example, various characteristics of the film (e.g., thickness, pre-printed information, etc.) may be determined. Additionally or alternatively, various desired operational parameters of the scaling apparatus during use with the film (e.g., how long to activate the heating element(s), what to print on the film, whether or not to pierce the film, etc.) may be determined.

In some embodiments, depending on the desired configuration and the desired information to convey, the one or more markings may form marking schemes that utilize various marking characteristics (e.g., at least one of the color of the one or more markings, a width of the one or more markings, a length of the one or more markings, or a spacing between adjacent markings). Such a marking scheme may be repeated along the film to enable confirmation of an approved film and/or the additional information/data relevant to the film. Various types of markings are contemplated, including for example, lines, rectangular shaped markings, barcodes, quick response (QR) codes, etc.

Some additional embodiments include apparatuses, systems, and methods including various example embodiments, such as described herein.

In an example embodiment, an apparatus to secure a film to a container is provided. The apparatus comprises a body portion to house film and a securing head assembly. The securing head assembly includes a housing defining an aperture to receive at least a top portion of a container. The securing head assembly further includes a wall disposed within the housing. The wall has a width dimension sized to receive at least a top portion of a container. The securing head assembly further includes a shield plate movable within the aperture and wall between a first position and a second position. The securing head assembly further includes at least one heating element disposed within the housing and positioned external to the wall, wherein the at least one heating element is activated to emanate energy when the shield plate is in the second position. The securing head assembly further includes a sensor assembly to sense movement of the shield plate and to activate the at least one heating element when the shield plate is in the second position. The securing head assembly further includes a loading zone to receive a predetermined dimensioned film from the body portion. The loading zone is positioned adjacent the shield plate in the first position. A top portion of a container is movable within the aperture and wall to move the shield plate to the second position and to secure a predetermined dimensioned film to a top of a container by energy from the at least one heating element.

In some embodiments, the width dimension of the wall is at least as large a width dimension of the aperture.

In some embodiments, the wall is at least partially transparent or translucent to permit energy emanated from the at least one heating element through the wall.

In some embodiments, the apparatus further comprises at least one reflective device disposed within the housing and exterior to the wall. The at least one reflective device reflects at least a portion of energy emanated from the at least one heating element toward the wall. The at least one reflective device comprises at least one mirror having a first panel, a second panel, and a third panel. The first panel is disposed at a first angle relative to the second panel, and the third panel is disposed at a second angle relative to the second panel.

In some embodiments, the at least one heating element includes a plurality of heating elements. The plurality of heating elements are activated simultaneously when the shield plate is in the second position.

In some embodiments, the at least one heating element comprises a tungsten-halogen light bulb.

In some embodiments, the apparatus further comprises a sensor assembly having a signal emitter, a signal sensor, and a sensor flag therebetween. The sensor flag is coupled to the shield plate and the signal sensor detects a position of the sensor flag to activate the at least one heating element.

In some embodiments, the apparatus further comprises a securing portion, wherein the securing portion includes the securing head assembly, and a fan configured to cool the securing head assembly.

In some embodiments, the body portion comprises a drive nip having a drive roller and a pinch roller to progress film into the loading zone, wherein the pinch roller is adjustable in relation to the drive roller to insert film between the drive roller and the pinch roller. In some embodiments, the body portion further comprises a film support roller to support a length of film, wherein the drive roller rotates at a faster speed than the film support roller. In some embodiments, the body portion comprises a film sensor assembly having a film signal emitter and a film signal sensor to detect markers spaced at predetermined longitudinal distances along a length of film. In some embodiments, the housing further includes a guide support assembly having a ramp and a guide truss, the ramp being capable of receiving a film from the body portion and the guide truss capable of guiding a film to the loading zone. In some embodiments, the ramp has a surface extending from a first end to a second end, the surface oriented at an angle of inclination ranging up to 75 degrees, wherein the second end is coupled to a guide surface configured to receive a film from the surface of the ramp.

In some embodiments, the apparatus further comprises a guide assembly including an entry structure, wherein the entry structure comprises a funnel to receive a leading end of a film therethrough and to channel a leading end of a film into the loading zone.

In some embodiments, the body portion further comprises a piercer having an actuatable tip to pierce a film.

In some embodiments, the apparatus further comprises a printer to print on a film. In some embodiments, the apparatus further comprises a computer to receive at least one command, wherein the computer sends a signal to the printer to print a message associated with the at least one command when the at least one command is received.

In some embodiments, the wall is coupled to the shield plate and movable with the shield plate between the first and second positions.

In some embodiments, the wall is coupled to the housing, wherein the shield plate is movable with respect to the wall between the first position and the second position.

In some embodiments, the body portion comprises a film sensor assembly configured to detect one or more marking patterns along the film. The apparatus further includes a controller configured to: determine, based on sensor data from the film sensor assembly, if a detected marking pattern matches an approved marking pattern; and cause at least one of: in an instance in which the detected marking pattern matches an approved marking pattern, enabling operation of the apparatus or components of the apparatus; or in an instance in which the detected marking pattern does not match an approved marking pattern, disabling of operation of the apparatus or components of the apparatus.

In another example embodiments, a method of securing a film to a container is provided. The method comprises providing an apparatus having a body portion to house film and a securing head assembly. The securing head assembly includes a housing defining an aperture to receive at least a top portion of a container, a wall disposed within the housing, the wall having a width dimension sized to receive at least a top portion of a container, a shield plate movable within the aperture and wall between a first position and a second position, at least one heating element disposed within the housing and positioned external to the wall, wherein the at least one heating element is activated to emanate energy when the shield plate is in the second position, a sensor assembly to sense movement of the shield plate and to activate the at least one heating element when the shield plate is in the second position, and a loading zone to receive a predetermined dimensioned film from the body portion, the loading zone positioned adjacent the shield plate in the first position. The method further includes moving the top portion of the container to move the shield plate to the second position and to secure a predetermined dimensioned film to a top of the container by energy from the at least heating element.

In some embodiments, the at least one heating element includes a plurality of heating elements, and the method further comprises activating the plurality of heating elements simultaneously when the shield plate is in the second position.

In some embodiments, the method further comprises printing, by a printer operatively coupled to the body portion, on a length of film; and piercing, by a piercer having an actuatable tip, the film.

In some embodiments, the method further comprises progressing, by a nip having a drive roller and a pinch roller, the film into the loading zone.

In some embodiments, the method further comprises cutting, by a film cutter operatively coupled to the apparatus between the nip and the securing head assembly, a length of film from a film roll to form the predetermined dimensioned film.

In another example embodiment, an apparatus to secure a film to a container is provided. The apparatus comprises a securing head assembly including a housing defining an aperture to receive at least a top portion of a container. The housing includes a shield plate and at least one heating element disposed within the housing. The at least one heating element is configured to emanate energy when a container is in a predetermined position. The securing head assembly further includes a protective structure to surround the at least one heating element. The protective structure permits energy from the at least one heating element to disseminate therethrough. The securing head assembly further includes a sensor assembly disposed within the housing configured to activate the at least one heating element when the sensor assembly is tripped and the container is in the predetermined position. The securing head assembly further includes a loading zone to receive a predetermined dimensioned film. A top portion of a container is movable within the aperture to sandwich a film positioned in the loading zone between the shield plate and the top portion of a container. The at least one heating element emanates energy when the sensor assembly is tripped to secure a predetermined dimensioned film to a top of a container.

In another example embodiment, an apparatus configured to secure a film as a lid to a container is provided. The apparatus comprises a body portion configured to house film and a sealing portion configured to receive at least a top portion of the container. The sealing portion comprises an aperture sized to receive the top portion of the container therethrough. The sealing portion comprises a shield plate fixedly positioned within the sealing portion and a sensor configured to sense the presence of a container within the sealing portion. The sealing portion further includes at least one heating element positioned proximate the sealing portion and configured to activate to emanate energy in an instance in which the container is sensed within the sealing portion. The sealing portion further includes a loading zone configured to receive a portion of the film and cause positioning of the portion of the film so that the portion of the film is adjacent to the shield plate.

In some embodiments, the apparatus further comprises a fan configured to cool the sealing portion.

In some embodiments, the body portion comprises a film sensor assembly configured to detect one or more markings spaced along the film and a cutter configured to cut the film. The apparatus further includes a controller configured to: determine a desired length for the film; determine, based on sensor data from the film sensor assembly, an instance in which the desired length has been reached; and cause, in response to determining that the desired length has been reached, the cutter to cut the film to form a portion of the film with the desired length.

In some embodiments, the body portion comprises a film sensor assembly configured to detect one or more marking patterns along the film. The apparatus further includes a controller configured to: determine, based on sensor data from the film sensor assembly, if a detected marking pattern matches an approved marking pattern; and cause at least one of: in an instance in which the detected marking pattern matches an approved marking pattern, enabling operation of the apparatus or components of the apparatus; or in an instance in which the detected marking pattern does not match an approved marking pattern, disabling of operation of the apparatus or components of the apparatus.

In another example embodiment an apparatus configured to secure a film as a lid to a container is provided. The apparatus comprises a body portion configured to house a supply of film and a sealing portion configured to receive at least a top portion of the container. The sealing portion comprises an aperture sized to receive the top portion of the container therethrough. The body portion defines a film path leading from the supply of film to the sealing portion. The apparatus further includes a nip defined by a drive roller and a pinch roller, wherein the nip is positioned along the film path and configured to receive the film therethrough. The apparatus further includes a motor configured to operate the drive roller to cause advancement of the film along the film path. The apparatus further includes at least one heating element configured to activate to emanate energy. The apparatus further includes a guide support assembly having a ramp and at least one guide truss. The ramp is configured to receive a portion of the film from the body portion. The ramp and the at least one guide truss are configured to guide the portion of the film to a loading zone within the sealing portion. The apparatus further includes a controller configured to: cause the motor to operate to cause the drive roller to advance the portion of the film into the sealing portion; and cause the at least one heating element to activate to emanate energy to cause the portion of the film within the scaling portion to seal the top portion of the container to form a lid for the container.

In some embodiments, the body portion further comprises a film support roller to support the supply of film.

In some embodiments, the ramp has a surface extending from a first end to a second end, the surface oriented at an angle of inclination ranging up to 75 degrees. The second end is coupled to a guide surface configured to receive the portion of the film from the surface of the ramp.

In some embodiments, the guide support assembly comprises an entry structure, wherein the entry structure comprises a funnel structured to receive a leading end of the film therethrough and to channel the leading end of the portion of the film into the loading zone.

In another example embodiment, an apparatus configured to secure a film as a lid to a container is provided. The apparatus comprises a body portion configured to house a supply of film and a sealing portion configured to receive at least a top portion of the container. The sealing portion comprises an aperture sized to receive the top portion of the container therethrough. The body portion defines a film path leading from the supply of film to the scaling portion. The apparatus comprises a nip defined by a drive roller and a pinch roller, wherein the nip is positioned along the film path and configured to receive the film therethrough. The apparatus further comprises a motor configured to operate the drive roller to cause advancement of the film along the film path. The apparatus further comprises at least one heating element configured to activate to emanate energy; a printer configured to print on the film; and a controller. The controller is configured to: cause the printer to print one or more messages or images on the film; cause the motor to operate to cause the drive roller to advance a portion of the film into the sealing portion; and cause the at least one heating element to activate to emanate energy to cause the portion of the film within the sealing portion to seal the top portion of the container to form a lid for the container with the one or more messages or images printed thereon.

In some embodiments, the controller is configured to determine the one or more messages or images to print on the film.

In some embodiments, the apparatus further comprises a communication interface configured to communicate with a remote device. The controller is configured to receive data from the remote device and operate one or more components of the apparatus according to the received data.

In some embodiments, the controller is configured to determine the one or more messages or images to print on the film based on the received data. In some embodiments, the remote device is a point-of-sale system, and the determined one or more messages or images relate to an order received by the point-of-sale system. In some embodiments, the determined one or more messages or images comprise a description of contents of the container. In some embodiments, the determined one or more messages or images comprise a personalized or customized message or image related to a customer of the order.

In another example embodiment, an apparatus configured to secure a film as a lid to a container is provided. The apparatus comprises a body portion configured to house a supply of film and a sealing portion configured to receive at least a top portion of the container. The sealing portion comprises an aperture sized to receive the top portion of the container therethrough. The body portion defines a film path leading from the supply of film to the sealing portion. The apparatus comprises a nip defined by a drive roller and a pinch roller, wherein the nip is positioned along the film path and configured to receive the film therethrough. The apparatus comprises a motor configured to operate the drive roller to cause advancement of the film along the film path. The apparatus comprises a piercer configured to pierce the film, wherein the piercer is configured to form at least two spaced apart slits in the film. The apparatus comprises at least one heating element configured to activate to emanate energy and a controller. The controller is configured to: cause the piercer to pierce the film to form at least two spaced apart slits in a portion of the film; cause the motor to operate to cause the drive roller to advance the portion of the film into the sealing portion; and cause the at least one heating element to activate to emanate energy to cause the portion of the film within the sealing portion to seal the top portion of the container to form a lid for the container with the at least two spaced apart slits.

In some embodiments, the piercer comprises at least two spaced apart blades that are configured to form the at least two spaced apart slits in the film when the piercer is activated.

In some embodiments, the piercer is configured to form the at least two spaced apart slits in the portion of the film by activating two or more times at different locations on the portion of the film.

In some embodiments, the piercer is movable with respect to the film.

In some embodiments, the piercer is configured to activate as the film advances so as to form the at least two spaced apart slits in the film in a machine direction of advancement of the film.

In some embodiments, the at least two spaced apart slits formed on the lid are designed to enable venting and discourage leaking when the container is tilted such as due to the surface tension between contents of the container and the portion of the lid between the spaced apart slits.

In some embodiments, the at least two spaced apart slits formed on the lid form points of weakness in the lid that are designed to enable insertion of a straw therethrough.

In some embodiments, adjacent slits of the at least two spaced apart slits are separated by a portion of the lid therebetween.

In some embodiments, the at least two spaced apart slits define an overall length along the lid that, in comparison to a continuous length slit of similar overall length, provides equivalent ventilation for the container, weakness within the lid to enable insertion of a straw, and increased leakage prevention due to increased surface tension of liquid on an inside portion of the lid.

In some embodiments, the controller is configured to operate the motor to cause a different rotation speed of the drive roller in comparison to a film support roller for the supply of film so as to form tension in the film to aid with piercing thereof.

In another example embodiment, an apparatus configured to secure a film as a lid to a container is provided. The apparatus comprises a body portion configured to house a supply of film and a sealing portion configured to receive at least a top portion of the container. The body portion defines a film path leading from the supply of film to the sealing portion. The apparatus comprises a film sensor positioned along the film path and configured to sense one or more markings on the film. The apparatus comprises a nip defined by a drive roller and a pinch roller, wherein the nip is positioned along the film path and configured to receive the film therethrough. The apparatus comprises a motor configured to operate the drive roller to cause advancement of the film along the film path. The apparatus comprises at least one heating element configured to activate to emanate energy to cause a portion of the film within the sealing portion to seal the top portion of the container to form a lid for the container. The apparatus comprises a controller configured to: determine, based on sensor data from the film sensor, if a detected one or more markings on the film satisfies an approved marking scheme; and affect, based on whether the detected one or more markings on the film satisfy the approved marking scheme, operation of one or more components of the apparatus.

In some embodiments, the controller is configured to cause at least one of: in an instance in which the detected one or more markings satisfies the approved marking scheme, enabling operation of the apparatus or at least one of the motor or the at least one heating element of the apparatus; or in an instance in which the detected one or more markings does not satisfy the approved marking scheme, disabling operation of the apparatus or at least one of the motor or the at least one heating element of the apparatus.

In some embodiments, the controller is configured to cause at least one of: in an instance in which the detected one or more markings satisfies the approved marking scheme, enabling operation of the one or more components of the apparatus; or in an instance in which the detected one or more markings does not satisfy the approved marking scheme, disabling operation of the one or more components of the apparatus.

In some embodiments, the controller is configured to affect operation of the one or more components of the apparatus by at least one of decreasing a speed of operation of the motor, decreasing a speed or temperature of operation of the at least one heating element, disabling a printer of the apparatus, causing the printer to print one or more messages or images in an off-center position on the film, causing the printer to print one or more messages indicating that an unapproved film is being utilized, increasing a delay time between sealing operations performed by the apparatus, or disabling a piercer of the apparatus.

In some embodiments, the controller is further configured to send a signal to a remote server indicating that the detected one or more markings does not satisfy the approved marking scheme.

In some embodiments, the controller is configured to determine a film marking scheme for the film based on the detected one or more markings. In some embodiments, the determined film marking scheme corresponds to a marking pattern comprised of a plurality of markings and determined spacing between each adjacent marking within the plurality of markings. In some embodiments, the determined film marking scheme is comprised of at least one of the color of the one or more markings, a width of the one or more markings, a length of the one or more markings, or a spacing between adjacent markings. In some embodiments, the determined film marking scheme is repeated along the length of the supply of film such that the supply of film comprises a plurality of repeated film marking schemes.

In some embodiments, the apparatus further comprises a second film sensor configured to sense one or more markings along the film. The film sensor is positioned proximate a first edge of the film and the second film sensor is positioned proximate a second, opposite edge of the film. The controller is configured to control operation of the motor to cease advancement of the film into the sealing portion based on sensor data from the second film sensor.

In some embodiments, the controller is further configured to control operation of the motor to cease advancement of the film into the sealing portion based on sensor data from the film sensor.

In some embodiments, the controller is further configured to: determine one or more characteristics of the one or more markings, wherein the one or more characteristics comprise at least one of the color of the one or more markings, a width of the one or more markings, a length of the one or more markings, or a spacing between adjacent markings; determine a desired operation of one or more components of the apparatus based on the detected one or more characteristics; and cause operation of the one or more components of the apparatus based on the determined desired operation.

In some embodiments, the controller is further configured to: determine one or more characteristics of the one or more markings, wherein the one or more characteristics comprise at least one of the color of the one or more markings, a width of the one or more markings, a length of the one or more markings, or a spacing between adjacent markings; and cause the at least one heating element to operate according to at least one of a specific amount of time or a specific heat based on the determined one or more characteristics.

In some embodiments, the controller is further configured to: determine one or more characteristics of the one or more markings, wherein the one or more characteristics comprise at least one of the color of the one or more markings, a width of the one or more markings, a length of the one or more markings, or a spacing between adjacent markings; and cause the motor to operate according to at least one of a specific amount of time or according to a specific number of detected markings based on the determined one or more characteristics.

In some embodiments, the apparatus further comprises a piercer having at least one actuatable tip to pierce the film. The controller is further configured to: determine one or more characteristics of the one or more markings, wherein the one or more characteristics comprise at least one of the color of the one or more markings, a width of the one or more markings, a length of the one or more markings, or a spacing between adjacent markings; and cause the piercer to operate based on the determined one or more characteristics.

In some embodiments, the apparatus further comprises a printer configured to print one or more messages or images on the film, wherein the controller is further configured to: determine one or more characteristics of the one or more markings, wherein the one or more characteristics comprise at least one of the color of the one or more markings, a width of the one or more markings, a length of the one or more markings, or a spacing between adjacent markings; and cause the printer to operate based on the determined one or more characteristics.

In some embodiments, the controller is configured to determine the one or more messages or images to print on the film based on the determined one or more characteristics.

In some embodiments, the controller is further configured to: determine one or more characteristics of the one or more markings, wherein the one or more characteristics comprise at least one of the color of the one or more markings, a width of the one or more markings, a length of the one or more markings, or a spacing between adjacent markings; and determine one or more characteristics of the film, wherein the one or more characteristics of the film comprise at least one of the thickness of the film, the associated customer, a time of operation of the heating element, a subset of printing options to present to a user for selection, or the amount of film remaining on the supply of film.

In some embodiments, the sealing portion comprises an aperture sized to receive the top portion of the container therethrough.

In some embodiments, the one or more markings are comprised of at least one of a Quick Response Code, a barcode, or a logo.

In some embodiments, the one or more markings are clear with respect to a remainder of the film.

In another example embodiment, a method for controlling operation of an apparatus configured to secure a film as a lid to a container is provided. The method comprises providing the apparatus, wherein the apparatus comprises a body portion configured to house a supply of film and a sealing portion configured to receive at least a top portion of the container. The body portion defines a film path leading from the supply of film to the scaling portion. The apparatus comprises a film sensor positioned along the film path and configured to sense one or more markings on the film. The apparatus further comprises a nip defined by a drive roller and a pinch roller, wherein the nip is positioned along the film path and configured to receive the film therethrough. The apparatus further comprises a motor configured to operate the drive roller to cause advancement of the film along the film path. The apparatus further comprises at least one heating element configured to activate to emanate energy to cause a portion of the film within the sealing portion to seal the top portion of the container to form a lid for the container. The apparatus further comprises a controller. The method further includes determining, based on sensor data from the film sensor, if a detected one or more markings on the film satisfies an approved marking scheme; and affecting, based on whether the detected one or more markings on the film satisfy the approved marking scheme, operation of one or more components of the apparatus.

In another example embodiment, an apparatus configured to secure a film as a lid to a container is provided. The apparatus comprises a body portion configured to house a supply of film and a sealing portion configured to receive at least a top portion of the container. The body portion defines a film path leading from the supply of film to the scaling portion. The apparatus comprises a film sensor positioned along the film path and configured to sense one or more markings on the film. The apparatus comprises a nip defined by a drive roller and a pinch roller, wherein the nip is positioned along the film path and configured to receive the film therethrough. The apparatus comprises a motor configured to operate the drive roller to cause advancement of the film along the film path. The apparatus comprises at least one heating element configured to activate to emanate energy to cause a portion of the film within the sealing portion to seal the top portion of the container to form a lid for the container. The apparatus comprises a controller configured to: determine, based on sensor data from the film sensor, if a detected one or more markings on the film satisfies an approved marking scheme; and cause, in an instance in which the detected one or more markings satisfies the approved marking scheme, operation of one or more components of the apparatus.

In some embodiments, the controller is configured to cause, in an instance in which the detected one or more markings satisfies the approved marking scheme, operation of the motor to cause the drive roller to advance a portion of the film to the sealing portion.

In another example embodiment, an apparatus configured to secure a film as a lid to a container is provided. The apparatus comprises a body portion configured to house a supply of film and a sealing portion configured to receive at least a top portion of the container. The body portion defines a film path leading from the supply of film to the sealing portion. The apparatus comprises a film sensor positioned along the film path and configured to sense one or more markings on the film. The apparatus comprises a nip defined by a drive roller and a pinch roller, wherein the nip is positioned along the film path and configured to receive the film therethrough. The apparatus comprises a motor configured to operate the drive roller to cause advancement of the film along the film path. The apparatus comprises at least one heating element configured to activate to emanate energy to cause a portion of the film within the sealing portion to seal the top portion of the container to form a lid for the container. The apparatus comprises a communication interface and a controller configured to: cause, via the communication interface, a signal with sensor data from the film sensor to be sent to a remote server; receive, from the remote server, an indication as to whether a detected one or more markings on the film satisfies an approved marking scheme; and affect, based on whether the detected one or more markings on the film satisfy the approved marking scheme, operation of one or more components of the apparatus.

In another example embodiment, a supply of film for an automatic sealer for a container is provided. The supply of film includes a repeated marking scheme configured to be read by a film sensor of the automatic sealer to at least one of: in an instance in which the repeated marking scheme satisfies an approved marking scheme, enable operation of the automatic sealer or components thereof, or in an instance in which the repeated marking scheme does not satisfy the approved marking scheme, disable operation of the automatic sealer or components thereof.

In some embodiments, the repeated marking scheme comprises characteristics formed of at least one of the color of one or more markings of the repeated marking scheme, a width of the one or more markings of the repeated marking scheme, a length of the one or more markings of the repeated marking scheme, or a spacing between adjacent markings of the repeated marking scheme.

In some embodiments, the repeated marking scheme is designed to be read by the film sensor to control operation of one or more components of the automatic sealer based on one or more characteristics of the repeated marking scheme. The one or more characteristics comprise at least one of the color of one or more markings of the repeated marking scheme, a width of the one or more markings of the repeated marking scheme, a length of the one or more markings of the repeated marking scheme, or a spacing between adjacent markings of the repeated marking scheme.

In some embodiments, the repeated marking scheme is formed along an entire length of the supply of film.

In some embodiments, the supply of film is a roll of film.

In some embodiments, the marking scheme comprises a detectable non-visible marking, wherein the detectable non-visible marking is covered using an ink or other coating that is visible to a user and configured to enable detection of the marking therethrough.

In some embodiments, the supply of film is formed into a plurality of successive portions. The supply of film is formed of at least a first layer of ink and a second layer of ink. The first layer of ink includes a radiation-absorbing layer of ink and the second layer of ink includes a non-radiation-absorbing layer of ink. The first layer of ink is applied to a first portion of each of the plurality of successive portions such that a remaining corner portion of each of the plurality of successive portions does not include the first layer of ink so as to form a pull tab upon formation of a seal therefrom. The second layer of ink is applied to both the first portion and the remaining corner portion of each of the plurality of successive portions.

It is to be understood that both the foregoing general description and the following detailed description and drawings are examples and are provided for purpose of illustration and not intended to limit the scope of the disclosed subject matter in any manner. The accompanying drawings, which are incorporated in and constitute part of this specification, are included to illustrate and provide a further understanding of the devices of the disclosed subject matter. Together with the description, the drawings serve to explain the principles of the disclosed subject matter.

An apparatus may include a film support roller supporting a film roll and a housing that may include a sealing portion having an aperture sized to receive a top portion of a container. The housing may define a film path leading from the film roll to the sealing portion. A guide support assembly may have a ramp and at least one guide truss positioned along the film path. The ramp and the guide truss may guide the film across the aperture within the sealing portion, covering the aperture. The motor may advance the film along the film path. The heating element may emanate energy. The controller may cause the motor to advance the film onto the ramp and cause the heating element to emanate energy to cause the film to seal the top portion of the container.

BRIEF DESCRIPTION OF THE DRAWINGS

Figure 1A:
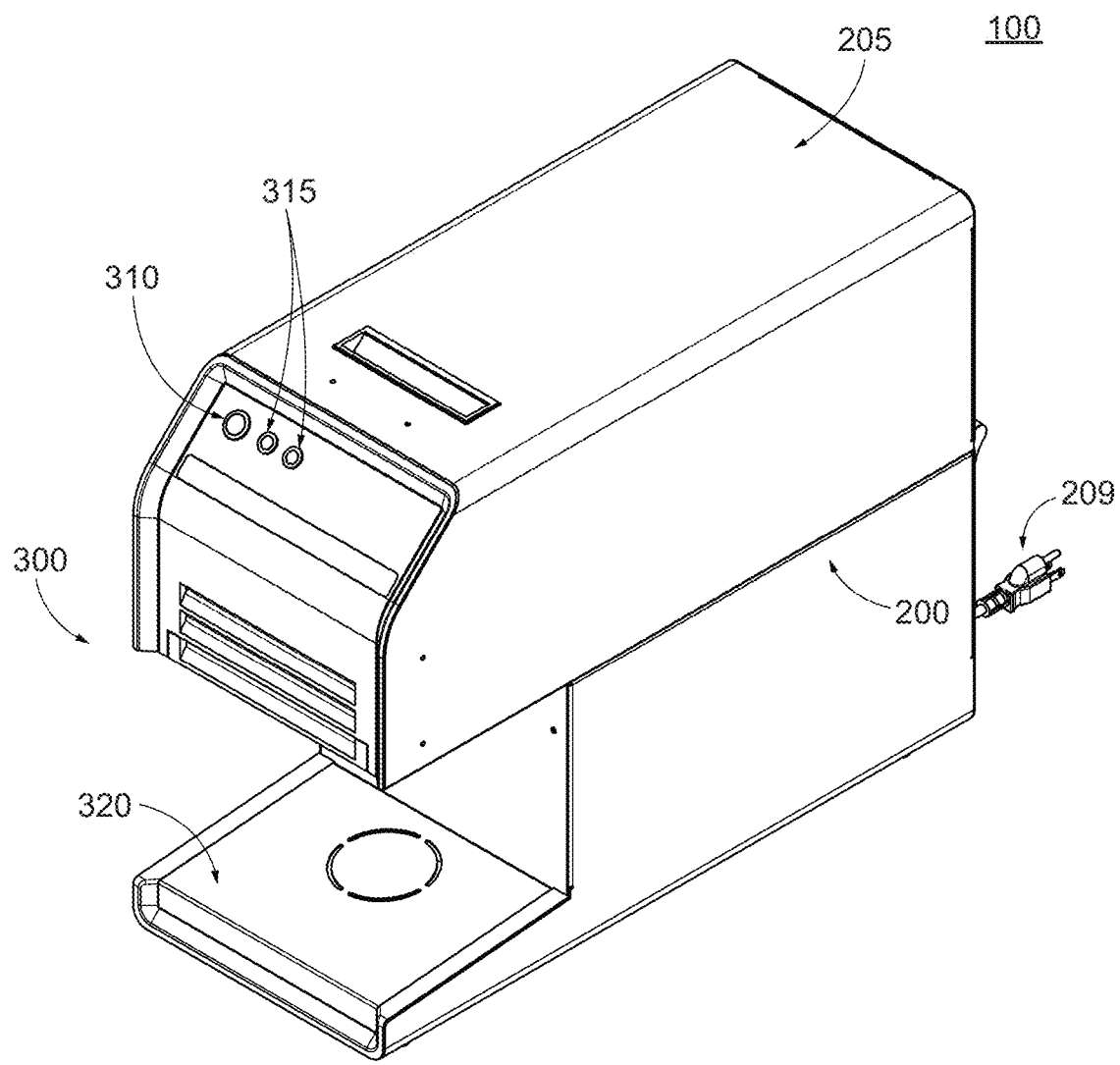

Having thus described the invention in general terms, reference will now be made to the accompanying drawings, which are not necessarily drawn to scale, and wherein:

FIG. 1A is a top perspective view of an example sealing apparatus, in accordance with some embodiments described herein.

Figure 1B:
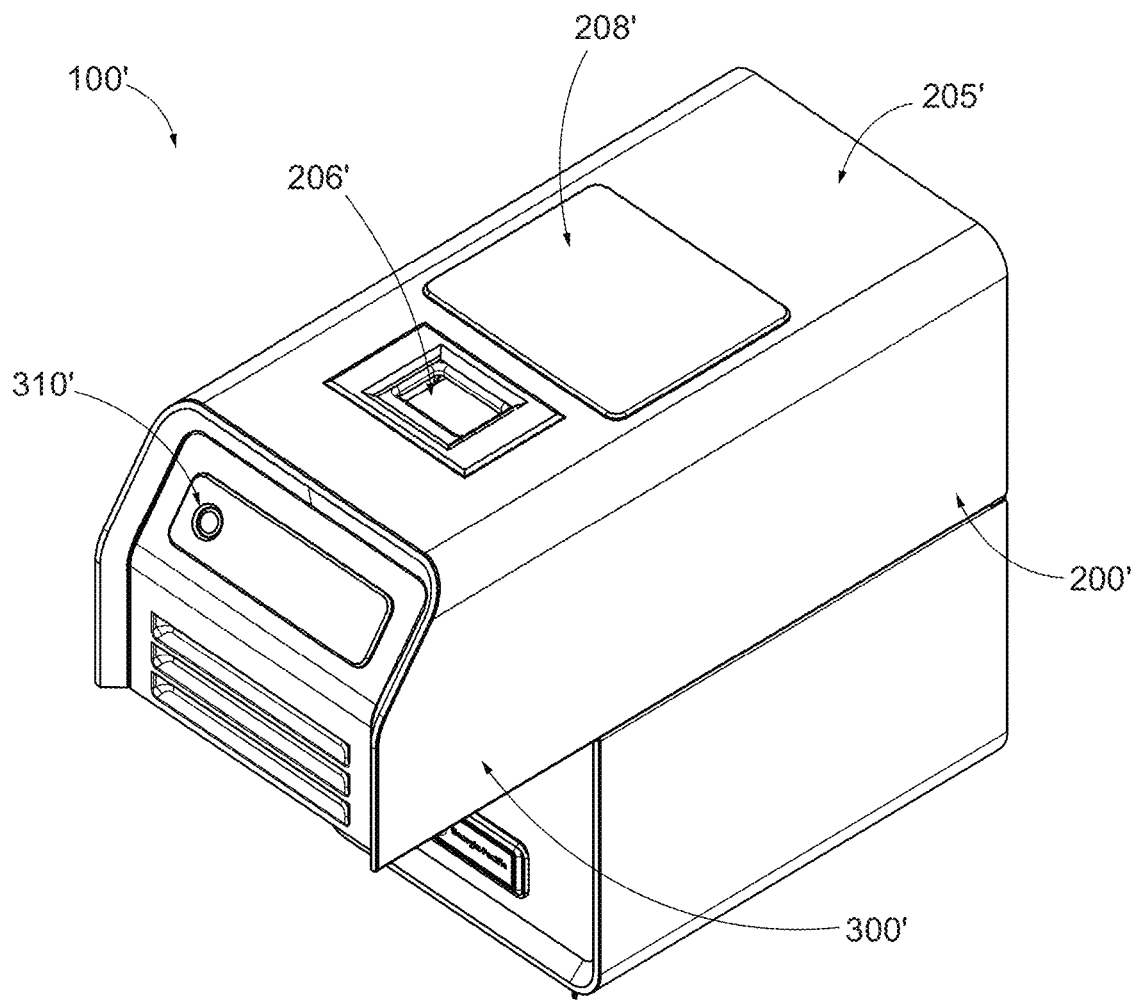

FIG. 1B is a top perspective view of another example sealing apparatus, in accordance with some embodiments described herein.

Figure 1C:
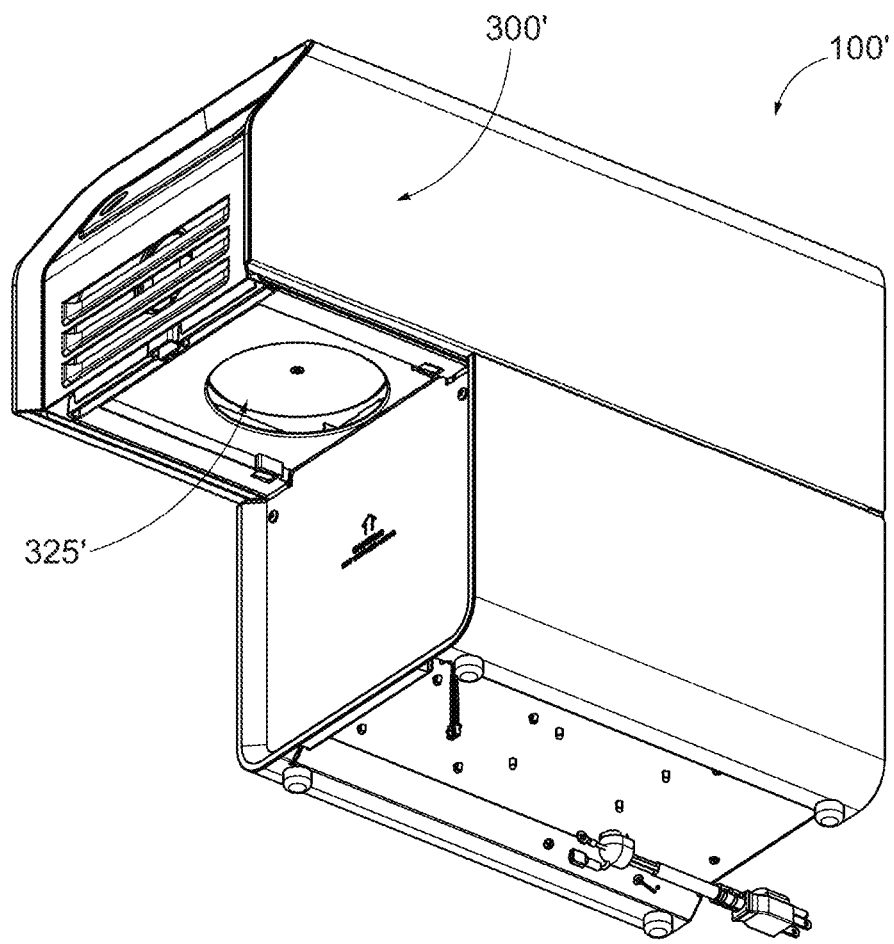

FIG. 1C is a bottom perspective view of the example sealing apparatus shown in FIG. 1B, in accordance with some embodiments described herein.

Figure 2A:
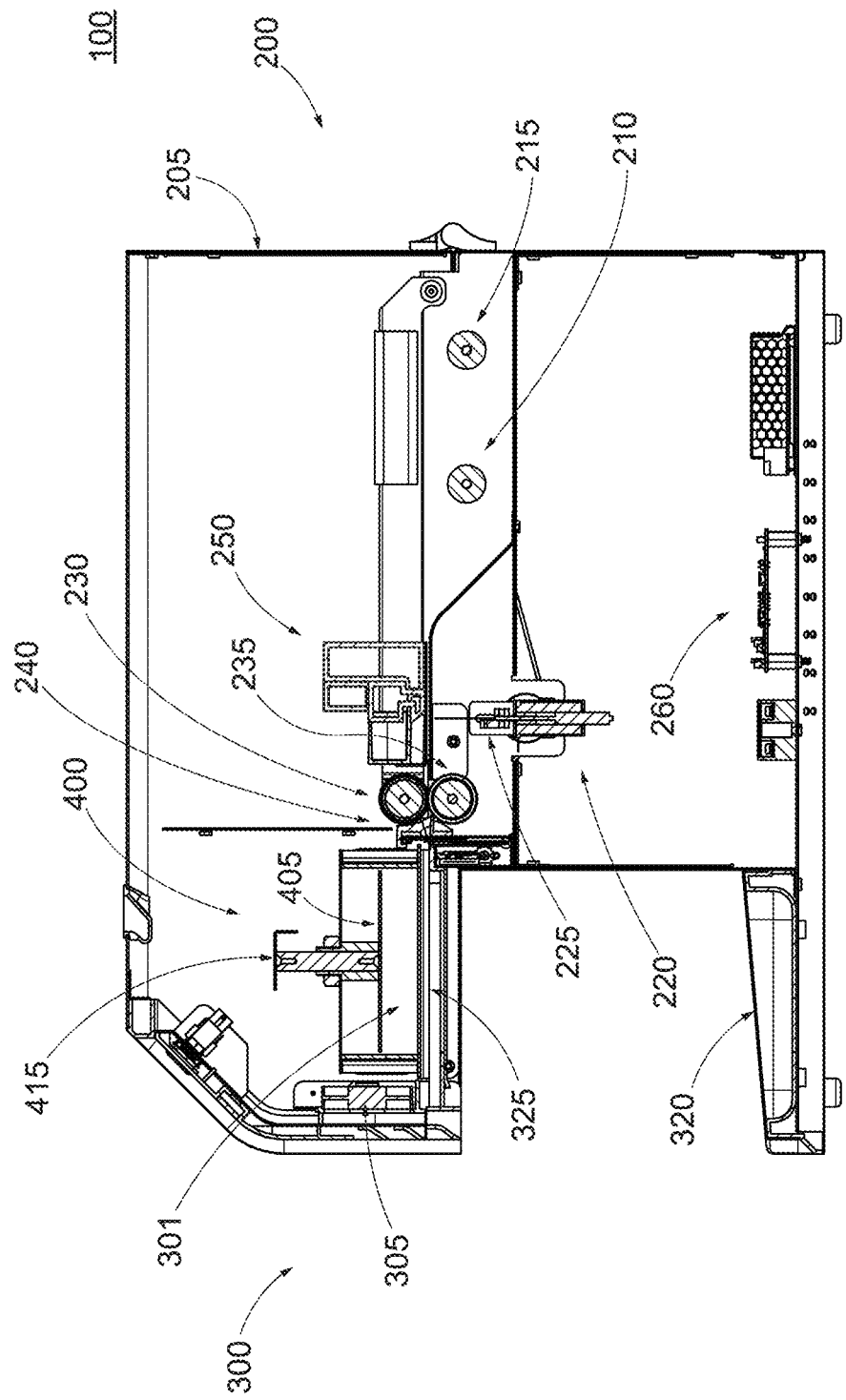

FIG. 2A is a cross-sectional side view of the example sealing apparatus shown in FIG. 1A, in accordance with some embodiments described herein.

Figure 2B:
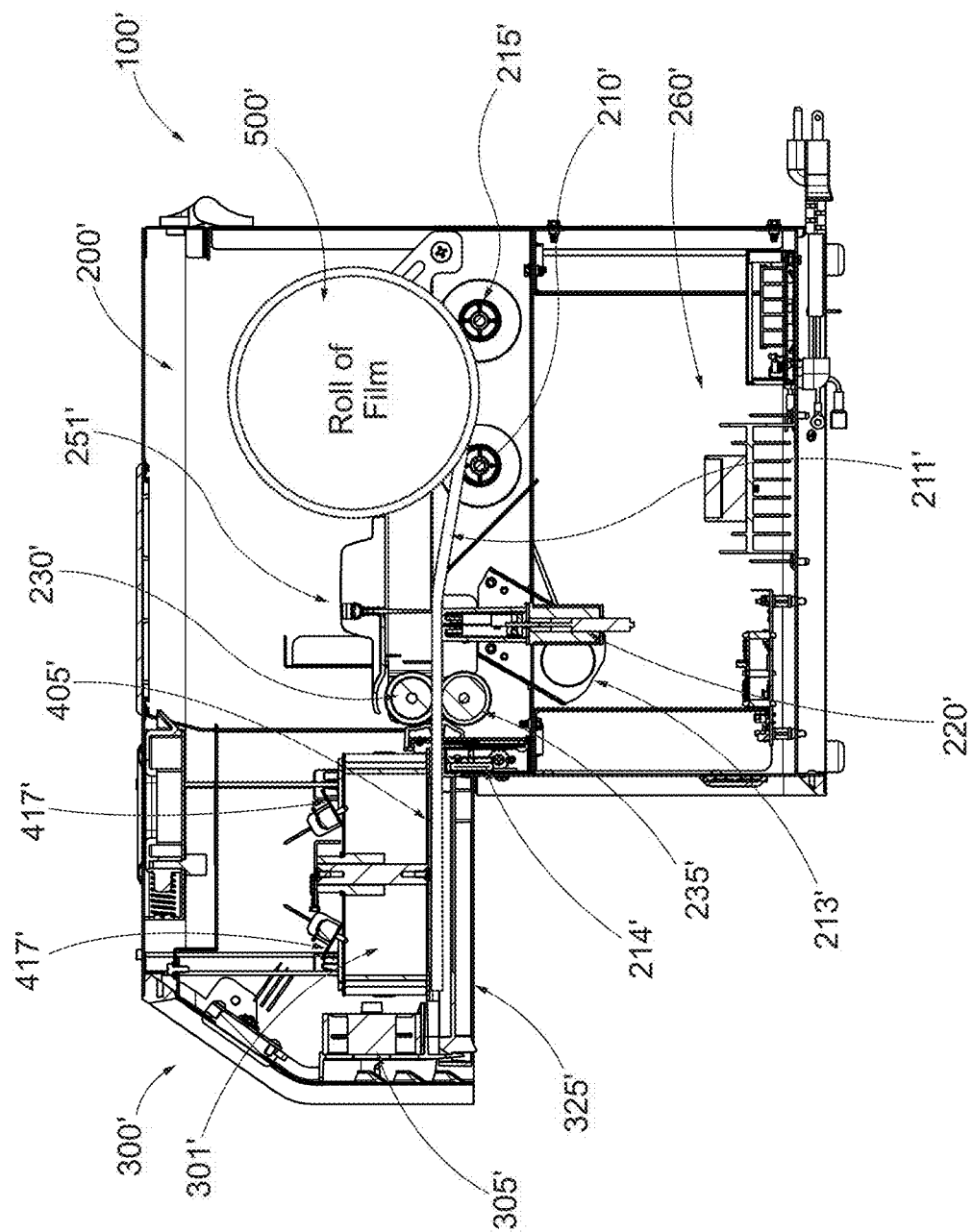

FIG. 2B is a cross-sectional side view of the example sealing apparatus shown in FIG. 1B, in accordance with some embodiments described herein.

Figure 3A:
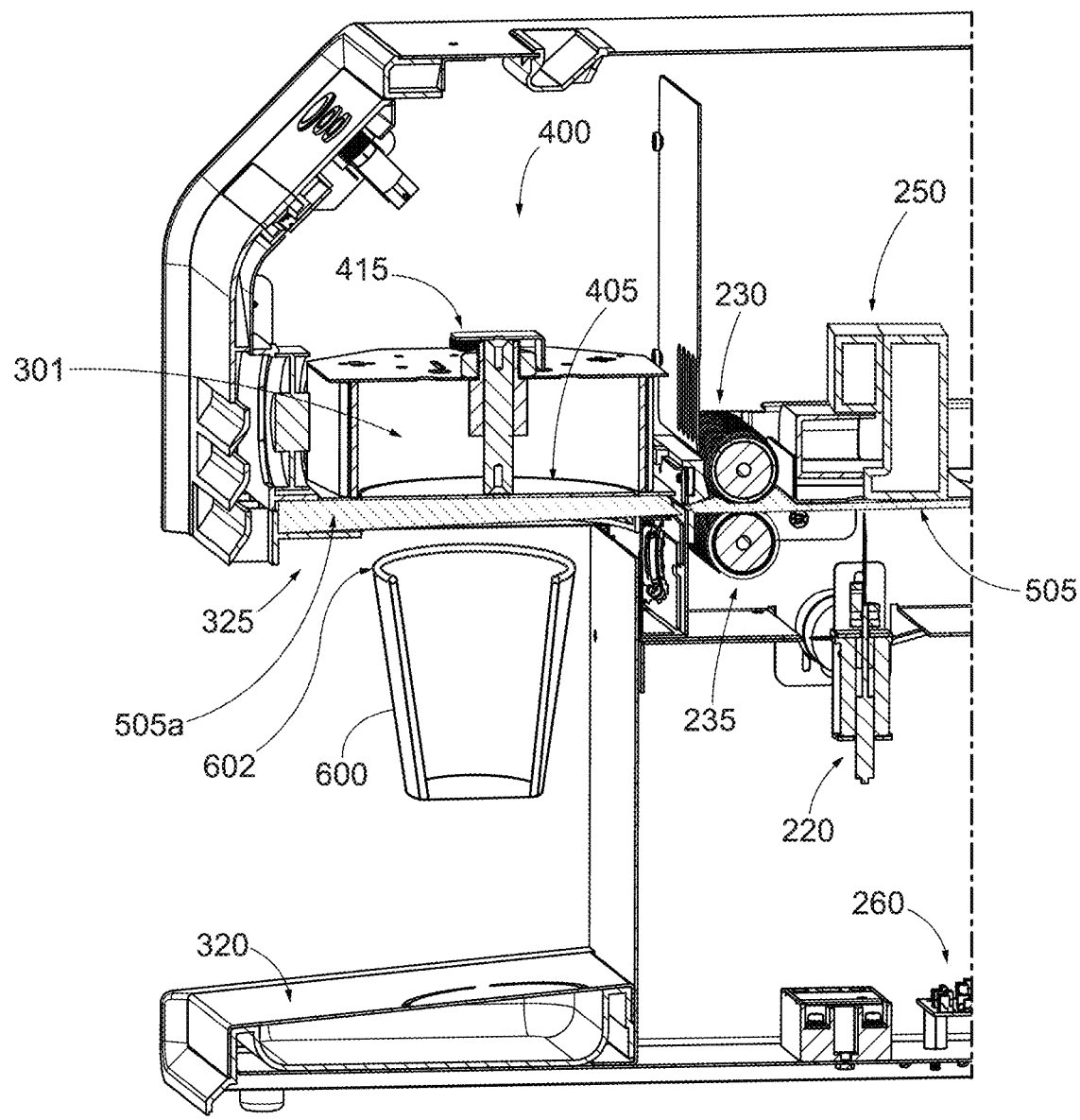

FIG. 3A is a partial side cross-sectional view of an example sealing apparatus with a shield plate in a first position, in accordance with some embodiments described herein.

Figure 3B:
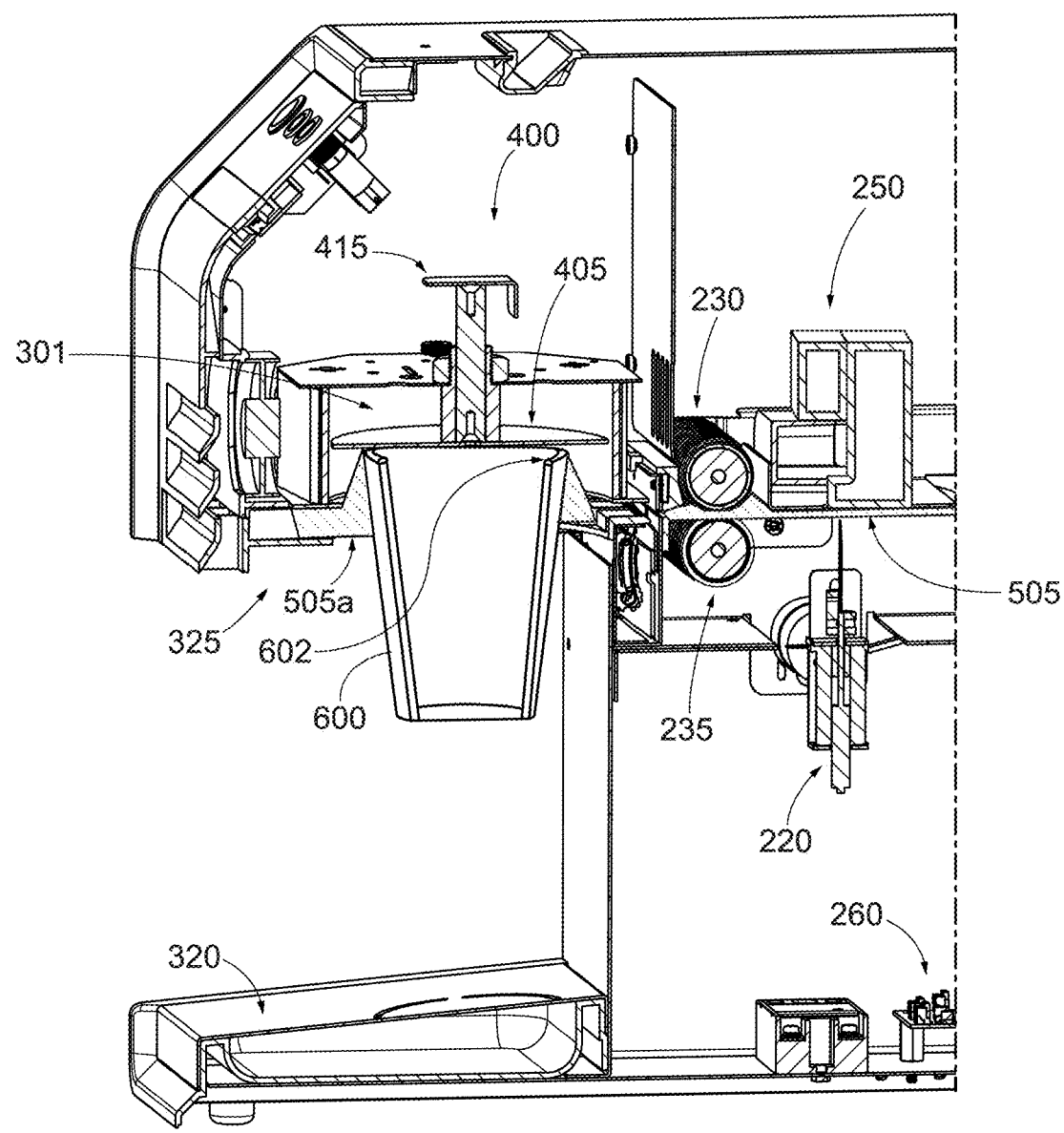

FIG. 3B is a partial side cross-sectional view of the example sealing apparatus shown in FIG. 3A with a shield plate moving between a first position towards a second position, in accordance with some embodiments described herein.

Figure 3C:
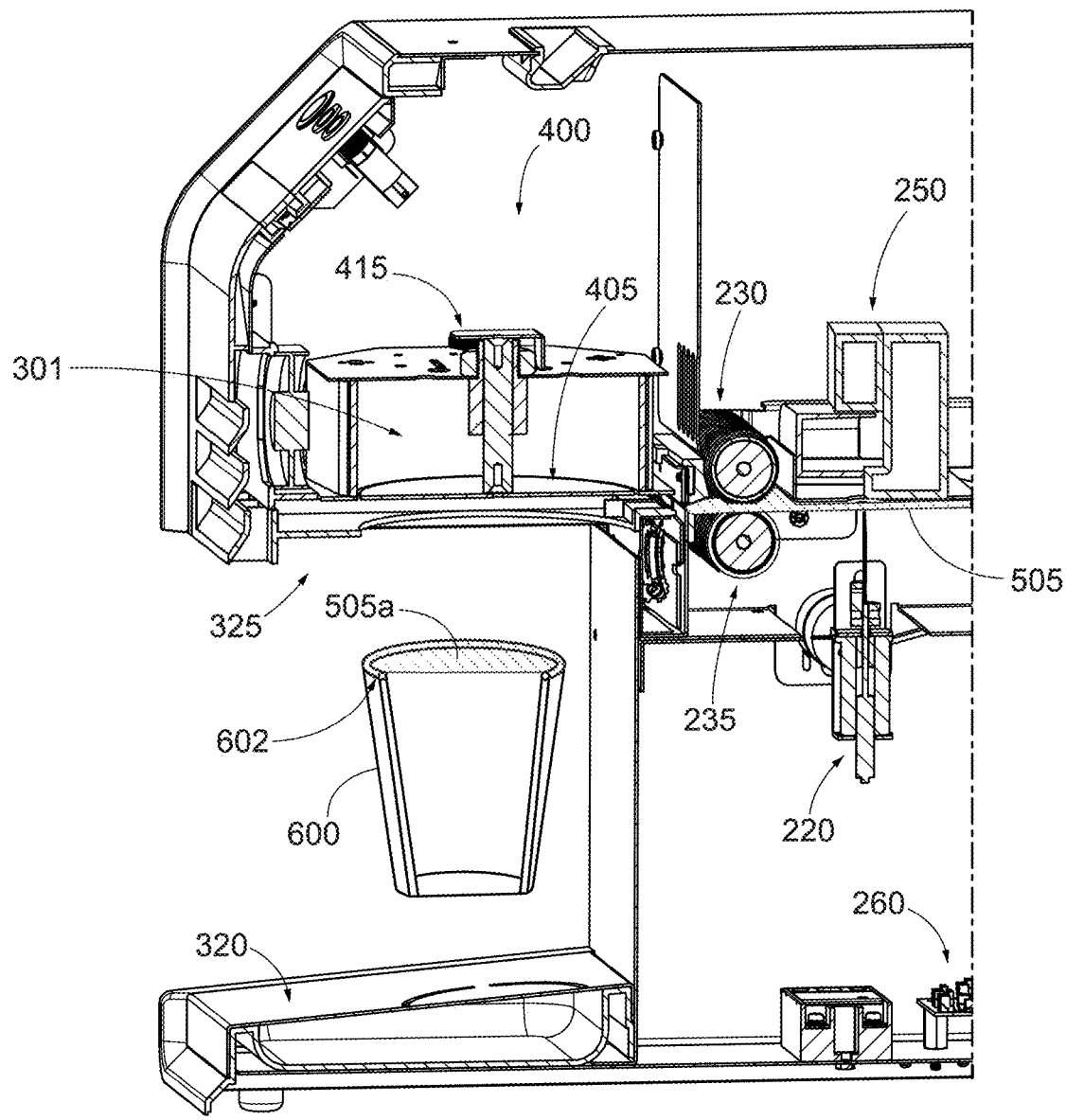

FIG. 3C is a partial side cross-sectional view of the example sealing apparatus shown in FIG. 3A with a shield plate returned to the first position and with a film secured to a container, in accordance with some embodiments described herein.

Figure 4A:
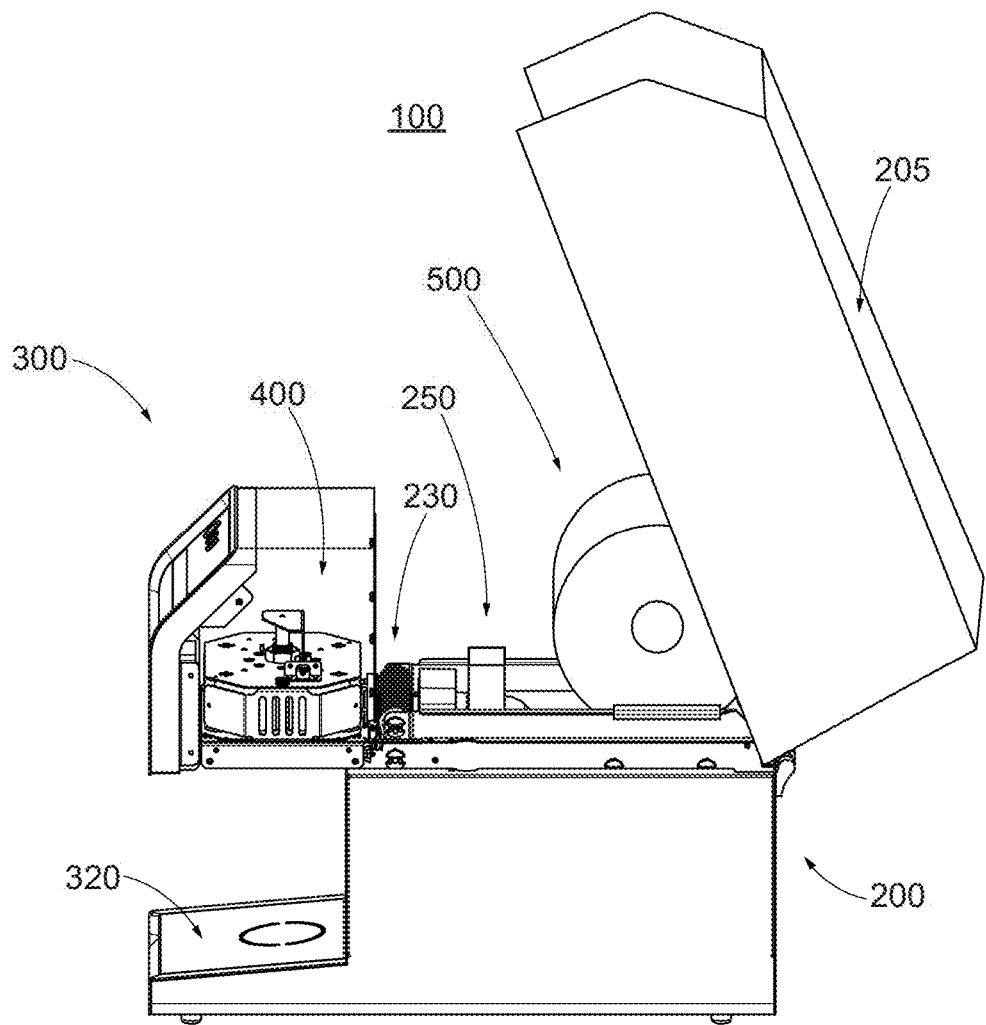

FIG. 4A is a side view of the example sealing apparatus shown in FIG. 1A with a body lid in an opened position, in accordance with some embodiments described herein.

Figure 4B:
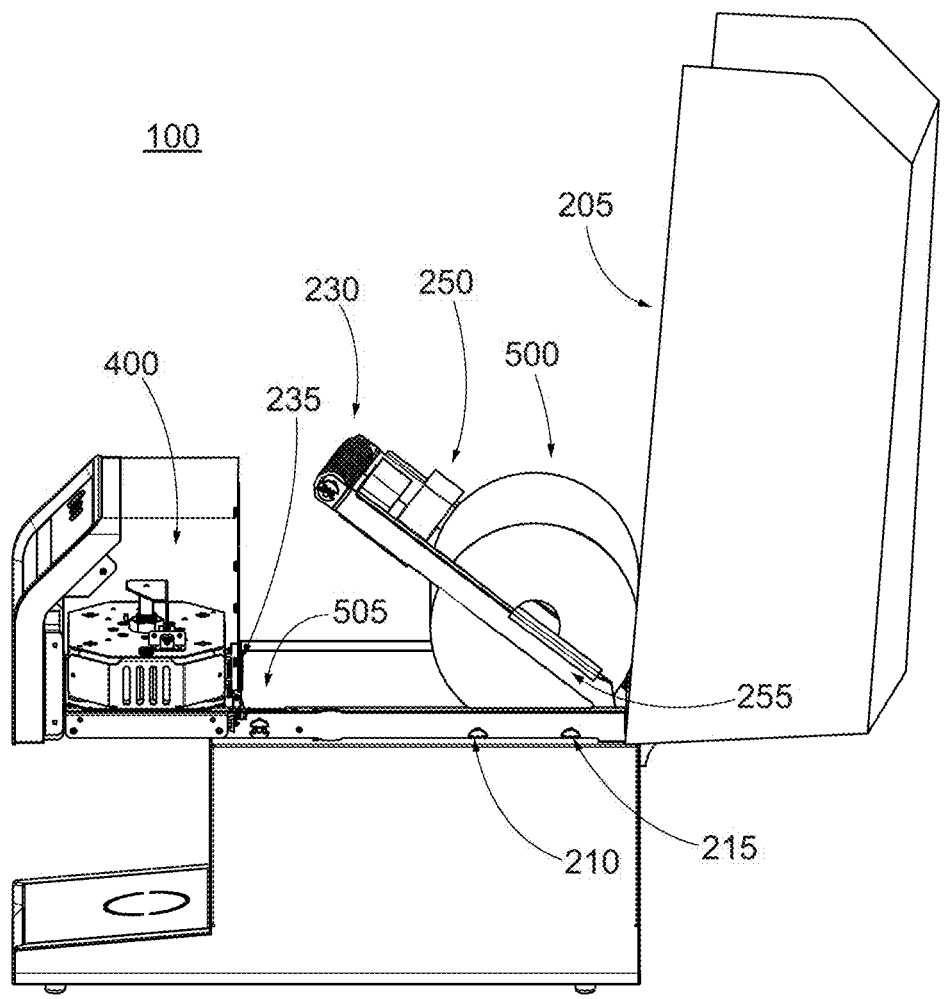

FIG. 4B is a side view of the sealing apparatus of FIG. 4A, with the body lid open and the pinch roller adjusted away from the drive roller to enable loading of film from a roll of film, in accordance with some embodiments described herein.

Figure 5A:
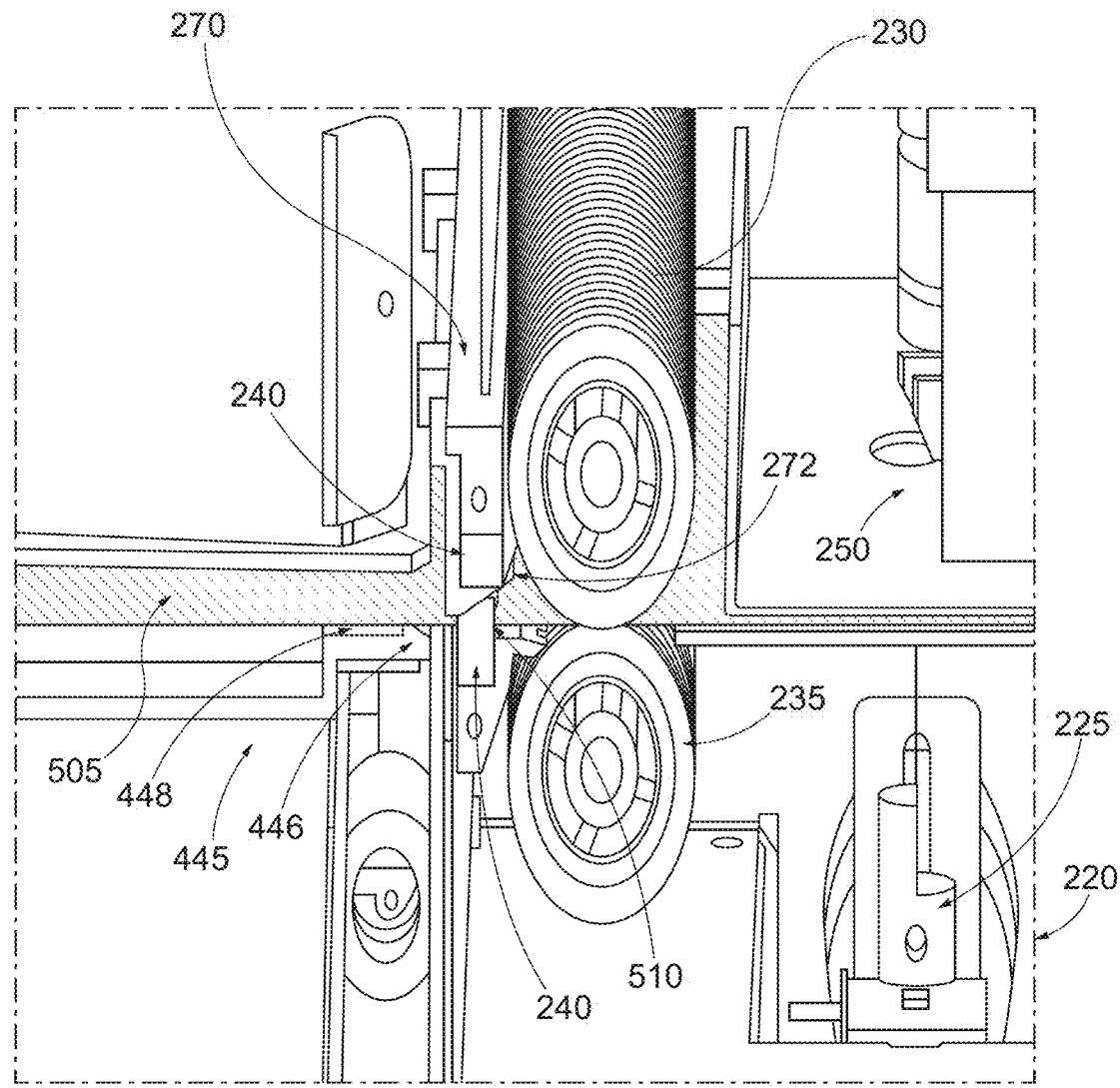

FIG. 5A is an enlarged cross-sectional side view of a portion of an example sealing apparatus, in accordance with some embodiments described herein.

Figure 5B:
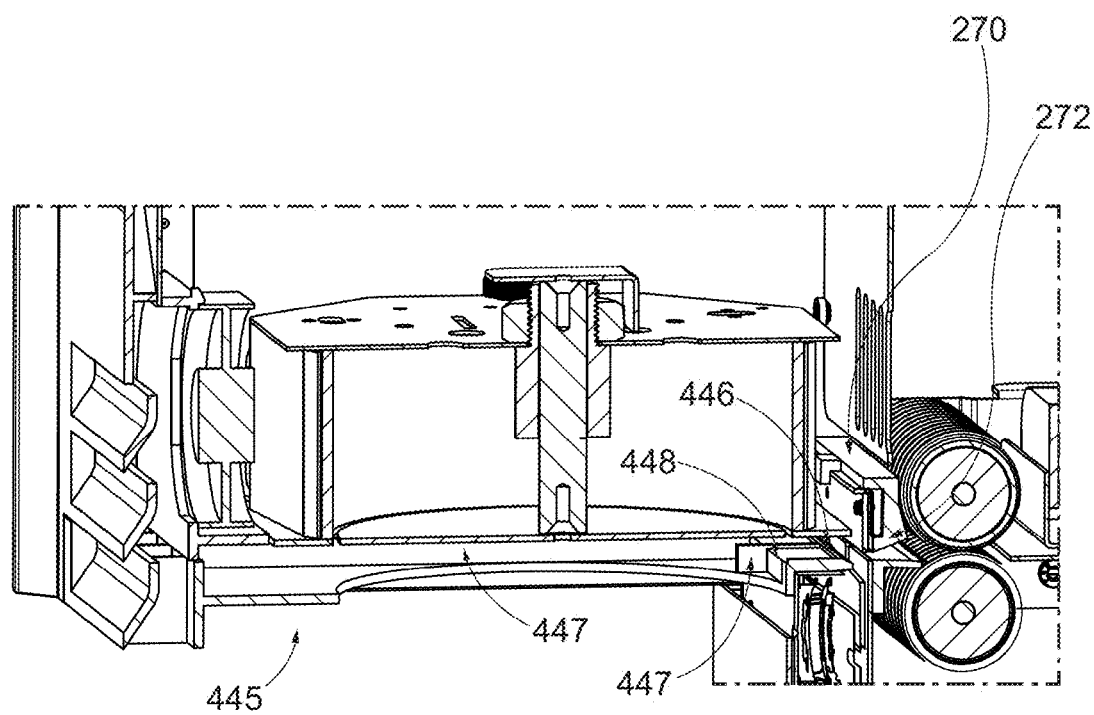

FIG. 5B is an enlarged cross-sectional perspective view of another portion of an example sealing apparatus, in accordance with some embodiments described herein.

Figure 5C:
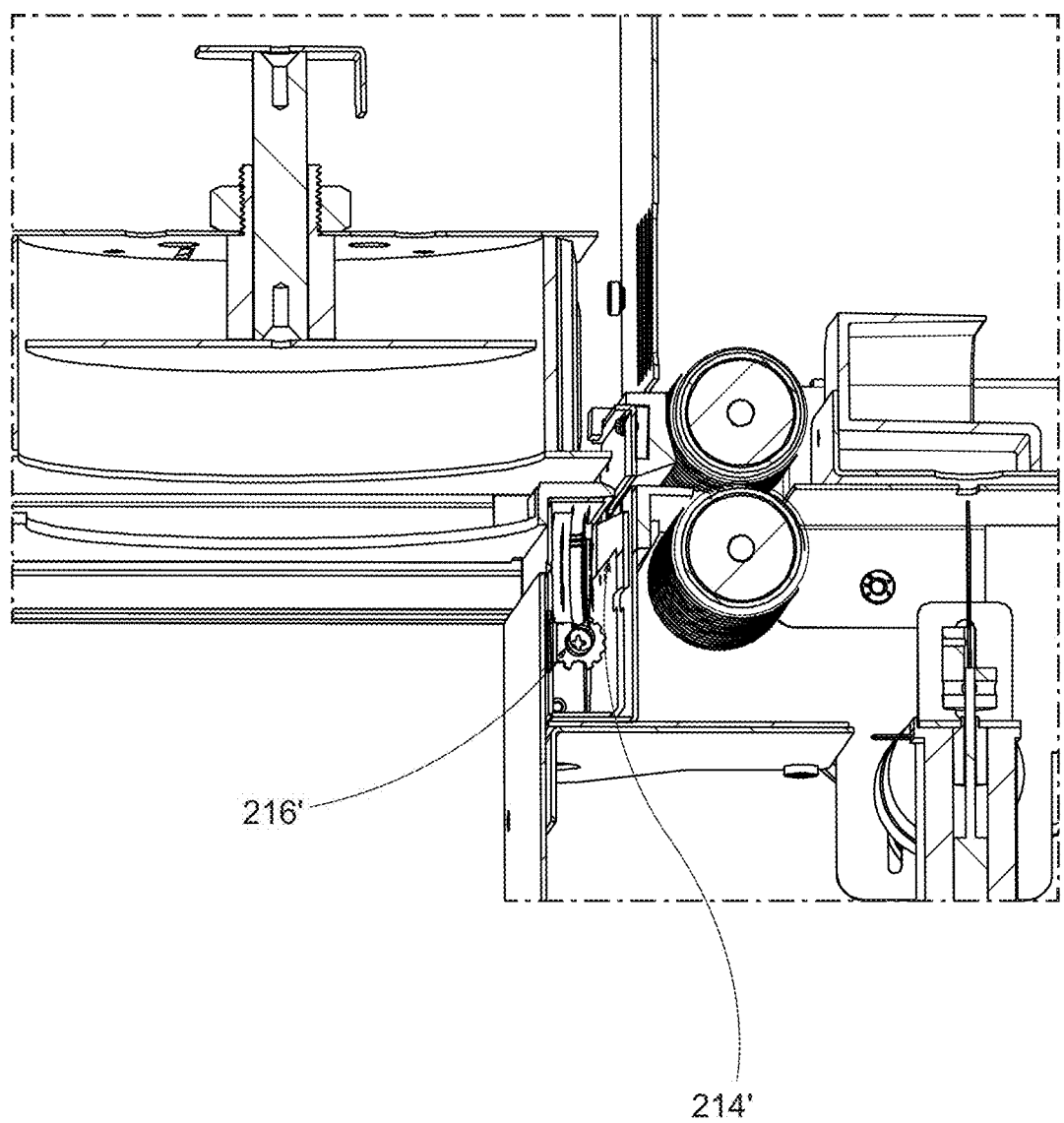

FIG. 5C is an enlarged cross-sectional perspective view of yet another portion of an example sealing apparatus, in accordance with some embodiments described herein.

Figure 6A:
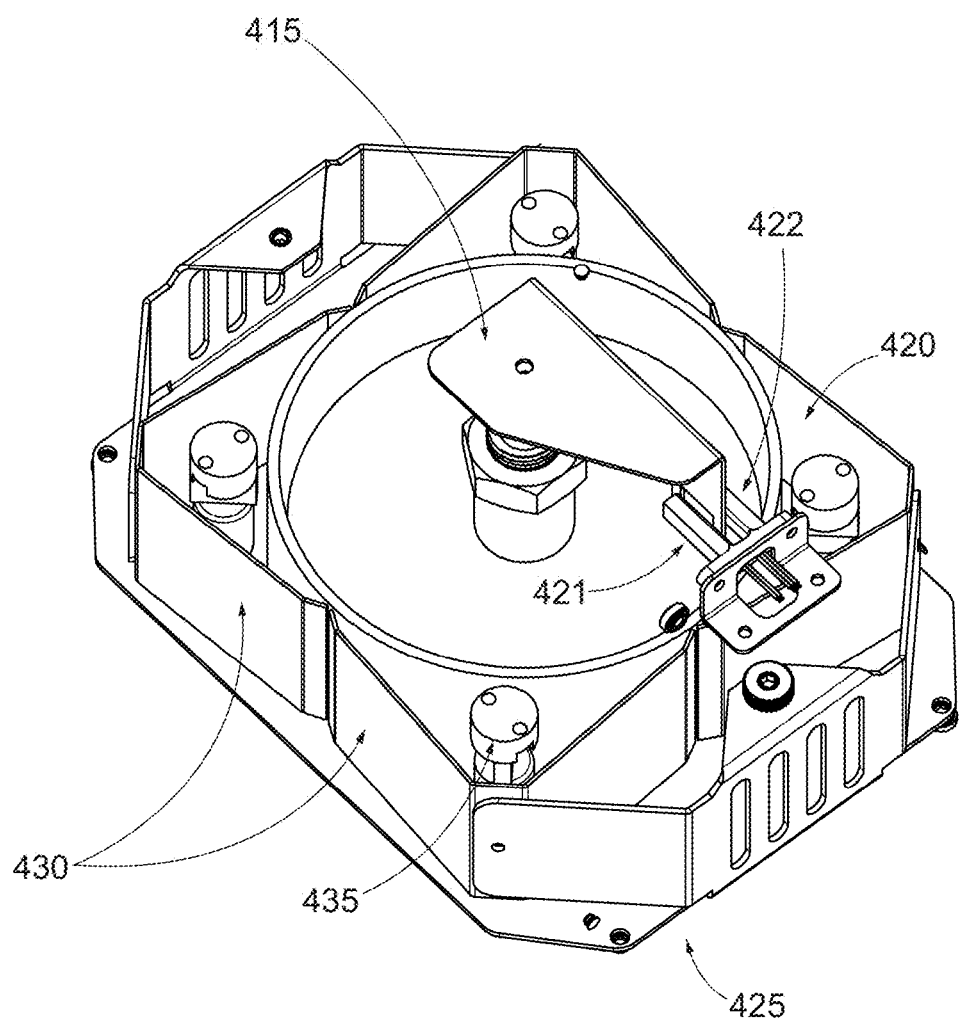

FIG. 6A is a top perspective view of a portion of an example securing head assembly for an example sealing apparatus, in accordance with some embodiments described herein.

Figure 6B:
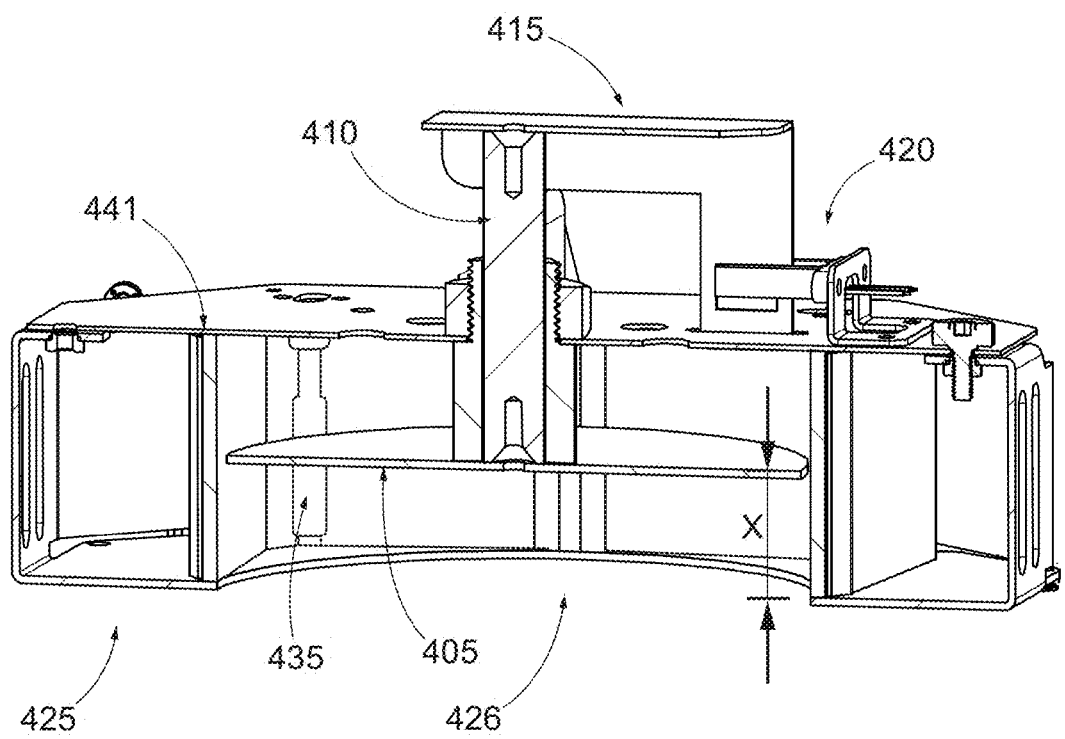

FIG. 6B is an enlarged cross-sectional side view of the securing head assembly of FIG. 6A, in accordance with some embodiments described herein.

Figure 6C:
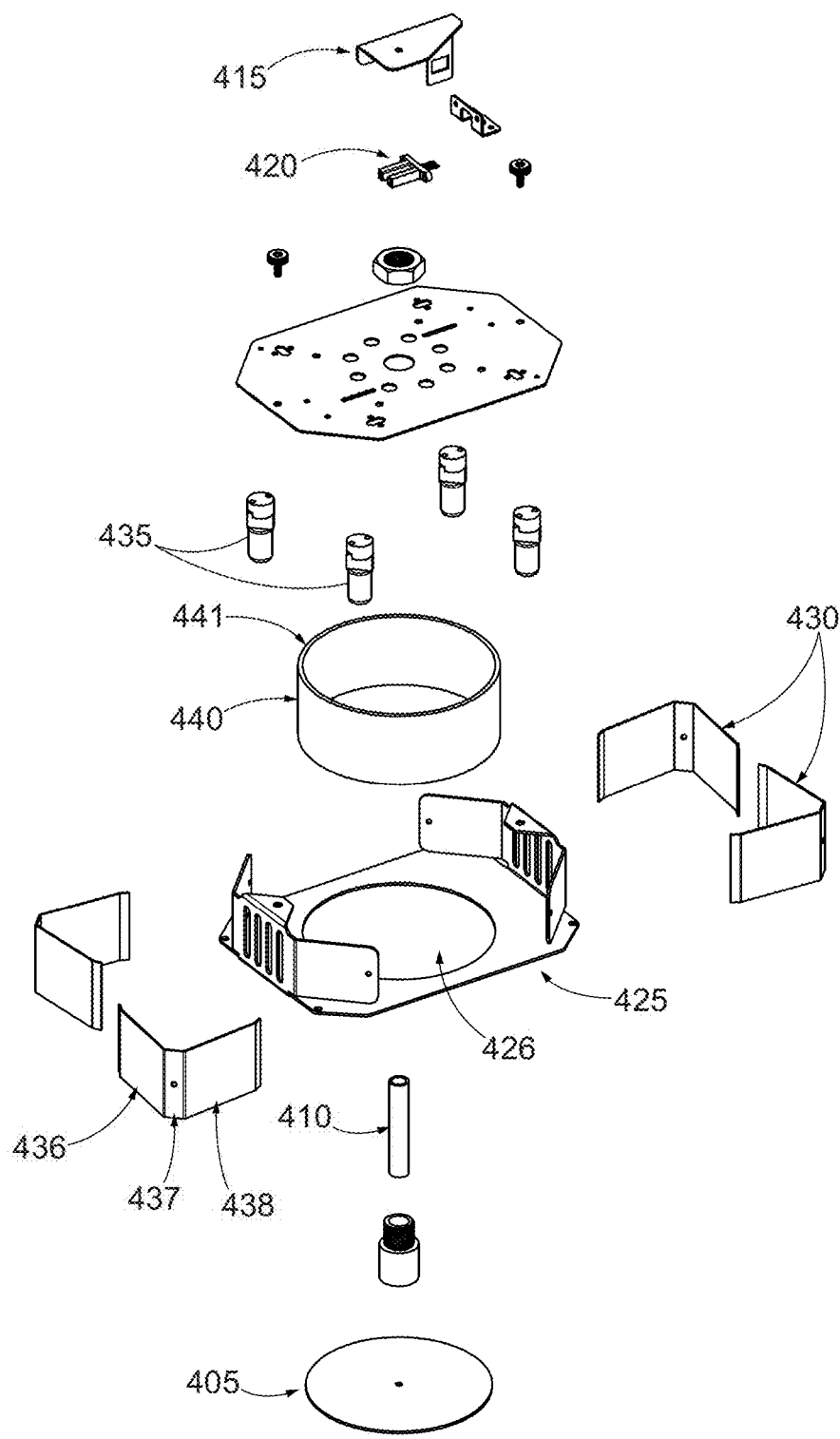

FIG. 6C is an exploded view of the securing head assembly of FIG. 6A, in accordance with some embodiments described herein.

Figure 7:
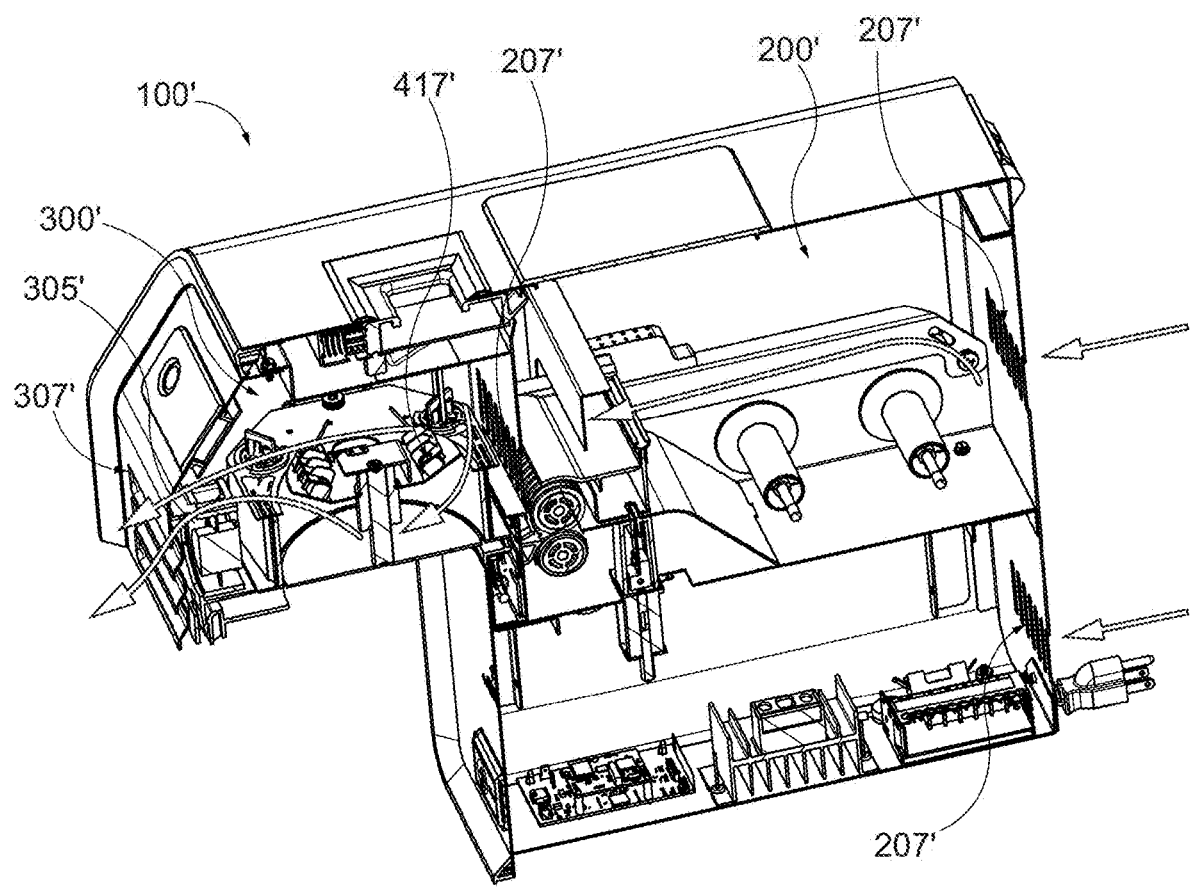

FIG. 7 shows a cross-sectional view of the sealing apparatus shown in FIG. 2A, wherein air flow through the apparatus is illustrated, in accordance with some embodiments described herein.

Figure 8A:
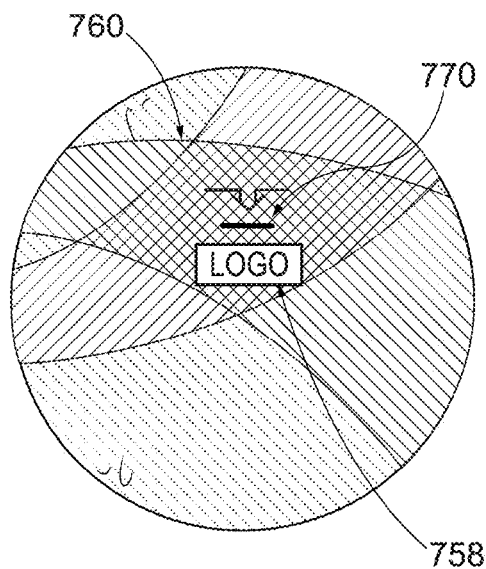

FIG. 8A shows an example sealed lid of a container including a single slit.

Figure 8B:
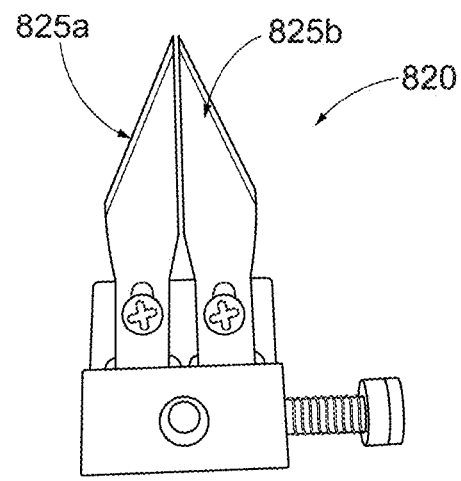

FIG. 8B shows an example piercer with two spaced apart actuable tips, in accordance with some embodiments described herein.

Figure 8C:
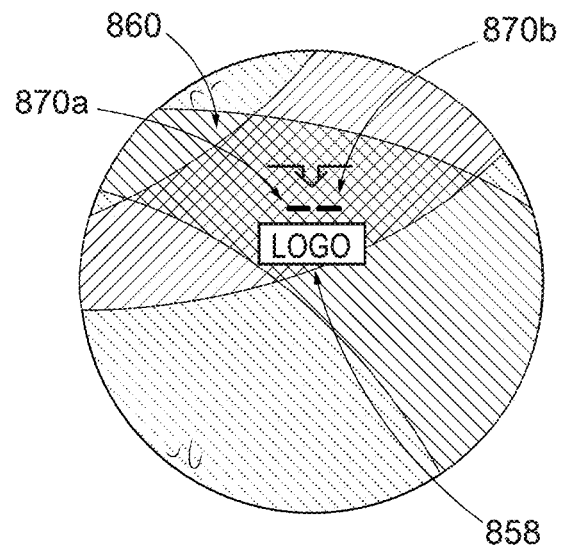

FIG. 8C shows an example sealed lid of a container utilizing the example piercer shown in FIG. 8B, in accordance with some embodiments described herein.

Figure 8D:
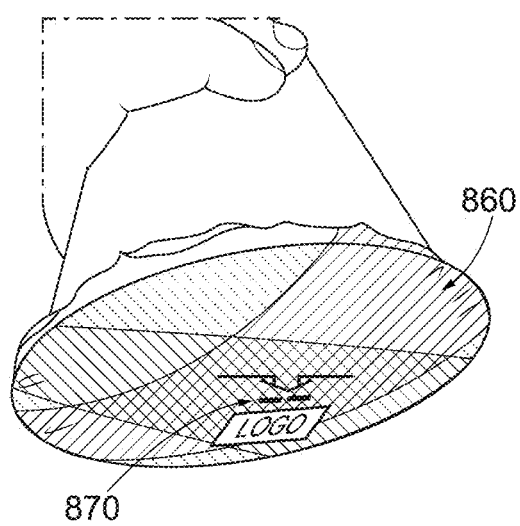

FIG. 8D illustrates example leakage protection provided by the spaced apart slits in the sealed lid shown in FIG. 8C, in accordance with some embodiments described herein.

Figure 9A:
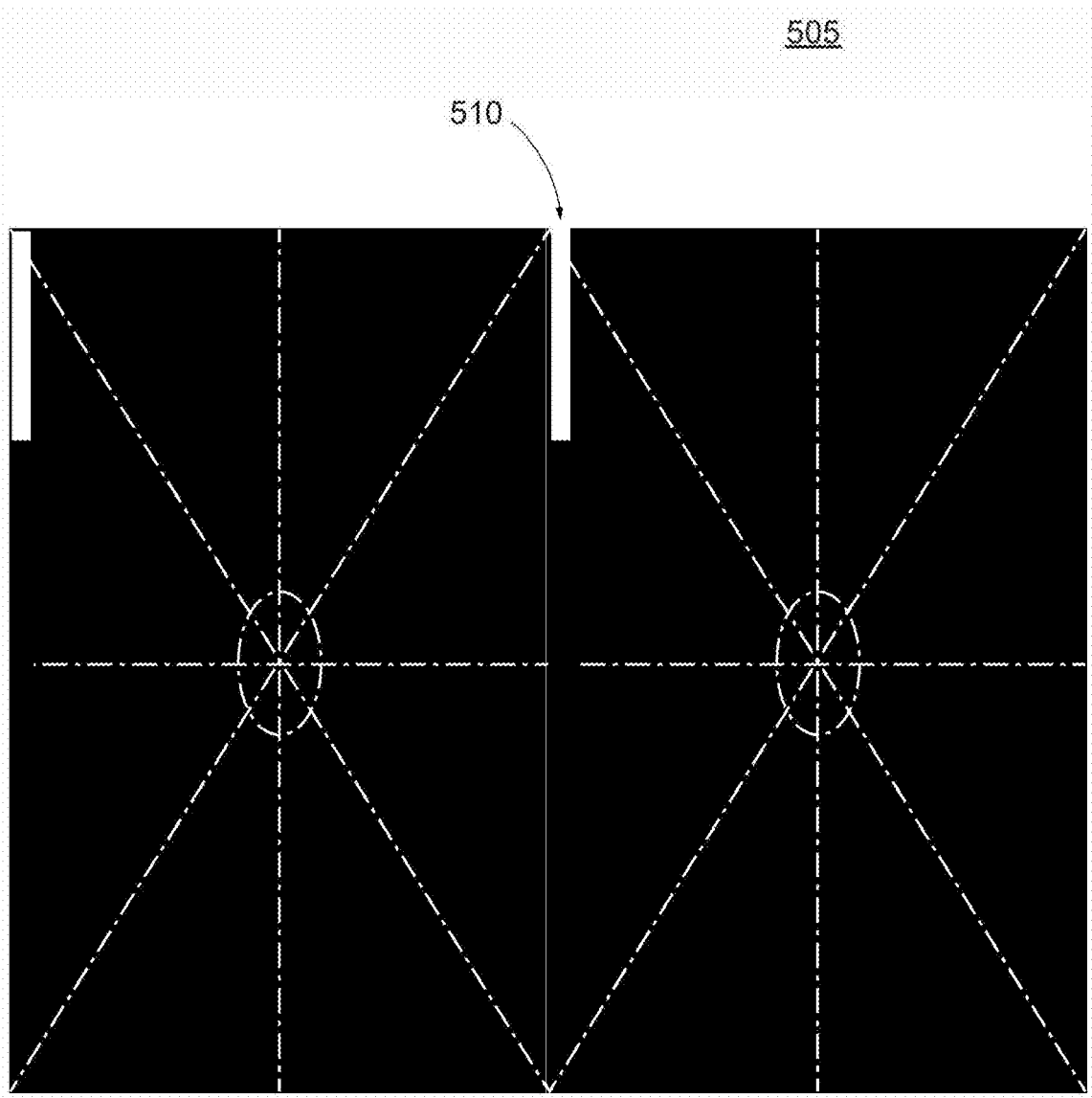

FIG. 9A is a top view of an example film that can be used in accordance with some embodiments described herein.

Figure 9B:
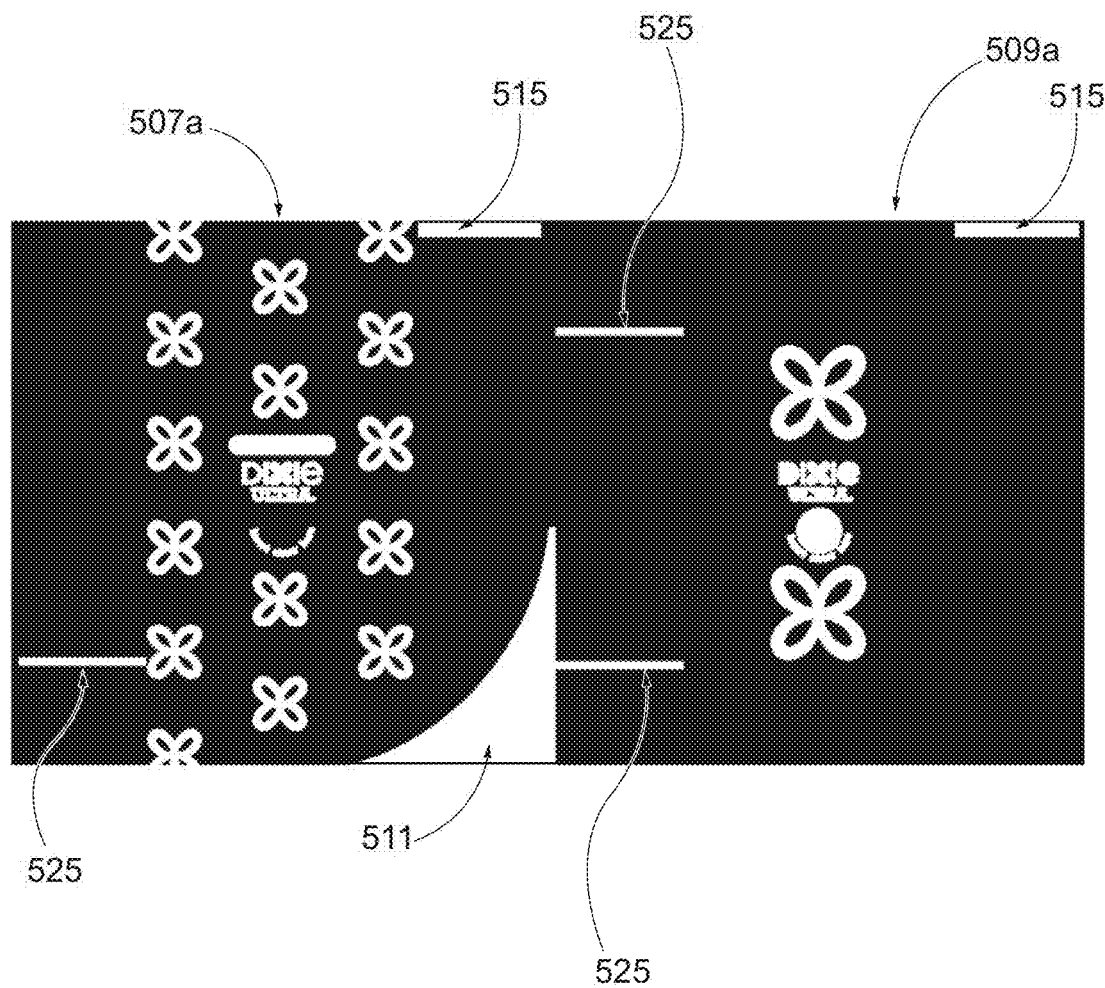
Figure 9C:
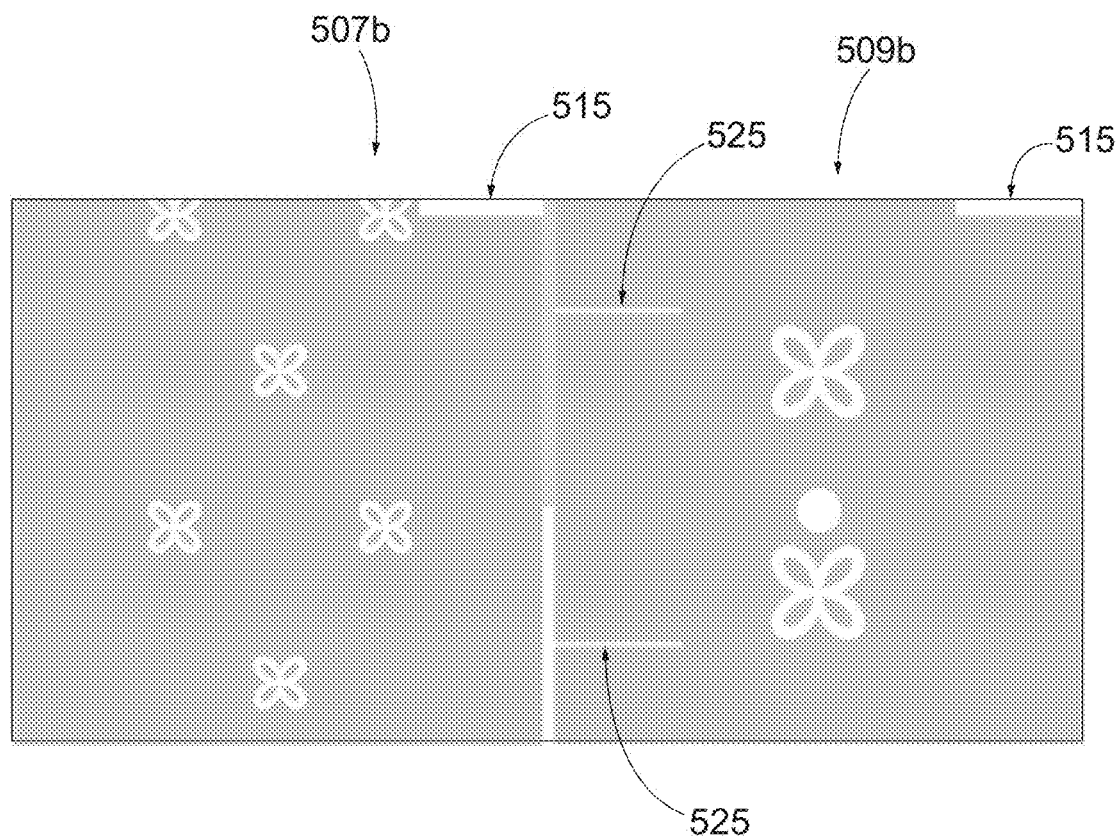
Figure 9D:
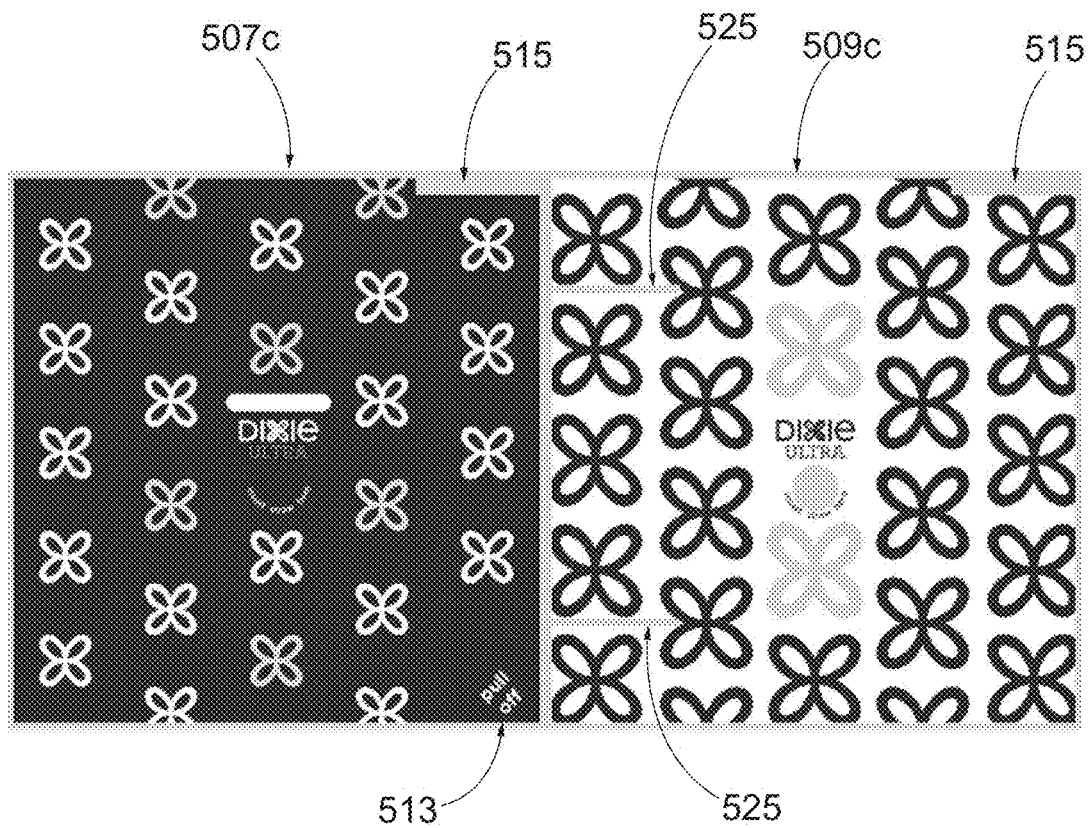
Figure 10:
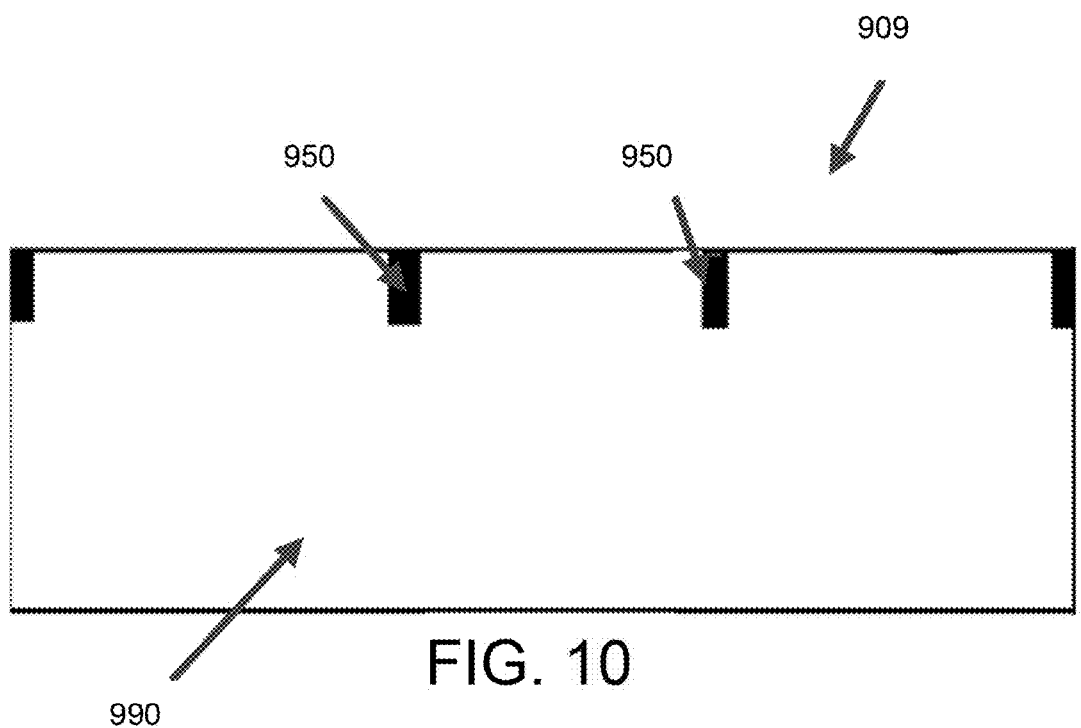
Figure 11:
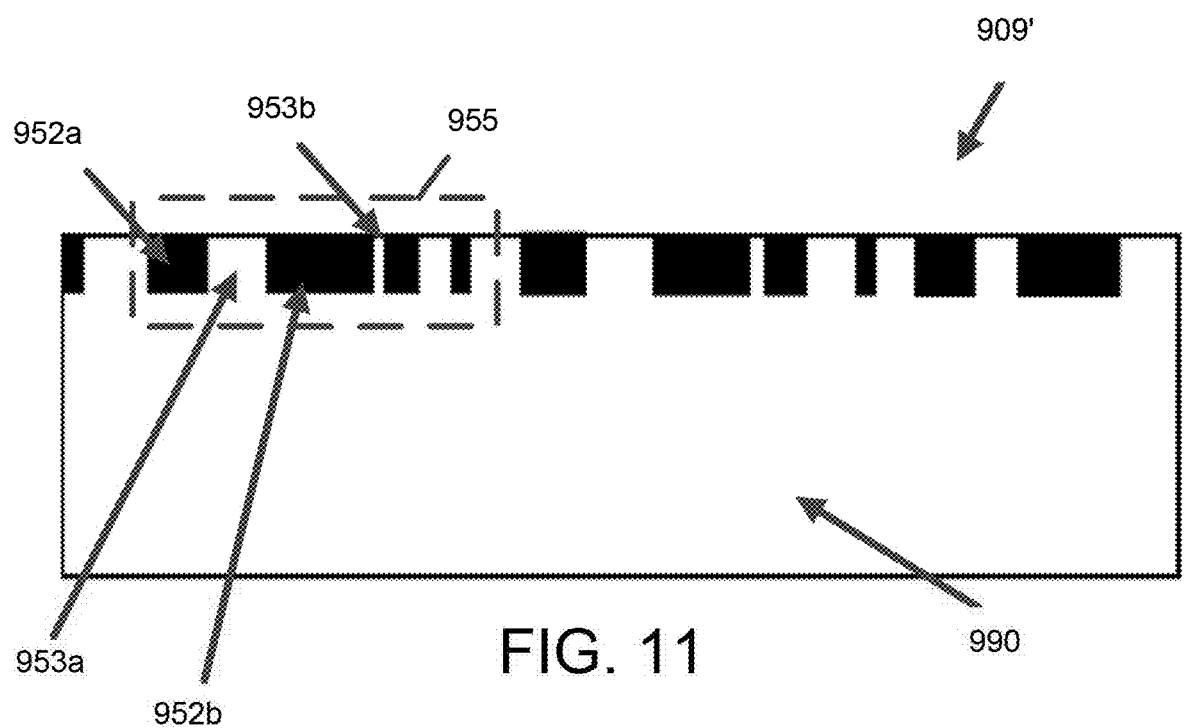
Figure 12:
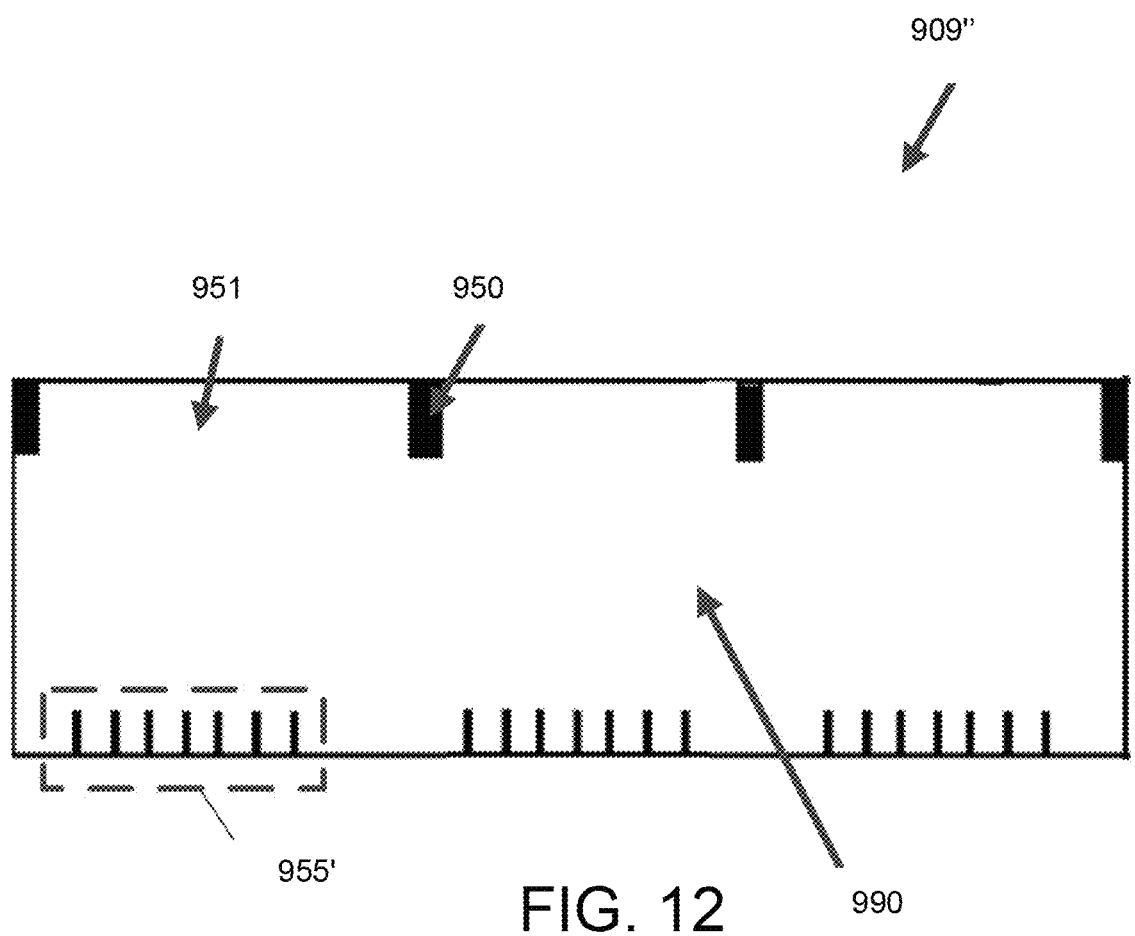

FIG. 9B is a top view of a portion of a film supply, where a radiation-absorbing layer of ink has been applied to the film supply, in accordance with some embodiments described herein;

FIG. 9C is a top view of the portion of the film supply shown in FIG. 9B, where a first non-radiation-absorbing layer of ink has been applied to the film supply, in accordance with some embodiments described herein;

FIG. 9D is a top view of the portion of the film supply shown in FIG. 9C, where a second non-radiation-absorbing layer of ink has been applied to the film supply, in accordance with some embodiments described herein;

FIGS. 10-12 illustrates various example film marking schemes, in accordance with some embodiments described herein.

Figure 13:
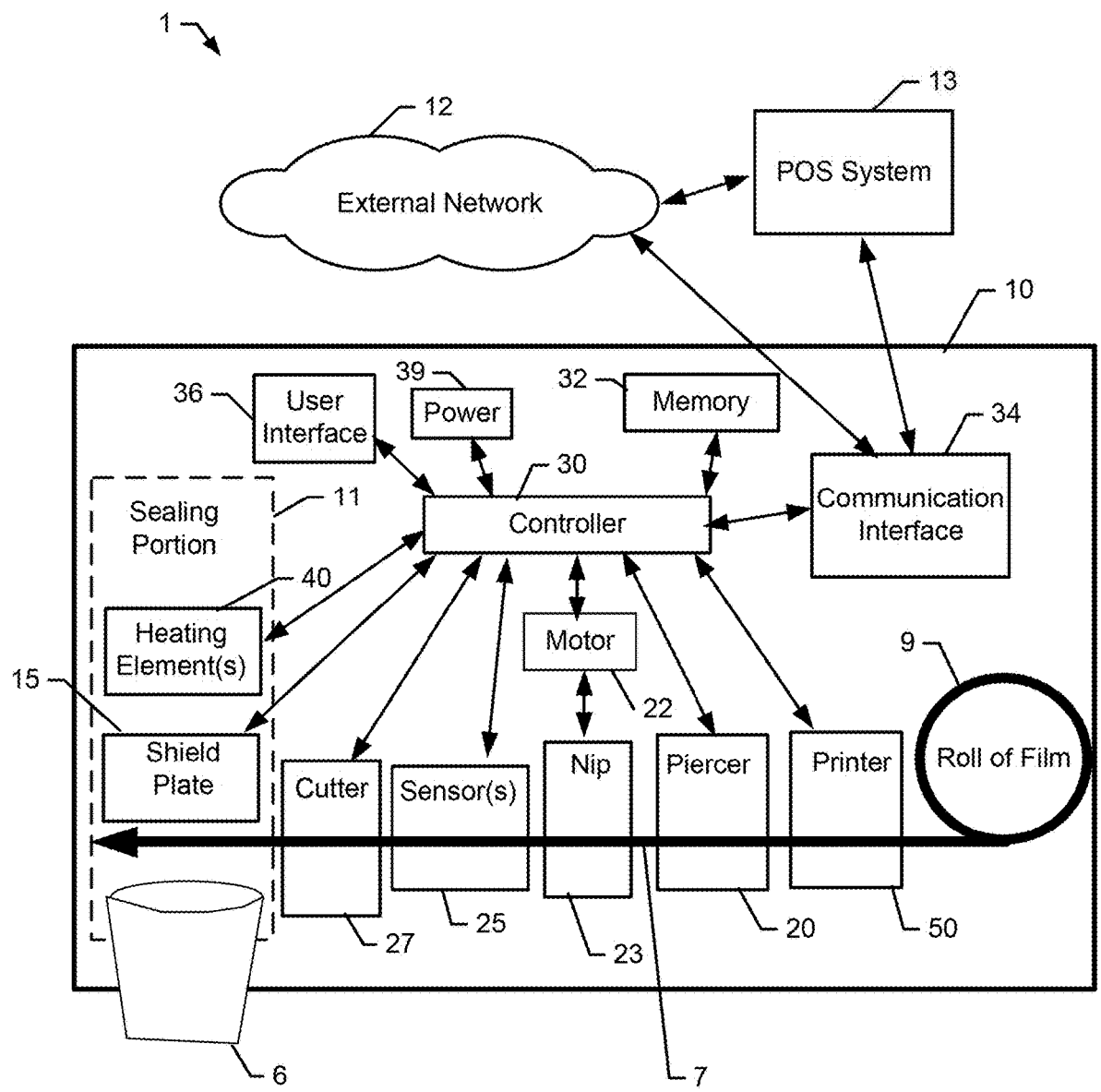

FIG. 13 shows a block diagram of an example system utilizing an example sealing apparatus, in accordance with some embodiments described herein.

Figure 14:
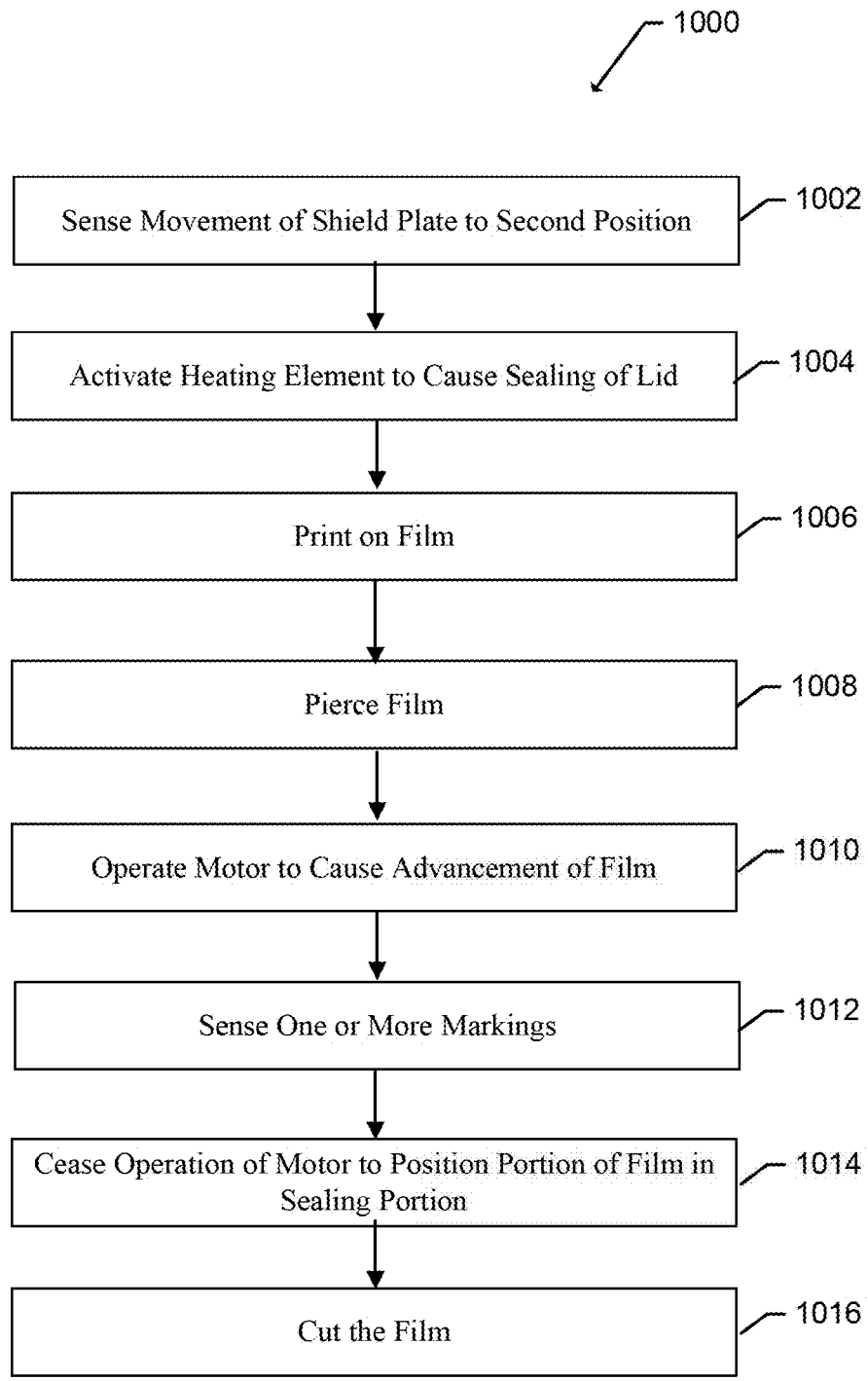

FIG. 14 illustrates a flowchart of an example method for operating an example sealing apparatus, in accordance with some embodiments described herein.

Figure 15:
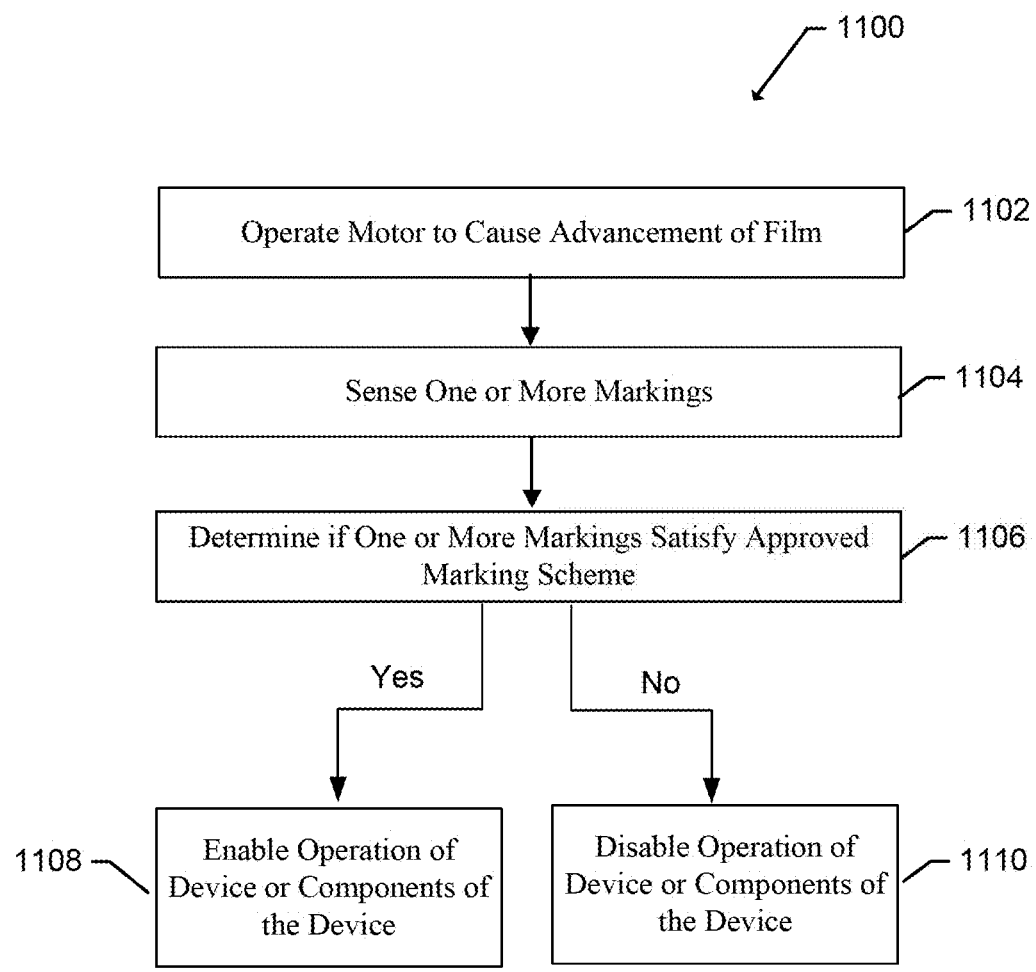

FIG. 15 illustrates a flowchart of an example method for confirming use of an approved film with an example sealing apparatus utilizing a marking scheme on the film, in accordance with some embodiments described herein.

Figure 16:
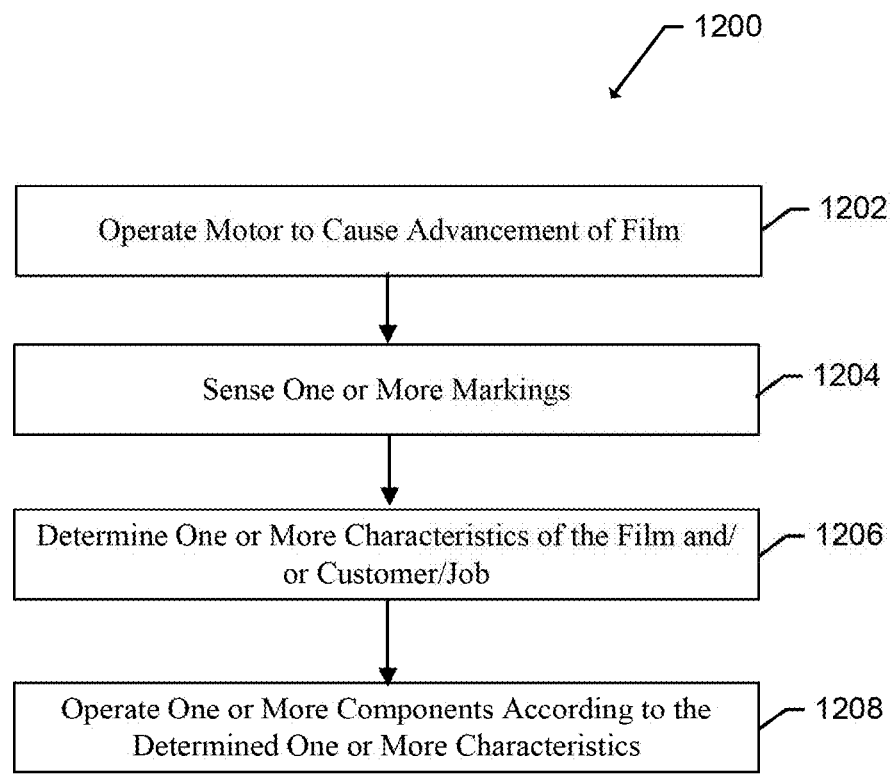

FIG. 16 illustrates a flowchart of an example method for operating an example sealing apparatus utilizing a marking scheme on the film, in accordance with some embodiments described herein.

Figure 17:
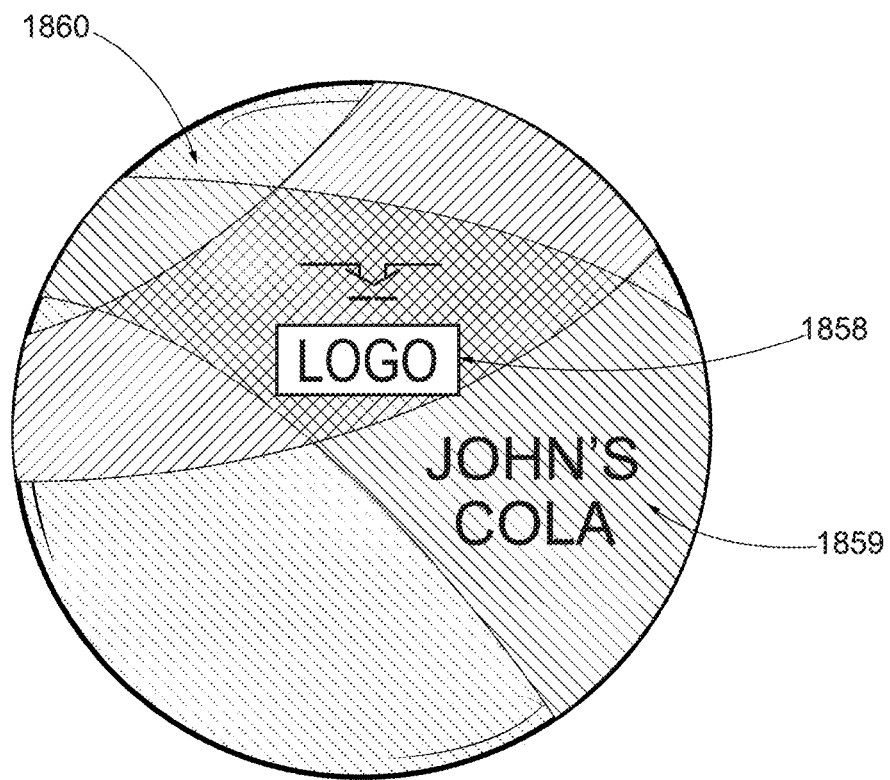

FIG. 17 shows an example sealing lid with a customized message printed on the lid, in accordance with some embodiments described herein.

DETAILED DESCRIPTION OF THE PREFERRED EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

In accordance with the disclosed subject matter, an apparatus to secure a film to a container to form a seal (e.g., a full seal, a partial seal, etc.) of the container to at least partially cover and/or inhibit flow from the container is provided. Solely for purpose of illustration, embodiments of an example sealing apparatus to secure a film to a container in accordance with the disclosed subject matter is shown in FIGS. 1A-1C. The examples herein are not intended to limit the scope of the disclosed subject matter in any manner. Particularly, and as illustrated, the apparatus 100, 100' can have a body portion 200, 200' and securing portion 300, 300'.

FIG. 2A is a cross-sectional side view of an example apparatus 100, in accordance with the disclosed subject matter. As depicted, the securing portion 300 can be positioned at a front of the apparatus 100 and adjacent to the body portion 200. The body portion 200 can be positioned at the back of the apparatus. As further described herein, the body portion 200 can house a length of film therein, such as a roll of film, that can feed into the securing portion 300. The securing portion 300 can further include a securing head assembly 400 with a sealing portion 301 that secures a film to a top of a container. FIG. 2B shows another example apparatus 100' with a body portion 200' and a securing portion 300'. Notably, FIG. 2B also illustrates an example film path 211' for the film to travel through the apparatus from the roll of film 500' to the loading zone within the sealing portion 301'.

For purposes of illustration, and not limitation, FIGS. 3A-3C show the operation of the apparatus with respect to a representative container, such as a disposable beverage cup. FIG. 3A depicts a length of film in the sealing portion in a position ready to be secured to a container 600. FIG. 3B depicts the container cooperating with the apparatus 100 to secure the film to the container during operation thereof. FIG. 3C depicts the film secured to the container prior to the apparatus feeding a next film into the loading zone. A method of operating the apparatus and reference to FIGS. 3A-3C is discussed throughout the specification.

Definitions

The terms used in this specification generally have their ordinary meanings in the art, within the context of this subject matter and in the specific context where each term is used. Certain terms are defined below to provide additional guidance in describing the disclosed subject matter.

As used in the specification and the appended claims, the singular forms "a," "an" and "the" include plural references unless the context clearly dictates otherwise. Thus, for example, reference to "a component" can include a plurality of components.

The term "about" or "approximately" means within an acceptable error range for the particular value as determined by one of ordinary skill in the art, which will depend in part on how the value is measured or determined, i.e., the limitations of the measurement system.

Example Body of Apparatus

The body portion of the illustrated apparatus may contain the initial film loading, a piercer, film rollers, film sensors, a film cutter, and a guide support assembly, among other components, as described herein.

The apparatus 100, 100' can include a body portion 200, as shown in FIGS. 2A and 2B. FIGS. 4A-4B are side perspective views of various portions of the apparatus of FIG. 2A. FIG. 4C is side perspective view of another portion of the apparatus of FIG. 2B.

As shown in FIGS. 1A and 1B, the body portion 200, 200' can include a body cover 205, 205', and any other suitable structure to contain the machinery therein. The body cover 205, 205' can be coupled to the body portion 200, 200', for example pivotably coupled by a hinge, screws, positioning, or other coupling devices, and additionally or alternatively, by friction and/or gravity alone. The body cover 205, 205' can improve the usability, safety, aesthetics, and other properties of the apparatus 100. For example, the body cover 205, 205' can improve usability by reducing the amount of debris that enters the body portion 200, 200'. The body cover 205, 205' can contribute to the safe operation of the apparatus, such as by reducing the likelihood of bodily contact with internal machinery. The body cover 205, 205' can be sized and/or shaped to accommodate a roll of film to be used for securement to containers.

The body portion 200, 200' can comprise various features, including for example the body cover 205, 205', a first and second film support roller 210, 201', 215, 215', a piercer 220, 220' with a piercing tip 225, a printer 250, a nip including a drive roller 235, 235' and a pinch roller 230, 230', a motor 213' (such as for operating the drive roller 235, 235'), and one or more film sensors 240. Although depicted and described as being in the body portion 200, 200', any of the features can be located in any other suitable location. For example, at least one of the piercer 220, 220', the printer 250, the nip, and the film sensor 240 can be located in the securing portion 300, 300'.

As shown in FIGS. 2A, 3B, and 4B, the apparatus 100, 100' can comprise a first film support roller 210, 210' and second film support roller 215, 215' to cooperatively support a roll of film 500, 500'. That is, the roll of film 500, 500' can rest between the first film support roller 210, 210' and the second film support roller 215, 215' and be capable of rotation with respect thereto (although other forms of holding the roll of film are contemplated herein, such as with a roll holder). As shown in FIG. 4B, the first and second film support rollers 210, 215 can support the roll from underneath, whereas the movable arm 255 can ensure that the roll of film 500 is properly positioned transversely in the apparatus. The arm 255 and the body cover 205 can move independent to each other, as shown in FIGS. 4A and 4B, such as to enable replacement of an empty roll of film with a replacement roll of film and loading of the leading edge of the roll of film into the nip (e.g., due to the arm 255 including the pinch roller 230 such that the pinch roller 230 is removed from the film path 211'). In some embodiments, one or both of the film support rollers 210, 210', 215, 215' is mechanically rotated. As such, the rotation of one or both of the film support rollers 210, 210', 215, 215' imparts rotation to the supported roll of film.

In other embodiments, one or both of the film support rollers 210, 210', 215, 215' is capable of passively rotating with non-negligible resistance. In those embodiments, rotation of the roll of film imparts a rotational force on the film support rollers 210, 210', 215, 215'. The non-negligible resistance imparts rotational resistance to the roll of film, thereby imparting tension in the film between the roll of film and the drive roller 235, 235'. In still other embodiments, one or both of the film support rollers 210, 210', 215, 215' can be prevented from rotating. In such embodiments, lack of rotation causes slippage to occur between one or both of the film support rollers 210, 210', 215, 215' and the roll of film 500, 500', imparting rotational resistance to the roll of film, thereby imparting tension in the film between the roll of film and the drive roller 235, 215'. In this regard, in some embodiments, the controller is configured to operate the motor to cause a different rotation speed of the drive roller in comparison to a film support roller for the supply of film so as to form tension in the film (which may aid with piercing and/or printing of the film). Although the one or more film support rollers are depicted upstream from the securing portion 300, the one or more film support rollers can be positioned at a location in any direction along the path of the film 211'.

In some embodiments, the apparatus 100, 100' may include a film supply window that may enable a user to determine/approximate an amount of film supply remaining on an installed roll, such as without opening the body cover 205, 205'. For example, the apparatus 100' shown in FIG. 2B includes a film supply window 208' that is positioned on the top of the body cover 205, 205'.

Example Piercer

In accordance with another aspect of the present invention, the apparatus 100, 100' may include a piercer 220, 220' having one or more protrusions 225 (e.g., tips, blades, etc.). In some embodiments, the piercer and the protrusions are monolithic such that the piercer is actuatable. The protrusions 225 can impart an impression upon (or through) a film to weaken the film at such a location for ventilation and/or for insertion of a drinking straw, for purposes of example. The piercer 220, 220' can actuate the protrusions 225 in any suitable way, for example by electromagnetism via a solenoid, by hydraulics, by a rotating arm actuator, by a linear actuator, or the like. In other embodiments, the entire piercer 220, 220', including protrusions 225, is actuatable with respect to the body portion. In other embodiments, the piercer 220, 220' does not contain protrusions 225. Piercers without protrusions can include, for example, air jets, lasers, blast heaters, or any other suitable piercer.

Protrusions 225 can actuate with respect to the piercer 220, 220' and/or with respect to the body portion 200, 200'. The protrusions 225 can have a variety of shapes, for example, protrusions 225 can be comprised of one or more blades. Additionally or alternatively protrusions 225 can have a pyramid shape, such as a triangular pyramid, a square pyramid, a star pyramid, or other shapes as desired. Additionally or alternatively, protrusions 225 can be shaped to have a series of needle-shaped protrusions. With such configurations, protrusions 225 can impart an opening or perforation pattern on a film. Additionally still, the protrusions 225 can be a circumferential blade having a closed shape. Accordingly, protrusions 225 can remove pieces of film 505 such as by way of kiss cutting. In some embodiments, the protrusions 225 are removable from the piercer 220, 220' to be exchanged for a piercing tip of a different construction.

The piercer 220, 220' can be positioned at any suitable location in the apparatus including being positioned in the securing portion 300. For example, the piercer 220 can be positioned above the securing head assembly 400. The piercer can be configured to pierce film 505 shortly before securement, during securement, or shortly after securement. In some embodiments, the piercer 220 includes a piercing rod coupled to the piercing tip 225, wherein the piercing rod is coaxial with and movable with respect to the guide rod of the securing head assembly 400.

In some embodiments, a controller (e.g., controller 30 described with respect to FIG. 13), may be configured to cause actuation of the piercer 220, 220' to cause the perforations or slits to be created in the film, such as it travels along the film path 211'. In some embodiments, the controller may be configured to control the relative position of the perforations or slits on the lid, such as based on a desired operational parameter for the anticipated product or the utilized film.

In some embodiments, the piercer 220, 220' may be configured with two or more spaced apart protrusions (e.g., tips, blades, etc.). An example such piercer 820 is shown in FIG. 8B. The depicted piercer 820 includes a first protrusion 825a and a second protrusion 825b that are spaced apart. In some embodiments, the piercer may form a single device with two or more spaced apart protrusions. In some embodiments, the two or more spaced apart protrusions may be formed of two spaced apart protrusions extending from a single device. In other embodiments, there may be two separate devices that each form a protrusion—to thereby form the spaced apart protrusions. In some embodiments, a single protrusion may be used to form two spaced apart slits/perforations on the film. In such example embodiments the piercer with a single protrusion may move to a different location on the film in between punctures of the film to form the two spaced apart slits/perforations. Alternatively, the film may move to cause the piercer to puncture the film in different locations (e.g., in the machine direction).

In this regard, when applied to the film, such an example piercer 802 creates two spaced apart slits/perforations on the film. For example, FIG. 8C illustrates an example sealed lid 860 with two spaced apart slits 870a and 870b with a portion of the lid 860 remaining intact therebetween. Notably, the separation of the slit 870a and 870b provides for an elongated point of weakness—which provides for desirable ventilation and a greater weakness point for ease of insertion of a straw, while still providing preferable leakage protection, such as illustrated in FIG. 8D. For example, the extra lid material between the first slit 870a and the second slit 870b may keep the edges of the slit film sufficiently closed so as to allow sufficient surface tension to be created by liquid at surface—thereby minimizing/avoiding leakage through the slits 870. In this regard, the two spaced apart slits are designed to enable venting and discourage leaking when the container is tilted such as due to the surface tension between the liquid and the portion of the lid between the spaced apart slits. In contrast, a single elongated slit, such as shown as slit 770 on the sealed lid 760 in FIG. 8A, of the same length as multiple slits may allow undesirable leakage when the container is tipped. Said differently, in comparison to a continuous length slit of similar overall length, the double spaced apart slits provide equivalent ventilation for the container, weakness within the lid to enable insertion of a straw, and increased leakage prevention due to increased surface tension of liquid on an inside portion of the lid. In some embodiments, the double spaced apart slits may provide slight increased resistance to insertion of a straw or other object to avoid/inhibit undesired and/or inadvertent tearing. In this regard, usage of the term equivalent is designed to account for some variation, but generally being similar in comparison.

Example Film Rollers

In some embodiments of the present invention, the example sealer device may include one or more film advancement mechanisms (e.g., nip 23 and motor 22 shown in and described with respect to FIG. 13), such as for advancing the film from the roll of film along the film path. For example, with reference to FIGS. 2A and 2B, the illustrated apparatus 100, 100' comprises a nip having a drive roller 235, 235' and a pinch roller 230, 230'. In some embodiments, the nip functions to progress film 505 into the loading zone 325 (e.g., along the film path 211'). In some embodiments, the pinch roller 230, 230' is adjustable in relation to the drive roller 235, 235' (such as being attached to the arm 255) to enable insertion of film 505 between the drive roller 235, 235' and the pinch roller 230, 230'. For example, and as shown in FIG. 4B for purpose of illustration and not limitation, the pinch roller 230, 230' can be coupled to a moveable lever arm 255. Such a configuration can simplify a process of loading a length of film 505 into the nip. In other embodiments, the pinch roller 230 is adjustable relative to the drive roller 235 to accommodate different thicknesses of film 505 therebetween. Further, in some embodiments, other ways to load the film into the nip are contemplated, such as by feeding the film into the nip as the drive roller operates to prime the nip.

In some embodiments, the driver roller 235, 235' may be rotated via a motor 213', which may be controlled by a controller of the sealing device (e.g., controller 30 shown and described in FIG. 13). In some embodiments, drive roller 235, 235' can be mechanically rotated. For example, drive roller 235, 235' can be mechanically rotated by a crank mechanism, a rotational driver, a drive shaft, a drive belt, a drive chain, or any other means of imparting rotational force. In some embodiments, pinch roller 230, 230' can freely rotate in response to a torque. For example, torque could be applied by friction between the pinch roller 230, 230' and the rotating drive roller 235, 235', or by friction between the pinch roller 230, 230' and the film 505.

In some embodiments, the driver roller 235, 235' can be mechanically coupled to at least one of the film support rollers 210, 210', 215, 215'. For example, drive roller 235, 235' and the at least one film support roller can be mechanically coupled by a drive shaft, a drive belt, a drive chain, or other suitable couplings. The body portion 200, 200' can further comprise a film support roller 210, 210' to support a length of film, wherein the drive roller 235, 235' rotates at a faster speed than the film support roller 210, 210' such that the film can be positioned taught in along the film path. For example, the drive roller 235, 235' and film support roller 210, 210' can be geared and/or dimensioned such that their coupling imparts a different rotational speed to each roller.

Example Film Sensor

In some embodiments, the apparatus 100, 100' may include one or more film sensors 240. In some embodiments, and as shown in FIG. 5A, the film sensor 240 can comprise a film signal emitter and a film signal sensor to detect a film sensor flag 510 passing therebetween (although other types of sensors are contemplated). The film sensor flag 510 positioning can directly correspond to the position of the film as moved by the drive nip, and further discussed herein with respect to FIGS. 9A-9D. The film signal emitter can continuously emit a light signal capable of being detected by the film signal sensor. Film 505 can be positioned between the film signal emitter 241 and the film signal sensor 242, such that opaque portions of the film 505 block the light signal where opaque. However, when the film sensor 240 detects a change of the film, such as when detecting a transparent portion/window of the film or a film sensor flag 510, the film sensor 240 can send a signal input indicating that the continuous emission of the signal emitter has been disrupted. Accordingly, as the film 505 moves between the film signal emitter 241 and film signal sensor 242, the film sensor flag 510 or transparent window can allow transmission of the light signal to the film signal sensor. The film signal sensor, upon detecting the light signal or a change in the intensity of the light signal, can register that the film 505 has progressed upstream and generate a film sensor input. In other embodiments, a reverse set up can be provided. That is, the film can allow transmission of the light signal to the film signal sensor 242 until it is blocked or partially blocked by the film once the film has progressed. The film signal sensor, upon detecting the reduction of the light signal, can register that the film has progressed and generate a film sensor input to deactivate the drive nip.

In other embodiments, the film sensor 240 can be any sensor suitable for detecting the progression. For example, the film sensor 240 can include at least one of a light sensor as described, a mechanical sensor, a motion sensor, among others. A mechanical sensor can include a rotational sensor, that is rotated by progression of the film, and registers that the film has progressed upon rotation. For example, a mechanical sensor can register a degree of progression by the amount of rotation. In some embodiments, a rotational sensor can be coupled to the pinch roller 230 to detect rotation thereof.

In some embodiments, the drive roller 235, 235' can be can be mechanically rotated based on input from the film sensor 240. That is, in response to film sensor inputs by the film sensor 240, the drive roller 235, 235' can have its rotation initiated, continued, or ceased. For example, after a securement cycle, rotation of drive roller 235, 235' can be initiated, film sensor 240 can detect progression of film 505, and film sensor 240 can provide a film sensor input. In response to the film sensor input, rotation of drive roller 235 can be ceased.

Solely for purpose of illustration, reference is now made to FIG. 9A, which is a top perspective view of a film that can be used in conjunction with an apparatus of the disclosed subject matter. In some embodiments, and as shown for purpose of illustration and not limitation, the film 505 can include at least one film window 510 or other marking. As described above, with respect to the film sensor, the at least one film window 510 can allow at least partial transmission of the film sensor signal to indicate progression or the location of the film 505 relative to the dispenser.

In some embodiments, the film can include a plurality of film windows 510 (e.g., markings) spaced along a length of film at regular intervals. For example, in some embodiments, the plurality of film windows 510 can be spaced a distance corresponding to a predetermined length of film to be secured to a container, such as for purposes of example spaced at a distance of every 15 cm. In some embodiments using film windows spaced as above, the film sensor 240 can generate a film sensor input upon detecting a single film window to allow the film sensor to cooperate with a film cutter in creating the predetermined length of film. In other embodiments, the film window can alternatively be a suitable marking distinguishable from the remaining film area. In some embodiments, the windows (or markings) may be clear, printed, reflective, or printed with an ink that is not visible or readily visible to a human eye, such as phosphorescent ink. In this regard, in some embodiments, the one or more markings may be formed using ink or other coatings.

In other embodiments, the plurality of windows 510 are spaced at a distance corresponding to a small quantized value. In some embodiments using film windows 510 spaced at a small quantized distance, the film sensor 240 can generate a film sensor input upon sensing a predetermined plurality of film windows 510. For example, the film windows 510 can be spaced at a distance of 25 mm, and the film sensor 240 can generate a film sensor input upon sensing the passage of six windows. As such, the apparatus can be programmed to generate different lengths of film for depositing within the loading zone to complement various sized containers thus minimizing film waste. In some embodiments, the film sensor 240 can be adjusted such that the number of film windows 510 needed to pass before a film sensor input is generated. For example, a command received prior to the initialization of film progression can determine the number of film windows 510 desired to pass. In some embodiments, the command can be received by the input device 315 and can be further processed such as by a computer operatively coupled with the apparatus, as further discussed herein. As detailed herein, the input device 315 may be used to provide many different types of input that can be recognized (such as by the controller 30) and used to affect operation of the scaling apparatus (e.g., what temperature to operate the heating element(s) at, what to print on the film, etc.).

FIGS. 9B-9D illustrate an example portion of film 505 that includes a plurality of portions (e.g., FIG. 9B illustrates portion 507a followed (e.g., along a machine direction) by portion 509a). In order to form the aesthetic look of the seal, such as seal 760 shown and described with respect to FIG. 8A, one or more layers of ink may be applied to the film 505. Notably, some of the layers of ink may be radiation-absorbing so as to be particularly susceptible to heat, so as to shrink (e.g., around the top of the container) to form the seal (such as described herein). In this regard, FIG. 9B illustrates a first layer of ink that includes radiation-absorbing ink. FIG. 9C illustrates an applied second layer of ink over the first layer of ink on both portions 507b, 509b. Notably, however, in some embodiments, the second layer of ink may be non-radiation-absorbing (or less radiation-absorbing) such that the ink is not particularly susceptible to heat and, thus, does not shrink during application of heat by the heating elements (such as described further herein). FIG. 9D illustrates an applied third layer of ink over the first and second layers of ink on both portions 507c, 509c. In this regard, the one or more images or patterns can be built-up based on colors applied via the layers of ink.

Further, however, in some embodiments, one or more markings (e.g., windows) may be provided such as described herein. For example, windows 515 and markings 525 may be unapplied portions of the radiation-absorbing layer of ink for portions 507a, 509a such that they are detectable (e.g., as described herein). Depending on the desired look of the film, such windows 515 or markings 525 may be covered with one or more layers of ink (e.g., non-radiation-absorbing layers of ink) and still be detectable. For example, with reference to FIG. 9C, the marking 525 on portion 507b was covered with the corresponding layer of ink.

In some embodiments, the film sensor(s) 240 may be configured to sense one or more markings, marking schemes, and/or characteristics corresponding to the markings or marking schemes.

In this regard, in some embodiments, the one or more markings may correspond to a marking pattern comprised of a plurality of markings and/or determined spacing between each adjacent marking within the plurality of markings. In some embodiments, the film sensor may be configured to detect various characteristics of the markings or marking schemes, such as the color of the one or more markings, a width of the one or more markings, a length of the one or more markings, or a spacing between adjacent markings. Notably, in some embodiments, the marking scheme may be repeated along the length of the roll of film such that the roll of film comprises a plurality of repeated film marking schemes. As described further herein, such information could be used to determine various characteristics of the film and/or control the device accordingly.

FIG. 10 shows an example film portion 909 with a marking scheme. The film sensor(s) may be configured to read the markings 950 and/or various characteristics regarding the read markings, such as their width, their length, or the distance between adjacent marks. FIG. 11 illustrates another example film portion 909' with a more complex marking scheme that could be used to convey even more information. In this regard, the various widths and distances between the markings may be sensed and used to convey that information to the device. In the illustrated embodiment, a repeatable series of individual markings could be considered a single repeated marking scheme/pattern (indicated by the dashed line box 955). In particular, the illustrated marking scheme 955 includes a series of black markings 952a, 952b (or color markings) of varying widths that are each separated by white space 953a, 953b (or white markings, blank markings, etc.) of varying widths. FIG. 12 illustrates another example film portion 909" with marking schemes on both edges of the film (e.g., markings 950 and 951 on one edge and marking scheme 955' on the other edge). In such an example embodiment, more than one film sensor could be used to gather the desired information. Further, different edges of the film could convey different information. For example, the markings 950 may be used to provide data regarding the length of film being conveyed (such as for determining when to turn off the motor) and the marking scheme 955' may provide information used to determine various characteristics of the film and/or control the device accordingly. Likewise, a type of cut marking could be maintained on one side (such that it could be used with a standard cut-to-mark system), while the other side could be used to provide other marking schemes and convey additional information.

Notably, in the illustrated embodiments the markings are positioned proximate the edges of the film, which may enable various features to be accomplished in the center of the film 990, such as may translate to the portion of the film that will form the lid of the container. In this regard, such as described further herein, a printer may print one or more messages or images on the film in the center section 909 and/or the piercer could form the slits/perforations in the center section 990.

Though the depicted markings are shown as black markings and white/blank markings, other types of markings are contemplated, such as barcodes, color markings, quick response (QR) codes, among others. In some embodiments, logos or other images on the film may be utilized as markings. In some embodiments, the film sensor may also be configured to measure or sense other types of markings, such as holes, bumps, or other features of the film. In this regard, the film sensor(s) may be configured to read any such markings or subsets/combinations of any such markings.

Example Film Cutter

In some embodiments, the apparatus 100, 100' can further include a film cutter to cut a predetermined length of film from a film roll. For example, FIG. 5C illustrates an example cutter 214' that includes driving mechanism 216'. The predetermined length of film can be sized to cover the top opening of a container to allow the film to be secured to the container for a suitable seal thereon. In some embodiments, the film cutter is positioned along the film path 211' between the loading zone 325 and the nip comprised of the drive roller 235, 235' and the pinch roller 230, 230'. In some embodiments, the film cutter comprises at least one of a guillotine cutter and a shear cutter. Additionally or alternatively, the film cutter can comprise any cutter suitable for cutting the film 505 or at least perforating the film to create segments of film. For example, the film cutter can include a rotary cutter, an air jet cutter, a laser cutter, a blast heater cutter, or any other suitable cutter.

In some embodiments, the film 505 can travel along a longitudinal path. For example, the film 505 can travel along a longitudinal path within the body portion 200 of the apparatus 100. In some embodiments, the film support roller 210, the drive nip, and the loading zone 325 are arranged along the longitudinal path. In other embodiments the path is non-linear.

In some embodiments, a controller (e.g., the controller 30) may be configured to control actuation of the film cutter to cause the portion of the film to be cut from the roll of film. As described herein, such control may be based on a measured distance of travel of the film along a film path and may be based on data conveyed from one or more markings.

In some embodiments, with reference to FIG. 2B, the apparatus 100, 100' may include an edge cutter, such as a manual sliding cutter 251'. The edge cutter may be configured to cut a clean edge of the film. In this regard, in some cases, the film may form a jagged or wrinkled edge that makes it difficult to load or operate the sealing apparatus 100, 100'. For example, after a film jam incident, the film may be bunched up, wrinkled, or have an uneven edge. The edge cutter may be used to cut the film and re-load it through the sealing apparatus 100, 100'. In some embodiments, the edge cutter may be manually actuated such that an operator must directly operate it accordingly. In some embodiments, the edge cutter comprises a sliding cutter that includes a movable knife that can be moved within a track across a width of the film to thereby cut the film and form a clean edge.

Example Guide Assembly

As shown in FIGS. 5A-5B, the apparatus can further include a guide assembly to guide the film between the body portion 200, 200' to the securing portion 300, 300'. The guide assembly can comprise an entry structure 270 and a guide support assembly 445.

The entry structure 270 can be downstream the drive nip and channel the film towards the loading zone 325 in the sealing portion 301, 301'. The entry structure 270 can define a funnel 272 with a wider entry opening and narrower exit to steer a leading end of the film through the entry structure 270 and towards the loading zone 326. In an example embodiment, the entry opening is approximately ⅛th inch.

Once the film enters through the entry structure 270 the film can progress to a guide support assembly 445 of the apparatus. The guide support assembly 445 can include a ramp 446 and at least one guide truss 447 (e.g., ribs) to guide the film from the body portion to the securing portion. The ramp is configured to receive a predetermined length of film (e.g., film cut from the roll) from the body portion 200, 200' to guide a leading end of the film to the loading zone 325. The ramp 446 has a surface extending from a first end to a second end thereof, as shown in FIGS. 5A and B. The ramp surface is oriented at an angle of inclination that can be less than or equal to 85 degrees, or more preferably in a range from about 10-65 degrees. In some embodiments, the second end of the ramp is coupled to a guide surface 448 configured to receive a film 505 from the surface of the ramp, as shown in FIGS. 5A and B.

The guide assembly can serve to facilitate proper progression of the film 505 into the loading zone 325. For example, the guide support ramp can promote movement of the leading end of a film in the direction upward of the inclination. In this manner, the film 505 can have a reduced likelihood of progressing in a direction other than toward the loading zone 325 and reduce the likelihood the film from falling into a gap (e.g., the aperture for receiving the container). In particular, the progressing film can intersect the ramp and progress therealong (e.g., along the guide trusses 447, which may be spread along the width direction of the film path), thus progressing toward the loading zone. In this regard, in some embodiments, the combination of the ramp 446 and the one or more guide trusses 447 may form a guide for directing the leading edge of the film such that the leading edge of the film clears the gap/aperture and rests on the other side of the gap/aperture.

In some embodiments, the shield plate may be positioned to cover a second aperture leading into the sealing portion, such as shown in FIG. 5B. In such an embodiment, the shield plate may form a top boundary guide for directing the leading edge of the film through the loading zone 325.

Furthermore, the entry structure together with the guide support assembly creates the guide assembly structure to enable the film to be positioned in the loading zone at a close vertical proximity to the shield plate in a ready position, thus limiting the gap distance between the film of the loading zone and the shield plate, as further discussed herein. Reducing the gap distance reduces the distance a container may be required to move further within the apparatus before activation of the heating elements. Accordingly, the film of the loading zone would only need to travel a distance between a top of a truss and the bottom surface of the shield plate to initially engage the shield plate.

In some embodiments, the guide support assembly 445 can comprise a plurality of guide trusses, each capable of receiving a film from the body portion. In some embodiments, the guide trusses can further include an end portion thereof disposed at an angle of inclination, similar to the ramp. For example, in some embodiments each guide truss can extend in a direction parallel to the direction of film progression into the loading zone 325 and have at least a portion that is disposed at an angle of inclination with respect thereto.

Example Films

In accordance with some embodiments, the apparatus 100 can be used in conjunction with any suitable type of film. In operation, once heating elements are activated and energy is channeled towards the free ends of the film, the free ends of the film change shape and heat shrink about the top portion of the container, such as about a lip 602 of the container 600, as shown in FIG. 3C and further discussed below. Suitable films include those that will shrink in the presence of heat or radiant energy. For example, the film can be a plastic wrapping film which has the capability of shrinking when it is heated, and in some cases to near the melting point of the film. These films are commonly manufactured from plastic resins such as polyvinyl chloride (PVC); polypropylene (PP); linear-low density polyethylene (LLDPE); low density polyethylene (LDPE); high density polyethylene (HDPE); copolymers of ethylene and vinyl acetate (EVA); copolymers of ethylene and vinyl alcohols (EVOH); ionomers (e.g., SURLYN™, by E.I. du Pont de Nemours and Company of Wilmington, Del.)); copolymers of vinylidene chloride (e.g., PVDC, SARAN™ ("SARAN" is a trademark of The Dow Chemical Company of Midland, Mich.)); copolymers of ethylene acrylic acid (EAA); polyamides (PA); polyester, polystyrene, nylon and copolymers of ethylene and octene. Additionally or alternatively, the film can be a bi-axially oriented thin shrink film having a thickness of between 40 to 120 gauge (1.02 mm to 3.05 mm). In another embodiment, the film can be a bi-axially oriented thin shrink film having a thickness of between 60 to 100 gauge (1.52 mm to 2.54 mm).

In accordance with some embodiments, the film can further include at least one energy absorbing substance (e.g., a radiation-absorbing layer of ink) on at least part of the film. In some embodiments, the one or more energy absorbing substances can be pre-applied to the film, such as by printing, brushing, spray coating, electrostatic coating, electrodeposition coating, flow coating, roller coating, dip coating, among others. Additionally or alternatively, the substances can be incorporated into the film during formation or manufacture thereof. In other embodiments, the one or more substances can be printed onto the film during operation of the disclosed apparatus. Such substances can allow or enable shrinking of the film at the desired locations to create a suitable seal.

The film can be dimensioned to operate within the confines of the apparatus. In one embodiment, the film can have a width dimension of between approximately 8 and approximately 30 cm. In some embodiments, the film can be cut to a predetermined length dimension of between approximately 8 to approximately 30 cm. In some embodiments, the width and lengths dimensions of the predetermined dimensioned film can be the same. In some embodiments, the predetermined dimensioned film can be square, although other shapes are contemplated herein.

In some embodiments, the film can have a degree of elasticity. As such, when the film is secured to a top of the container and thereafter removed from the container, the removed film maintains its shape with respect to the heat shrunk edges, and the film can be reapplied to the top of the container for securement.

In some embodiments, the film may be pre-printed prior to installation into the sealing device. For example, such as described herein, the film may include one or more markings pre-printed thereon. In this regard, as is consistent with various embodiments described herein, the one or more markings may be configured to be read by the film sensor(s) or other components to provide information/data for use in operation of the sealing device. For example, with reference to FIGS. 9-12 and the corresponding description herein, the roll of film may include a repeated marking scheme configured to be read by a film sensor of the automatic sealer. Depending on the desired functionality, the marking scheme may be utilized to affect operation of the automatic sealer (e.g., sealing device) and/or one or more components thereof. For example, the marking scheme may be checked against an approved marking scheme list/database and corresponding affecting (e.g., disabling, enabling, changing, etc.) operation of the automatic sealer and/or components thereof may occur.

In some embodiments, the repeated marking scheme on the film may comprise characteristics formed of at least one of the color of one or more markings of the repeated marking scheme, a width of the one or more markings of the repeated marking scheme, a length of the one or more markings of the repeated marking scheme, or a spacing between adjacent markings of the repeated marking scheme. In some embodiments, the repeated marking scheme is designed to be read by the film sensor to control operation of one or more components of the automatic sealer based on one or more characteristics of the repeated marking scheme.

In some embodiments, the repeated marking scheme is formed along its entire length. In some embodiments, various types of markings may be used, such as windows, ink, paint, a Quick Response Code, a barcode, or a logo. In some embodiments, the markings may be clear such that they are detectable by the film sensor. However, such as described herein with respect to FIGS. 9B-9D, it may be desirable to cover the clear markings with an ink that visually covers the clear marking to a user looking through the ink, but also enables detection of the clear marking through the ink. In this regard, the ink (e.g., specific layers of ink) may have specific properties that enable detection by the film sensor therethrough without allowing a user to see therethrough (e.g., the ink may be a detection transparent ink). As noted, this provides a marking that is detectable by a film sensor through the ink, but that is non-visible by a user through the ink (e.g., the marking may be a detectable non-visible marking). Said differently, in some embodiments, the marking scheme comprises a detectable non-visible marking, wherein the detectable non-visible marking is covered using an ink that is visible to a user from the top of the film and still configured to enable detection of the marking by a film sensor from the top of the film. Further, utilizing such a detection transparent ink may provide a more consistent shrinkage of the film during formation of the lid on the container, such as opposed to when no ink was present in the marking (e.g., window).

In some embodiments, the portions of the film that are designed to form individual seals may be formed with a "pull tab" or "peel tab". For example, with reference to FIGS. 9B-9D, a corner portion 511 of the portion 507a may be unapplied with the radiation-absorbing layer of ink (e.g., with respect to a remainder of the portion 507a). In this regard, upon application of heat, the corner portion 511 may not shrink like the remainder of the portion 507a and, thus, it may remain relatively flat and available for a user to grasp and use to peel back the seal. As noted herein, additional layers of ink (e.g., non-radiation-absorbing layers of ink) may be applied over the corner portion 511 and still the corner portion 511 may not shrink. In this regard, indications or instructions to the user, such as "pull off" 513, could be printed over the corner portion 511 to direct the user.

Notably, while the above example describes a corner portion 511, other portions of the film are contemplated to form a pull or peel tab.

Example Printer

In accordance with some embodiments, the apparatus 100, 100' can further include additional components. For example, the apparatus can further comprise a printer 250 to print any suitable information (e.g., messages or images) on the film 505, such as the type of drink or product (or symbol or emoji thereof) disposed within the container as noted below (e.g., an example image (e.g., LOGO 758) is shown printed on the sealed lid 760 in FIG. 8A and another example image (e.g., LOGO 858) is shown printed on the sealed lid 860 in FIG. 8C). The printer 250 can be any suitable type of printer to make markings on film 505. For example, the printer can make markings by laser printing, ink jet printing, laser etching, or any other type of printing suitable for film 505.

In some embodiments, the printer 250 can be used to print the same message on film 505 during every securement cycle. Additionally or alternatively, printer 250 can be used to print a message on film 505 depending on an input. For example, the apparatus 100, 100' can further comprise a computer (e.g., controller 30) to receive at least one command. The computer can be operatively coupled with the apparatus. As such, the apparatus can contain the computer therein or the apparatus can cooperate with a wireless or remote computer/server. In any arrangement, the computer can send a signal to the printer 250 to print a predetermined message on film 505 associated with the at least one command when the at least one command is received. For example, the message can indicate at least one of the type of contents secured within the container, a trademark, a safety message, or any other suitable message. Alternatively or in addition thereto, the printer can be configured to receive commands through a network and wirelessly.

The printer 250 can be positioned at any suitable location within the apparatus and is not limited to placement within the body portion 200, 200'. In some embodiments, the printer 250 can be positioned in the securing portion 300, 300'. For example, the printer 250 can be positioned above the securing head assembly 400. The printer can be configured to print on film 505 shortly before securement, during securement, or shortly after securement. In some embodiments, the securing head assembly 400 and the shield plate each include a printing window through which printer 250 can print a message on film 505.

In some embodiments, such as described herein, the controller may be configured to print one or more messages or icons on the film based on input from an external device/network. For example, the controller may be in communication with a remote device/server and receive instructions or other data that may cause the controller to cause printing on the film, such as using the printer 250. As an example, the sealing apparatus 100, 100' may be in communication with a point-of-sale (POS) system (e.g., the POS system 13 shown in FIG. 13). In such an embodiments, the POS system may receive an order that may include one or more drink orders. In response, the controller 30 of the sealing apparatus 10 may be configured to receive data corresponding to the order and control its operations accordingly, such as by printing a label on the film to indicate the drink order (e.g., "Cola" or "Diet Cola"). In some embodiments, the printed message or image may be customized, such as indicating the customer (e.g., "John's Cola"). In such a manner, the corresponding sealed lid may include the appropriately printed data that can be used with fulfilling the order. In some embodiments, the determination as to what to print may occur remotely from the sealing apparatus 10 and communicated thereto, such as at the POS system 10 or some other remote system. An example customized lid 1860 with a logo 1858 and a printed customized message ("JOHN'S COLA") 1859 is shown in FIG. 17. Example systems for use with a point-of-sale system, including example print determinations and data management, may be found in U.S. patent application Ser. No. 16/212,047, entitled "Personalized Food Service Material Printing Systems", which published as U.S. Publication No. 2019/0180392, and which is owned by the Assignee of the present invention and incorporated by reference herein.

In some embodiments, the sealing device and/or the components thereof may form part of a beverage forming apparatus or system. For example, the beverage forming apparatus/system may create (e.g., mix, satisfy, dispense, form, etc.) a beverage order, such as pour a cup of soda, water, or juice, from one or more supplies. In addition to forming the beverage, the beverage forming apparatus/system may employ various components/systems described herein (e.g., a sealing apparatus) in conjunction with creating the beverage such that the beverage is produced to a customer with a sealed lid. In some embodiments, such as described herein, the sealed lid may include one or more identifying messages or images appropriate for the created beverage.

In some embodiments, the controller may be configured, such as in response to certain operation conditions, to have the printer print a specific code on the film to provide one or more indications to an operator, such as the position of a splice, an amount of film remaining in the supply, or other indication. In the case of the splice, this may allow the sealing device to alert the operator that a certain film and/or components within the sealing device may be non-functional (e.g., due to presence of splice). In the case of an amount of film remaining, the operator may be alerted that the scaling apparatus may need a replacement supply of film (e.g., due to an indication of a low amount of film supply remaining).

Example Securing Head Assembly

The securing head assembly of the apparatus can contain a housing, at least one heating element, and sensor assembly among other components as described herein. The securing head assembly can further include a plate, such as a shield plate or bearing plate, as further discussed herein. Although described herein as an assembly, in some embodiments, one or more components may not be part of an assembly and may be generally a part of the overall device.

FIGS. 6A-6C respectively depict a top perspective view of the securing head assembly in partial phantom, an enlarged cross-sectional side view of the securing head assembly, and an exploded view of a securing head assembly. As shown, the securing head assembly includes a housing 425 defining an aperture 426 sized to receive at least a top portion of a container therethrough so that the top portion of the container may fit within the sealing portion 301, 301' (shown in FIGS. 2A and 2B). As shown, a wall 440 is disposed within the housing which has a width dimension (e.g., diameter) sized to receive at least a top portion of a container. In the illustrated embodiment, a shield plate 405 is movable within the sealing portion 301, 301' and with respect to the wall 440 between a first position and a second position, although other configurations are contemplated herewith as further discussed. The first position of the shield plate 405 is shown in FIGS. 3A and 3C. FIG. 3B and FIG. 6B depict the shield plate 405 moving from the first position and towards the second position. In some embodiments, when the shield plate 405 reaches a predetermined distance, such as a top portion 441 of the wall 440, the shield plate is in the second position, as further discussed herein. As described herein, however, in other embodiments, the shield plate may be fixedly positioned within the sealing portion.

Example Housing

The housing 425 of the securing head assembly defines a sealing portion 301. 301' that can house the shield plate 405 therein when in the first position. Furthermore, the aperture 426 can be sized to receive at least a top portion of a container when the shield plate is translated. The aperture 426 and the sealing portion 301, 301' can be dimensioned and shaped to accommodate at least a top portion of a variety of containers. For example, the aperture 426 defined by the housing 425 can be a circular aperture with a diameter larger than the average diameter of a container, such as a disposable drinking cup. In one embodiment, the diameter can range up to approximately 30 cm, and in one embodiment can be approximately 15 cm. The aperture 426 can have any suitable shape such as polygonal, square, rectangular, elliptical, rectilinear, ovoid, circular, or irregular. The aperture 426 of the securing head assembly can coincide with any additional apertures of the apparatus 100 to facilitate movement of the container within the sealing portion of the securing portion 300, 300'.

As referenced above, the securing head assembly 400 can further include a wall 440 that can be disposed within the housing 425. The wall can create a barrier between the heating element(s) and the film disposed on the container. As such, the wall can protect the heating element from having the film melt onto the heating element. In certain embodiments, the wall can also protect the container and user from broken heating elements, e.g., broken bulbs. As shown in the example of FIG. 5B and FIG. 6C, the wall 440 is embodied as a glass tubular structure that tracks along a periphery defining the aperture 426. Such structure allows the energy to emanate through the wall, but still protect the heating elements, as discussed below. The tubular structure complements the shape of the container inserted therein. The wall 440 can have any suitable shape, for example defining a polygonal, square, rectangular, elliptical, circular, ovoid, circular, or irregular tube. The wall 440 can have a width dimension sized to receive at least a top portion of a container. For example, in some embodiments, the width dimension (e.g., diameter) of the wall 440 is at least the width dimension of the aperture 426 defined by the housing 425. The wall can furthermore deflect corners of a film disposed on a container downward toward a rim of the container to better position the film for securement to the container, as further discussed herein.

In an alternative example, the at least one wall can be disposed about the at least one heating element. Accordingly, in one embodiment, the wall can be embodied as a glass tubular protective structure that houses the heating element therein. Any inadvertent rupturing of heating elements, such as broken bulbs, can be contained within the glass tubular structure and be contained therein. In such an example, a portion of the glass tubular wall can have a reflective surface or coating, and the remaining portion of the glass tubular wall can be configured to reflect energy from the heating element in a desired direction. In some embodiments, the wall (e.g., a protective structure) may also be configured to filter out undesirable wavelengths of electromagnetic radiation produced by the heating elements (e.g., the UV component of energy emitted by the tungsten-halogen light bulbs)

The wall 440 can be made of any suitable material. For example, the wall 440 can be made of glass, plastic, or metal or fiber screening. In some embodiments, the wall 440 may be at least partially transparent or translucent to permit energy emanated from the at least one heating element 435 through the wall 440. In other embodiments, the wall can include opaque sections and transparent sections to focus the energy through the transparent sections. In some embodiments of the disclosed subject matter, the wall 440 can be coupled to the shield plate 405 (when provided) and also be movable with the shield plate 405 between the first and second positions. That is, as the shield plate 405 moves position, the wall 440 can move therewith. However, in the embodiment of FIGS. 6A-6C, the wall 440 remains static and the shield plate moves with respect to the wall between positions. As such, the wall 440 may be coupled to the housing 425 as shown in FIG. 6B, wherein the shield plate 405 is movable with respect to the wall 440 between the first position and the second position. That is, movement of the shield plate 405 does not move the wall 440. As shown in FIG. 6B for purpose of illustration and not limitation, the shield plate 405 is moveable within the aperture and the wall 440 between a first position and a second position along an axis defined by the wall 440. In some embodiments, the wall 440 can be coupled to the housing 425 along a circumference of the aperture.

Example Heating Elements

As shown in the example of FIGS. 6A and 6B, at least one heating element 435 is disposed within the housing and positioned external to the wall 440. In the embodiment of FIG. 6A, the at least one heating element 435 comprises four heating elements as further discussed herein, but any suitable number of heating elements is contemplated herein. The at least one heating element 435 is activated to emanate energy towards the wall 440 when the shield plate is in the second position. Furthermore, the at least one heating element can deactivate while still in the second position after a predetermined length of time to ensure safety of the apparatus. The emanated energy can interact with a film disposed between the shield plate and a container to couple the film to the container. The securing head assembly may further include a sensor assembly 420 to sense movement of the shield plate 405 and to activate the at least one heating element 435 when the shield plate 405 is in the second position. A loading zone 325 is configured to receive a predetermined dimensioned film from the body portion (e.g., portion 505*a*), as shown in FIG. 3A and as further discussed herein. The loading zone 325 is positioned adjacent the shield plate 405 in the first position. As shown by FIGS. 3A-3C, a top portion 602 of a container 600 is movable within the aperture 426 and wall 440 to move the shield plate 405 to the second position and to secure a predetermined dimensioned film portion 505*a* to a top of a container 600. This is accomplished by energy from the at least one heating element 435 causing the film portion 505*a* to shrink around the top portion 602 (e.g., a lid) of the container 600—thereby forming a seal, such as shown in FIG. 3C. As noted herein, the film portion 505*a* may include one or more radiation-absorbing layers of ink that shrink upon application of heat.

The at least one heating element can comprise any suitable device that can be configured to emanate a suitable amount of energy to cause the film to secure to a container to form a seal thereon. In one example, the at least one heating element comprises a light bulb containing a tungsten filament (e.g., a tungsten-halogen light bulb). Other examples include, but are not limited to, a resistor, a cathode ray tube, a light emitting diode, a carbon filament bulb, a ceramic heater, amongst others. In some embodiments, the heating element(s) may be chosen/tailored to the specific component of the film which absorbs the radiant heat (e.g., carbon black pigment or other near infrared absorbing pigment/dye which could be a component of the applied coatings/inks). For example, an appropriate heating element (e.g., a bulb, an LED, a heater, etc.) may be chosen that radiates a type of heat that maximizes efficient absorption from the type of film and/or ink/coating thereon for sealing purposes. In some embodiments, two or more different types of heating elements may be installed in the sealing device and the most efficient/effective type of heating element may be chosen to operate based on the film that is currently being utilized (such as described with respect to various embodiments herein).

The at least one heating element 435 can be activated, such as via a controller (e.g., controller 30) to emanate energy. In this regard, the term "emanate" may encompass any type of heat transfer to the film (e.g., conduction, convection, radiation, transfer, etc.). In this regard, though the described example light bulbs radiate energy, some embodiments of the present invention contemplate other types of heating elements that emanate energy via other methods, such as convention, conduction, heat transfer, radiation, etc.

For example, the at least one heating element 435 can comprise a light bulb that illuminates when the shield plate 405 moves between a first position and a second position. The emanated energy from the at least one heating element 435 can contact and heat the film, causing it to shrink. For example, energy from the at least one heating element can pass through wall 440 to contact the film. As discussed further below, the shrinkage of the film causes the film to secure or tightly secure to or around a lip, rim, or edge of a container. As used herein, shrinkage of the film creates a seal around the container opening where the film has substantially sealed the opening. In some embodiments, the film is not adhered or heat glued to the container, but rather is heat-shrinked to itself. In some embodiments, the film can cooperate with the container to melt and fuse together. For example, the container can include a coating that interacts with the film upon the activation of energy thereto.

In embodiments that include a plurality of heating elements, the plurality of heating elements can be activated simultaneously when the shield plate 405 is in the second position to effectuate a uniform melting of the film about the container. As used herein, the term "simultaneously" or "simultaneous" means at the same time or nearly at the same time such that any difference in activation is not readily apparent or detectable. The at least one heating element 435 can be positioned at any suitable location within the apparatus 100. For example, in one embodiment, the at least one heating element 435 can be disposed between the wall 440 and the surrounding housing of the securing head assembly 400. In other embodiments having a plurality of heating elements, the heating elements 435 can be equally radially spaced around a central axis defined by the wall 440.

In some embodiments, each of the plurality of heating elements may be activated individually. Similarly, in some embodiments, groups of the plurality of heating elements may be activated together (e.g., in the case of four heating elements, a first group of two heating elements can be activated at the same time and then the second group of heating elements can be activated at a same second time). In some embodiments, the heating elements may be activated individually or in groups to achieve a desired effect (e.g., reach different temperatures, heat different sections of the film, etc.), such as for efficiently securing the film to the container. In some embodiments, the size or shape of the container may be detected and/or determined and the heating elements may be activated individually or in groups according to the detected and/or determined size or shape. In some embodiments, the ink applied to the film may be detected and/or determined and the heating elements may be activated individually or in groups according to the detected and/or determined ink.

The at least one heating element can be activated for a predetermined time once the heating element receives a signal for activation, such as from a controller. Alternatively, the at least one heating element can be activated while the shield plate remains in the second position.

In some embodiments, the heating element(s) may be configured to be replaceable to facilitate quick and easy replacement thereof. For example, the connection of the heating element(s) to the sealing apparatus may comprise a quarter turn connection or other type of connection.

In accordance with some embodiments, the apparatus 100, 100' can comprise at least one reflective device 430 disposed within the housing 425 and exterior to the wall 440. The reflective device 430 reflects at least a portion of energy from the heating element 435 toward the wall 440 when the shield plate is in the second position. This energy propagates through the wall and is imparted upon the film ready to be secured to the container, as noted above. In some embodiments, the at least one reflecting element 430 comprises a mirror. In other embodiments, the at least one reflecting element 430 can comprise any suitable mechanism to allow energy to be redirected in a desired direction, such as but not limited to a metal piece, a plastic piece, a painted piece, a reflective coating, amongst others.

As shown in the illustrated embodiments of FIG. 6A and 6B, the apparatus comprises a plurality of reflecting elements 430 that can be arranged to form a continuous perimeter about the at least one heating element 435. As shown, there are four reflecting elements in FIGS. 6A-6C. In some embodiments, and as shown for example in FIG. 6C, each reflecting element 430 comprises a first panel 436, a second panel 437, and a third panel 438, wherein the first panel 436 is disposed at a first angle relative to the second panel 437, and the third panel 438 is disposed at a second angle relative to the second panel 437. In some embodiments, the first angle can be the same as the second angle. In alternate embodiments, the first and second angles can differ. Either or both of the first and second angles can be any suitable angle, for example in a range of about 20-70 degrees. In other embodiments, the reflecting element can include a monolithic curved plate embodied as the first, second, and third panel.

Example Shield Plate

As shown in FIG. 6B, the apparatus can include a movable shield plate 405 (although in some embodiments the shield plate may be fixed so as to not be movable within the sealing portion). As depicted in the example of FIG. 6B, the shield plate 405 is movable and can be coupled to a guide rod 410. The guide rod 410 can facilitate movement of the shield plate 405 from the first position to the second position. The guide rod 410 can be of any suitable shape and can guide the shield plate 405 along any suitable movement trajectory between the first position and the second position within the sealing portion 301, 301'. For example, and as shown in FIGS. 6B and 6C for purpose of illustration and not limitation, guide rod 410 can have a longitudinal shape and can guide shield plate 405 along a vertical axis. In some embodiments, the vertical axis can be parallel to an axis defined by a center of the wall 440. In other embodiments, guide rod 410 can have a different shape and can guide the shield plate 405 along a different trajectory between the first position and the second position, such as a curved trajectory. The shield plate in embodiment of FIG. 6B is illustrated at a distance X above a portion of the housing for purposes of discussion. In some embodiments, it is contemplated herewith that the shield plate only need to move a minimal distance suitable to signal the sensors of the housing in order to activate the heating element. Thus, the shield plate can have a short stroke distance to activate the apparatus. As noted above, the guide assembly enables the minimal distance required for activation as the guide assembly loads the film in a ready position into the loading zone.

In an alternative embodiment, the shield plate is static and disposed at a distance above the aperture 426 to allow a top portion of the container to press a film there against. Such distance required for operation may be minimized due to the guide assembly, as referenced above. In such embodiments, the apparatus can include a sensor assembly adjacent the aperture 426 that detects when an object, such as the film and top of the container, breaks a plane of the aperture (or at least breaks a plane at a distance above the aperture) to signal the heating element to activate. In this embodiment, the static shield plate can be disposed beyond the aperture to provide a surface for the film to be pressed against by a top of the container while the heating element is activated. In yet another embodiment, the sensor assembly can be disposed in any suitable location to signal when the film is pressed against the shield plate by a top of the container and in a ready configuration, as further discussed herein. In some embodiments, a top wall of the securing head assembly may perform the same function as the fixed shield plate such that no shield plate is needed.

The shield plate 405 can be made of any suitable material that absorbs minimal energy from the heating element or is at least partially retardant thereto. In some embodiments, the shield plate is nonconductive and does not absorb energy. For example, the shield plate can be made of certain plastics, metals, wood, or other suitable materials. In one embodiment, the shield plate comprises aluminum. The shield plate 405 is preferably at least partially opaque with respect to energy emanated by the at least one heating element 435. Thus, the shield plate 405 can protect a portion of the film from energy emanated by the at least one heating element. The shield plate, in some embodiments, can be biased towards the first position by gravity and by the weight of the shield plate itself. In other embodiments, the apparatus can include a biasing mechanism such as a spring to further bias the shield plate toward the first position to ensure the shield plate returns to the first position after use.

Example Sensor Assembly

In accordance with some embodiments, a sensor assembly can be operatively coupled to the shield plate 405 when the shield plate is embodied as a movable part. In other examples, such as when the shield plate is embodied as a static part, the sensor assembly can be positioned within the apparatus beyond the aperture, as discussed above.

In the embodiment shown in FIG. 6A, the sensor assembly includes a signal emitter 421, a signal sensor 422, and a sensor flag 415 therebetween. The sensor flag positioning can directly correspond to the position of the shield plate as moved by the container. The signal emitter can continuously emit a signal capable of being detected by the signal sensor. The sensor flag 415 can be positioned between the signal emitter and the signal sensor, such that sensor flag 415 blocks the signal where opaque. However, the sensor flag 415 can further define a window therein at a predetermined location in order to allow the signal to trigger the signal sensor. Accordingly, as the signal flag 415 moves between the signal emitter and signal sensor, the window can allow transmission of the signal to the signal sensor. The signal sensor, upon detecting the signal, can register that the shield plate 405 has moved between the first position and the second position and generate a sensor input. In other embodiments, a reverse set up can be provided. That is, the sensor flag 415 can allow transmission of the signal to the signal sensor until it is blocked by the flag once the shield plate 405 has moved between the first position and the second position. The signal sensor, upon detecting the reduction of the signal, can register that the shield plate 405 has moved between the first position and the second position and generate a sensor input to activate at least one heating element 435. Similarly, the signal sensor can deactivate the heating element(s) once the signal flag 415 moves back between the signal emitter and signal sensor, or as the signal sensor returns to its first state.

In other embodiments, the sensor can be any sensor 420 suitable for detecting the movement of the shield plate 405 between the first position and the second position, or detect when the film and top of the container breaks a threshold plane when the shield plate is embodied as a static part. For example, the sensor 420 can include at least one of a signal sensor as described, a mechanical sensor, a motion sensor, amongst others. A mechanical sensor can include a rotational sensor, that is rotated by movement of the shield plate, a guide rod, a sensor flag, or another part coupled to the shield plate, and registers movement of the shield plate upon rotation, or registers other movements as contemplated herein. For example, a mechanical sensor can register a degree of movement by the amount of rotation.

The sensor input generated by sensor 420 can activate the at least one heating element 435 when the shield plate 405 has moved between the first position and the second position, or detect when the film and top of the cup breaks a threshold plane when the shield plate is embodied as a static part. Thus, at least one heating element 435 can be activated to emanate energy when the shield plate 405 is in the second position, initiating a securing cycle.

Example Additional Components

The securing portion 300 can further include any additionally desired components. Accordingly, the securing portion can include a base portion 320 as shown in FIG. 1A. In some embodiments, the base portion 320 can be reflective to assist a user in aligning a container in the proper position. As such, the reflective base portion 320 can assist a user to insert a container into an approximate center of the aperture or can otherwise assist in positioning the container within the aperture in the proper location and ready for securement.

As shown in FIGS. 2A and 2B, the securing portion 300, 300' can further contain a fan 305, 305' or a cooling mechanism to at least partially regulate the temperature of the securing portion 300, 300'. In such embodiments, the securing portion 300, 300' can further include a temperature sensor, a time keeper, or the like to either sense or calculate the temperature of the securing portion 300, 300'. The temperature regulation allows the apparatus 100, 100' to have improved repeat usability and to enhance safety. For example, the temperature regulation reduces the ability of the securing portion 300, 300' to overheat, which may cause damage to various components of the sealing apparatus and/or the container or may cause the film to improperly melt in an undesired manner. Additionally or alternatively, the partial temperature regulation allows for improved safety, for example by decreasing the risk that a person that comes into close proximity or contact with the securing portion 300, 300' may be exposed to undesirable heat. The fan 305, 305' can function to channel air toward the interior of the securing head assembly, or alternatively, away from the interior of the securing portion 300, 300'. Furthermore, the securing portion 300, 300' can contain more than one fan 305, 305' or other cooling devices known in the art.

In some embodiments, various vents or louvers may be employed within the apparatus 100, 100' to regulate heat within body portion 200, 200' and/or securing portion 300, 300'. For example, with reference to FIGS. 2A and 7, the securing head assembly 400' includes two louvers 417' that are configured to vent heat from within the sealing portion 301'. Further, the apparatus 100' may include various vents 307', 207' that are configured to enable air flow through the various components of the apparatus 100'. For example, FIG. 7 illustrates an example air flow (shown by arrows) through the apparatus 100', such as may be due to the fan 305' pulling air from within the apparatus 100' and pushing the air out to the environment through vent 307'.

In some embodiments, the fan 305, 305' may be configured to operate or not operate at certain points during a life cycle of a sealing operation. For example, the controller may be configured to cease operation of the fan 305, 305' during operation of the heating elements 435 so as to enable efficient heat transfer to the film portion 505a for shrinking thereof (and forming a seal around a top of a container). In some embodiments, after deactivation of the heating elements 435, the controller may be configured to cause the fan 305, 305' to operate to cool down the inside of the apparatus 100, 100'. Further, in some embodiments, the controller may be configured to cease operation of the fan 305, 305' after a certain amount of time, such as to preserve power for the apparatus 100, 100' and/or prolong the overall life of the fan 305, 305'.

Example User Interface

The apparatus 100, 100' can be configured to receive inputs and commands. Such inputs and comments can be effectuated by way of a user interface operatively coupled with the apparatus. Alternatively or additionally thereto, the apparatus can be configured to receive inputs and comments remotely or wirelessly from a user or other electronically coupled devices.

In some embodiments, the securing portion 300, 300' includes a user interface to receive inputs and commands from a user. The user interface can include an indicator 310, 310' to display information to a user and at least one input device 315 to receive information. Furthermore, the indicator and input device can be combined as one device. In some embodiments, the indicator 310, 310' can include but is not limited to at least one of an electronic display (such as LED, OLED, LCD and the like), a light, a rotating indicator, sound device, an actuating indicator, a touchscreen, a smart device, or the like. The indicator 310, 310' can indicate the status or mode of the apparatus 100, 100'. For example, the indicator 310, 310' can indicate that the apparatus 100, 100' is in a ready state, a securing state, a preparing state, or another state. Additionally or alternatively, the indicator 310, 310' can indicate how many cycles the apparatus has performed since reset, the status of adjustable settings, repair information, a warning such as to replace a roll of film therein, and/or other information about the apparatus, as desired. Upon operation of the apparatus 100, 100' for example, the indicator 310, 310' can indicate completion of a securement cycle.

In some embodiments, the at least one input device 315 can include at least one of a push button, a lever, a dial, a virtual input on a graphical user interface, or the like. The at least one input device 315 can adjust at least one adjustable setting of the apparatus 100. For example and not limitation, the at least one input device 315 can adjust the operation of the securing head assembly 300. Additionally or alternatively, the at least one input device 315 can include a command capable of being understood by a computer (e.g., controller 30). The indicator 310, 310' and the input device 315 can, in some embodiments, work in parallel and are not dependent on each other. In some embodiments, the input device 315 can display the value of the information received, for example, the input device 315 can comprise a dial that displays the value associated with each radial position of the dial. Additionally or alternatively, the apparatus can operatively cooperate with an external device, such as a smartphone, tablet, or external computer. As such, the apparatus can send and/or receive commands by such external devices. Thus, any indications contemplated by the indicator 310 or inputs by the input device 315 can be sent to and from the external device.

In some embodiments, and as further discussed herein, the apparatus further includes a computer (e.g., controller 30) therein or be configured to cooperate with an external computer or device. The computer can be configured to at least one of control the apparatus, control the indicator 310, 310', receive information from the at least one input device 315, store adjustable settings, and communicate with an external device. Additionally or alternatively, the computer can be configured to process information, for example warning information, status information, and mode information, among others. In some embodiments, the computer can coordinate the operation of the apparatus 100, for example by receiving sensor inputs and activating certain functionalities in accordance with the adjustable settings. The computer can be internal or external to the apparatus. The apparatus can furthermore include any devices necessary to ensure the apparatus carries out its operation, such as a circuit board 260, 260'.

In some embodiments, the user interface may be configured to display and receive user input, such as one or more user selections. For example, in some embodiments, a user may be able to select and/or provide instructions for the apparatus 100, 100'. As an example, the user interface may display printing options for a user to select from for printing on the film (such as with the printer). In some embodiments, the user may enter a desired message for printing on the film.

In such embodiments, the resulting sealed lid will then include the user selected message and/or image.

Example Methods of Use

Some example methods of operating the apparatus are discussed throughout the description and in relation to the figures. According to some embodiments, the method comprises providing an apparatus having a body portion to house film, and a securing head assembly. The securing head assembly includes a housing defining an aperture to receive at least a top portion of a container, a wall disposed within the housing, a shield plate movable within the aperture and wall between a first position and a second position, at least one heating element disposed within the housing and positioned external to the wall, a sensor assembly to sense movement of the shield plate and to activate the at least one heating element when the shield plate is in the second position, and a loading zone to receive a predetermined dimensioned film from the body portion. The wall has a width dimension sized to receive at least a top portion of a container. The at least one heating element is activated to emanate energy when the shield plate is in the second position. The loading zone is positioned adjacent the shield plate in the first position. The method further includes moving the top portion of the container relative to the aperture to move the shield plate to the second position and to secure a predetermined dimensioned film to a top of the container by energy from the at least one heating element. The method may further include moving the shield plate from the second position toward the first position, such as to deactivate the at least one heating element and/or after a period of time has elapsed.

In accordance with the disclosed subject matter, containers that can be used in conjunction with the disclosed subject matter can be of any suitable shape and size. For example, in some embodiments, containers that can be used in conjunction with the disclosed subject matter have a rim, lip or flange at the top portion of the container. In some embodiments, the film can shrink around the lip or flange and thereby be secured to the top portion of the container. In other embodiments, containers that can be used in conjunction with the disclosed subject matter have at least one of tabs, threads, ribs, panels, or other features to facilitate securement of the film to the containers.

As disclosed herein, the devices presented herein can be used for securing film to containers. The containers can contain a product held therein. Such products can include any type of product suitable for the containers, such as fluids or flowable products, beverages, food products and the like. The products can also include non-flowable products like solids and semi-solids of any of the above categories and more.

In accordance with the disclosed subject matter, in some embodiments containers that can be used in conjunction with the disclosed subject matter can be made of plastic, paper, metal, biodegradable materials, recycled materials, and/or reusable materials, among others. The material construction of the containers can complement the kind of film used to affect a secure film attachment. In some embodiments, the disclosed subject matter can secure a film to the top of containers ranging from about 200 mL to about 800 mL in capacity.

The disclosed subject matter can be combined with other features as well. For example, in some embodiments, the disclosed subject matter can be combined with a filling assembly in an integral unit. For example, the apparatus of any of the embodiments of the disclosed subject matter can further comprise a fill nozzle, chute, funnel, or tube, among others, capable of filling product into the container before securing the film. Additionally or alternatively, in other embodiments, product can be filled into the container after securing of the film, for example through a portion of film pierced by the piercer 220. In this manner, known filling assemblies can be incorporated with the disclosed subject matter.

In some embodiments, the disclosed subject matter can be combined with a cup moving assembly. For example, the apparatus of any of the embodiments of the disclosed subject matter can further comprise a mechanically movable gripper to hold and move containers. The mechanically moveable gripper can be of any suitable format. Alternatively, the apparatus can include a container seat to move containers disposed therein, as known in the art. In other embodiments, the apparatus can comprise a plurality of moveable levers for moving a container, amongst others. In some embodiments, the mechanically moveable gripper can move a container to interact with the apparatus of the disclosed subject matter, for example by rotational, linear, or other actuation of the gripper. In this manner, known container moving assemblies can be incorporated with the disclosed subject matter.

Example Marking Scheme System

Some embodiments of the present invention may provide a system for ensuring that an approved film is utilized with the sealing device. In this regard, there may be a desire to avoid usage of unauthorized rolls of film with the scaling apparatus, such as to avoid providing an unsatisfactory film or avoid potential maintenance issues.

For example, one or more film sensors (e.g., film sensor 240) may be used to read one or more markings on the film, once the film is loaded into the apparatus 100, 100'. The sensor data may be sent to a controller (e.g., controller 30), which may then determine, based on sensor data from the film sensor, if a detected one or more markings on the film satisfies an approved marking scheme. For example, the controller may be configured to access a database (such as in memory) of approved marking schemes and determine if the detected markings and/or marking scheme match (or sufficiently match) one of the approved marking schemes. In some embodiments, the controller may determine that certain marking characteristics of the detected markings matches (or sufficiently matches) one of a set of approved marking characteristics. Then, if approved, the apparatus 100, 100' and/or various functions/components (e.g., such as described herein) of the apparatus 100, 100' may be enabled for use. If unapproved, the apparatus 100, 100' and/or various functions/components (e.g., such as described herein) of the apparatus 100, 100' may be disabled. Additionally, reports of the approved or unapproved film usage may be provided to a remote server for data generation and use (e.g., re-ordering, maintenance, etc.). In some embodiments, the controller may cause the sensor data to be sent to a remote server to determine whether or not the detected one or more markings satisfy an approved marking scheme at the remote server.

In some embodiments, the controller may be configured to determine a film marking scheme for the film based on the detected one or more markings. For example, the determined film marking scheme may correspond to a marking pattern comprised of a plurality of markings and determined spacing between each adjacent marking within the plurality of markings. In some embodiments, the controller may determine the film marking scheme based on at least one of the color of the one or more markings, a width of the one or more markings, a length of the one or more markings, a spacing between adjacent markings, etc.

In some embodiments, the determined film marking scheme may be repeated along the length of the roll of film such that the roll of film comprises a plurality of repeated film marking schemes. In such an embodiment, the film can be checked (e.g., continuously or periodically) and reconfirmed to avoid switching to an unapproved film after an initial loading takes place. Additionally or alternatively, in some embodiments, a body lid switch may be employed that provides an indication to the controller when the body lid has been opened. In response, the controller may check the marking scheme to confirm that the installed film includes an approved marking scheme.

In some embodiments, the determined film marking scheme may be checked against an approved marking scheme, such as via a controller. In response, one or more operations of the sealing device may be affected based on whether or not the detected marking scheme satisfies an approved marking scheme. For example, the controller may affect operation by enabling operation, disabling operation, or changing operation of the sealing device and/or one or more components of the sealing device. In some embodiments, the current or future operation (e.g., cycles) of the sealing apparatus may be affected.

In some embodiments, the controller may be configured to cause, in an instance in which the detected one or more markings satisfies the approved marking scheme, enabling operation of the sealing device and/or components thereof. For example, the controller may enable power to transfer to the sealing device (or its components); enable operation of the motor, enable operation of the heating element(s), enable operation of the printer, enable operation of the piercer, and/or enable operation of other various components.

Additionally or alternatively, in some embodiments, the controller may be configured to cause, in an instance in which the detected one or more markings does not satisfy the approved marking scheme, disabling operation of the sealing device and/or components thereof. For example, the controller may cut off power to the sealing device; disable the motor, disable the heating element(s), disable the printer, disable the piercer, or other various components.

Additionally or alternatively, in some embodiments, the controller may be configured to change or alter operation of one or more components of the sealing device. For example, if the detected one or more markings does not satisfy the approved marking scheme, the controller may cause one or more components to operate in a reduced or hindered capacity to discourage further use of the unauthorized film. For example, the controller may decrease a speed of operation of the motor, cause the film to misalign with the top of the container, decrease a speed or temperature of operation of the at least one heating element, cause the printer to print one or more messages or images in an off-center position on the film, cause the printer to print one or more messages indicating that an unapproved film is being utilized, increase a delay time between sealing operations performed by the sealing device, or cause the piercer to pierce the film in a undesired location. As more examples, the controller may cause an increased or over anticipated amount of film to be used to cause faster depletion of the unauthorized supply of film and/or misalignment of features to provide a less desirable end product.

In some embodiments, the one or more markings may be read and used to provide information (e.g., characteristics) relevant to the installed film. For example, various characteristics of the film (e.g., thickness, pre-printed information, etc.) may be determined and/or various desired operational parameters of the sealing apparatus during use with the film (e.g., how long to activate the heating element(s), what to print on the film, whether or not to pierce the film, etc.) may be determined. For example, an installed roll of film may have a thickness that would require a longer than normal time of operation for the heating element(s) to remain active for providing a sealed lid. Similarly, the planned lid may be printed with a lighter ink that may require a different than normal amount of time of operation for the heating element (s) to remain active for providing a sealed lid.

For example, in response to determining one or more characteristics of the one or more markings, the controller may further determine a desired operation of one or more components of the apparatus based on the detected one or more characteristics and cause operation of the one or more components of the apparatus based on the determined desired operation. As an example, the controller may cause the at least one heating element 435 to operate according to at least one of a specific amount of time or a specific heat based on the determined one or more characteristics (e.g., the specific film may require a certain heat for proper shrinkage and scaling). As another example, the controller may cause the motor 213' to operate according to at least one of a specific amount of time or according to a specific number of detected markings based on the determined one or more characteristics (e.g., the film may correspond to a specific product and/or may be designed for use with a specifically-sized container—which may lead to a desire to provide a portion of film of a specific length to the sealing portion 301, 301'). As yet another example, the controller may cause the piercer 220, 220' to operate based on the determined one or more characteristics (e.g., the associated product may not require the piercer to operate or it may be desirable to utilize the piercer to provide a slit/perforation in a specific location or of a specified dimension). As yet another example, the controller may cause the printer 250 to operate based on the determined one or more characteristics, such as by printing one or more messages or images on the film based on the determined one or more characteristics (e.g., the associated product that is utilized with the film may be associated with a certain logo to be printed on the film). In addition to the above examples, other example operations/features that would be controllable are contemplated, such as providing a delay between dispenses of the film portion, controlling the fan air flow, controlling the motor operation speed, controlling which ones and how many heating elements to activate, controlling the user interface, among many others.

In some embodiments, the controller may determine one or more characteristics of the film based on the detected one or more marking characteristics. For example, the controller may determine at least one of the thickness of the film, the associated customer for the container, the associated product for use with the film, a time of operation of the heating element, a subset of printing options to present to a user for selection, or the amount of film remaining on the roll of film. In the case of being able to determine the amount of film remaining on the roll of film, the marking scheme may further include a differentiating characteristic from among at least some of the marking schemes to thereby indicate a relative position along the roll of film (e.g., there may be countdown type characteristic applied to some of the marking schemes).

In some embodiments, the controller may be configured to communicate with a remote server. In some such example embodiments, the controller may be configured to receive an update (e.g., a software update) and update various functionality accordingly. In some example embodiments, the controller may communicate any gathered information to the remote server, such as with respect to usage data or other types of data.

Example System Architecture

FIG. 13 illustrates an example system/environment in which some example embodiments of the present invention may be employed. The system 1 may include an example sealing apparatus 100, 100', such as described herein. The example scaling apparatus 10 may comprise hardware and/or software capable of performing functions described herein. In this regard, the apparatus 10 may include a roll of film 9 (although the film may be in stacks in some embodiments) that includes a leading edge that extends through the scaling apparatus along a film path 7. Additionally, the apparatus 10 may include a controller 30, a motor 22, a memory 32, a communication interface 34, a user interface 36, and a power source 39. Further, the apparatus 10 may include a printer 50, a piercer 20, a nip 23, one or more film sensors 25, a cutter 27, and a sealing portion 11 that are positioned along the film path 7. The scaling portion 11 may include one or more heating elements 40 and a shield plate 15. A user may position a container 6 within the sealing portion 11 to cause sealing thereof. In this regard, various described components and features of the example system 1 may correspond to components and features described herein, such as with respect to apparatus 100, 100' (among the other described embodiments).

The controller 30 may be any means configured to execute various programmed operations or instructions stored in a memory device such as a device or circuitry operating in accordance with software or otherwise embodied in hardware or a combination of hardware and software, thereby configuring the device or circuitry to perform the corresponding functions of the controller 30 as described herein. In this regard, the controller 30 may be configured to receive (such as via the communication interface 34 or user interface 34) and/or determine (such as based on sensor data) one or more instructions for operating one or more components of the apparatus 10. In this regard, the controller 30 may be connected to and control or cause operation of the user interface 36, memory 32, communication interface 34, motor 22, printer 50, piercer 20, film sensor(s) 25, cutter 27, shield plate 15, and/or heating element(s) 40. Though shown as a single controller, in some embodiments, various separate controllers (whether alone or in communication with each other) may perform functions described herein.

The one or more motors 22 may be used to drive (e.g., through rotation or otherwise) the nip 23 (e.g., the drive roller) to cause advancement of the film from the roll of film 9 along the film path 7. In some embodiments, the controller 30 may be configured to operate the motor 22 accordingly.

The printer 50 may be configured to print on the film. In some embodiments, the printer 50 includes ink that enables the printing, such as provided from one or more ink cartridges, tanks, reservoirs, etc. In some embodiments, the controller 30 may be configured to instruct the printer 50 to cause printing of various messages and/or images.

The film sensor(s) 25 may be configured to detect one or more markings and/or marking characteristics of a marking scheme on the film, such as described herein. The film sensor(s) 25 may be configured to provide the sensor data to the controller 30, such as described herein.

The cutter 27 may be configured to operate to cut the film, such as in response to instruction from the controller 30.

The heating element(s) 40 may be configured to operate, such as based on instructions from the controller 30 or other sensor assembly, such as described herein. In particular, in some embodiments, the heating element(s) 40 may be configured to emanate energy to cause shrinkage of the film to or around the top portion of the container 6 to form a sealed lid thereon. In some embodiments, the formed seal may be configured to be absolute such that no liquid may leak around the seal. In other embodiments, the formed seal may be configured to be partial such that a portion of the top container is unsealed or lightly sealed. In such an example embodiment, a user may be able to drink from the unsealed portion and/or peal back the unsealed or lightly sealed portion (e.g., to facilitate drinking therefrom and/or pouring therethrough).

The shield plate 15 may be configured to provide a shielded surface for positioning of the container 6 within the sealing portion 11. The shield plate 15 may provide physical resistance and/or heat dispersion or other characteristic to aid in sealing of the container 6.

The memory 32 may be configured to store instructions, computer program code, approved marking schemes and/or characteristics, and other data/information associated with the apparatus 10 in a non-transitory computer readable medium for use, such as by the controller 30.

The communication interface 34 may be configured to enable connection to external systems (e.g., an external network 12 and/or one or more other system(s)/device(s), such as another apparatus 10). In some embodiments, the communication interface 34 may comprise one or more transmitters configured to transmit, for example, one or more signals according to example embodiments described herein. Likewise, the communication interface 34 may include at least one receiver configured to, for example, receive data according to example embodiments described herein. In some embodiments, the transmitter and receiver may be combined as a transceiver. In this regard, the apparatus 10 may be configured for wired and/or wireless communication. In some embodiments, the communication interface 34 may comprise wireless capabilities for WiFi, Bluetooth, or other wireless protocols. In some embodiments, the apparatus 10 may be connected to one or more point-of-sale system(s) 13 to aid in performance of food orders (such as by forming sealing lids for use with the order).

The user interface 36 may be configured to receive input from a user and/or provide output to a user. The user interface 36 may include, for example, a display, a keyboard, keypad, function keys, mouse, scrolling device, input/output ports, touch screen, or any other mechanism by which a user may interface with the system. Although the user interface 36 is shown as being directly connected to the controller 30 and within the apparatus 10, the user interface 36 could alternatively be remote from the controller 30 and/or apparatus 10. Likewise, in some embodiments, other components of the apparatus 10 could be remotely located.

The power source 39 may be any type of power source, such as a battery (or batteries) and/or an external power source (e.g., a plug 209, such as shown in FIG. 1A, may be used to receive power from an outlet). Power from the power source 39 may be used to provide power to any of the components/devices utilized in the apparatus 10.

Example Flowchart(s)

Embodiments of the present invention provide methods, apparatuses and computer program products for operating example sealer devices according to various embodiments described herein. Various examples of the operations performed in accordance with embodiments of the present invention will now be provided with reference to FIGS. 14-16.

FIG. 14 illustrates a flowchart according to an example method for operating an example sealer device according to an example embodiment. Notably, while FIG. 14 provides a flow of various operations, the order of occurrence of the operations is not meant to be limited to that illustrated in FIG. 14 and may vary within embodiments of the present invention. The operations illustrated in and described with respect to FIG. 14 may, for example, be performed by, with the assistance of, and/or under the control of one or more of the components of example systems/device described herein, such as apparatus 10, 100, 100' among other things.

The method 1000 may include sensing movement of the shield plate to a second position within the sealing portion at operation 1002. At operation 1004, the method may include activating one or more heating element(s) to cause sealing of the film to a container. At operation 1006, the method may include printing on the film, such as including one or more messages or images. Then, the method may include piercing the film with a piercer at operation 1008. The method may further include operating the motor to cause advancement of the film along the film path at operation 1010. At operation 1012, the method may include sensing one or more markings on the film. Then, at operation 1014, the method may cause ceasing operation of the motor to position portion of the film in the sealing portion. Next, at operation 1016, the method may include cutting the film, thereby putting the sealing device back into a ready status.

As noted above, in some embodiments, different orders of operations of FIG. 14 may occur in various embodiments described herein. For example, the printing and/or piercing may occur before the heating elements are activated. Likewise, the printing and/or piercing may occur after the motor has operated to advance the film. In some embodiments, the operations may occur at the same time (e.g., the piercing may occur while the motor is operating to advance the film, the sensing may occur while the motor is operating to advance the film, etc.).

FIG. 15 illustrates a flowchart according to an example method for enabling or disabling operational ability of the sealer device based on whether the installed film is an approved roll of film according to an example embodiment. The operations illustrated in and described with respect to FIG. 15 may, for example, be performed by, with the assistance of, and/or under the control of one or more of the components of example systems/device described herein, such as apparatus 10, 100, 100' among other things.

The method 1100 may include operating the motor to cause advancement of the film along the film path, such as across the film sensor, at operation 1102. At operation 1104, the method may include sensing one or more markings on the film. At operation 1106, the method may include determining if the one or more markings satisfy an approved marking scheme. Then, if the one or more markings do satisfy an approved marking scheme, the method may include enabling operation of the sealing device and/or various components of the sealing device at operation 1108. However, if the one or more markings do not satisfy an approved marking scheme, the method may include disabling operation of the sealing device and/or various components of the sealing device at operation 1110.

FIG. 16 illustrates a flowchart according to an example method for operating an example sealer device according to an example embodiment. The operations illustrated in and described with respect to FIG. 16 may, for example, be performed by, with the assistance of, and/or under the control of one or more of the components of example systems/device described herein, such as apparatus 10, 100, 100' among other things.

The method 1200 may include operating the motor to cause advancement of the film along the film path, such as across the film sensor, at operation 1202. At operation 1204, the method may include sensing one or more markings on the film. At operation 1206, the method may include determining one or more characteristics of the film and/or the planned operation of the sealer device based on the sensor data. Then, the method may include operating one or more components of the sealer device according to the determined one or more characteristics at operation 1210.

FIGS. 14-16 illustrates an example flowchart of a system, method, and computer program product according to various example embodiments described herein. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory and executed by, for example, the controller 30. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein may come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. An apparatus comprising:
    a film support roller to support a film roll that has a length of film;
    a housing with a sealing portion including an aperture sized to receive a top portion of a container therethrough, wherein the housing defines a film path leading from the film roll to the sealing portion;
    a guide support assembly having a ramp and at least one guide truss positioned along the film path within the housing, wherein the ramp is configured to receive a portion of the film, and wherein the ramp and the at least one guide truss are configured to guide the portion of the film to extend across the aperture within the sealing portion such that the portion of the film covers the aperture;
    a motor configured to operate to cause advancement of the film along the film path;
    at least one heating element configured to activate to emanate energy; and
    a controller configured to:
        cause the motor to operate to advance the portion of the film onto the ramp; and
        cause the heating element to activate to emanate energy to cause the portion of the film within the sealing portion to seal the top portion of the container by forming a lid for the container.

2. The apparatus of claim 1, wherein the ramp has a surface extending from a first end to a second end, the surface oriented at an angle of inclination ranging up to 75 degrees, wherein the second end is coupled to a guide surface configured to receive the portion of the film from the surface of the ramp.

3. The apparatus of claim 1, wherein the guide support assembly comprises a funnel structured to receive a leading end of the film therethrough and to channel the leading end of the portion of the film onto the ramp.

4. The apparatus of claim 1 further comprising a printer configured to print on the film; and wherein the controller is configured to cause the printer to print one or more messages or images on the film prior to the lid being formed on the container, such that the lid includes the one or more messages or images printed thereon.

5. The apparatus of claim 4, wherein the controller is configured to determine the one or more messages or images to print on the film.

6. The apparatus of claim 5, wherein the controller receives information from a point-of-sale system that controls the one or more messages or images to be printed on the film.

7. The apparatus of claim 5, wherein the one or more messages or images to be printed on the film is a personalized message related to an order.

8. The apparatus of claim 5, wherein the one or more messages or images to be printed on the film is based on an order.

9. The apparatus of claim 8, wherein the one or more messages or images comprise a description of contents of the container.

10. The apparatus of claim 1, further comprising a communication interface configured to communicate with a remote device, wherein the controller is configured to receive data from the remote device and operate one or more components of the apparatus according to the received data.

11. The apparatus of claim 10, wherein the remote device is a point-of-sale system.

* * * * *